(12) United States Patent
Zhang et al.

(10) Patent No.: US 11,387,929 B1
(45) Date of Patent: Jul. 12, 2022

(54) SYSTEMS AND METHODS FOR CARRIER PHASE RECOVERY

(71) Applicant: CABLE TELEVISION LABORATORIES, INC, Louisville, CO (US)

(72) Inventors: Junwen Zhang, Broomfield, CO (US); Zhensheng Jia, Broomfield, CO (US); Mu Xu, Broomfield, CO (US); Haipeng Zhang, Broomfield, CO (US); Luis Alberto Campos, Superior, CO (US); Curtis Dean Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/077,906

(22) Filed: Oct. 22, 2020

Related U.S. Application Data

(63) Continuation-in-part of application No. 16/738,831, filed on Jan. 9, 2020, now Pat. No. 11,108,490.

(60) Provisional application No. 62/934,664, filed on Nov. 13, 2019, provisional application No. 62/924,427, filed on Oct. 22, 2019, provisional application No. 62/790,146, filed on Jan. 9, 2019.

(51) Int. Cl.
*H04J 14/06* (2006.01)
*H04B 10/61* (2013.01)
*H04B 10/67* (2013.01)

(52) U.S. Cl.
CPC ............ *H04J 14/06* (2013.01); *H04B 10/614* (2013.01); *H04B 10/6162* (2013.01); *H04B 10/6165* (2013.01); *H04B 10/6166* (2013.01); *H04B 10/677* (2013.01)

(58) Field of Classification Search
CPC ............................... H04J 14/06; H04B 10/614
See application file for complete search history.

(56) References Cited

U.S. PATENT DOCUMENTS

| 2011/0217040 | A1* | 9/2011 | Mori | H04J 14/06 398/53 |
| 2012/0315043 | A1* | 12/2012 | Nakagawa | H04B 10/5053 398/65 |
| 2017/0250776 | A1* | 8/2017 | Morsy-Osman | H04J 14/06 |

FOREIGN PATENT DOCUMENTS

| EP | 2568636 | * | 3/2013 | ............. H04J 14/02 |

* cited by examiner

*Primary Examiner* — Nathan M Cors
(74) *Attorney, Agent, or Firm* — Armstrong Teasdale LLP

(57) ABSTRACT

A digital receiver is configured to process a polarization multiplexed carrier from a communication network. The polarization multiplexed carrier includes a first polarization and a second polarization. The receiver includes a first lane for transporting a first input signal of the first polarization, a second lane for transporting a second input signal of the second polarization, a dynamic phase noise estimation unit disposed within the first lane and configured to determine a phase noise estimate of the first input signal, a first carrier phase recovery portion configured to remove carrier phase noise from the first polarization based on a combination of the first input signal and a function of the determined phase noise estimate, and a second carrier phase recovery portion configured to remove carrier phase noise from the second polarization based on a combination of the second input signal and the function of the determined phase noise estimate.

20 Claims, 30 Drawing Sheets

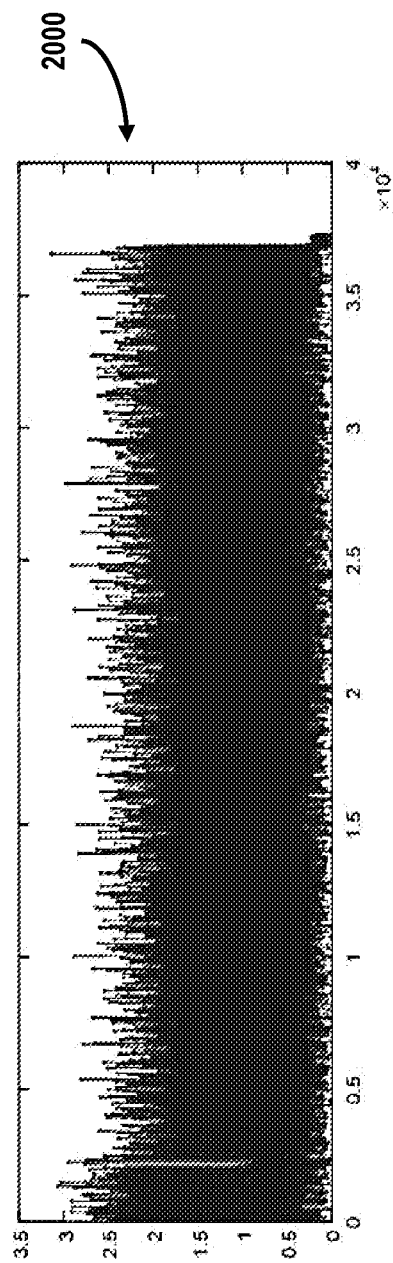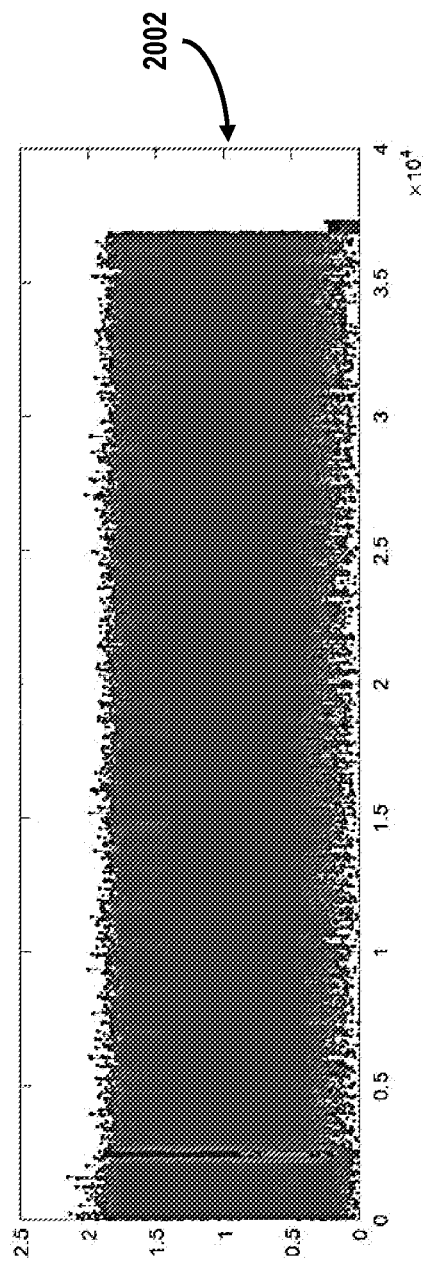
FIG. 20A
FIG. 20B

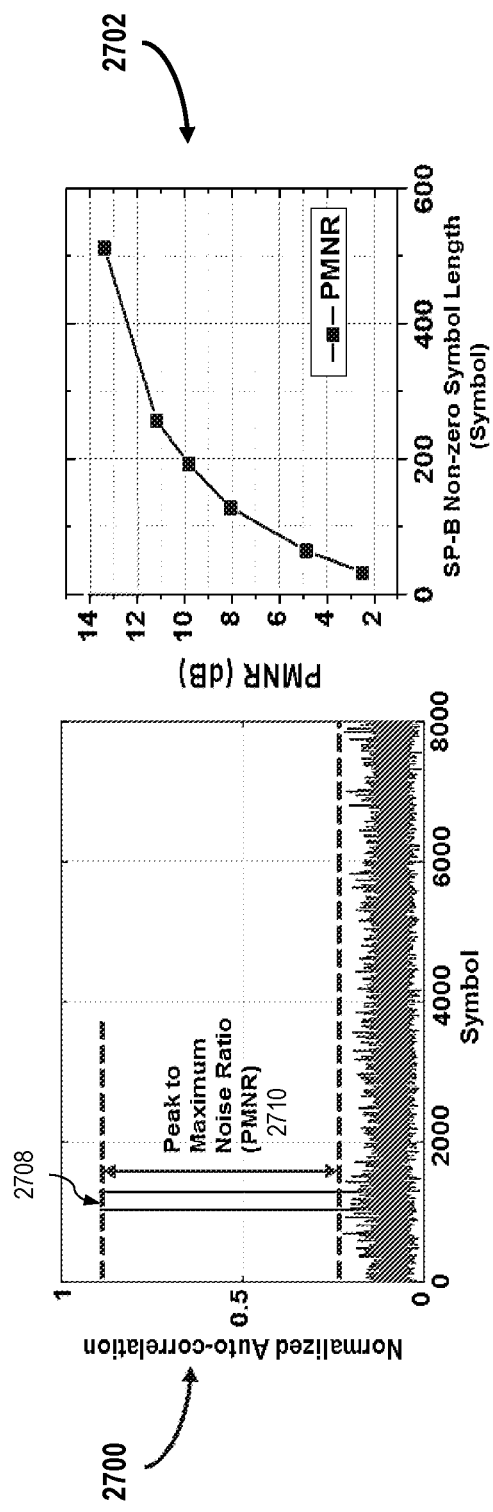
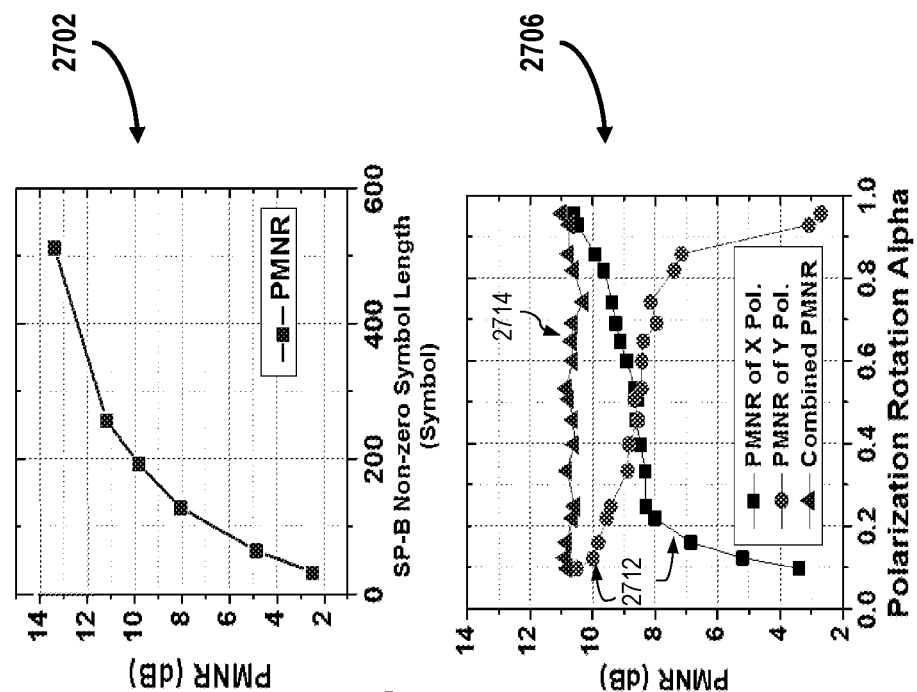
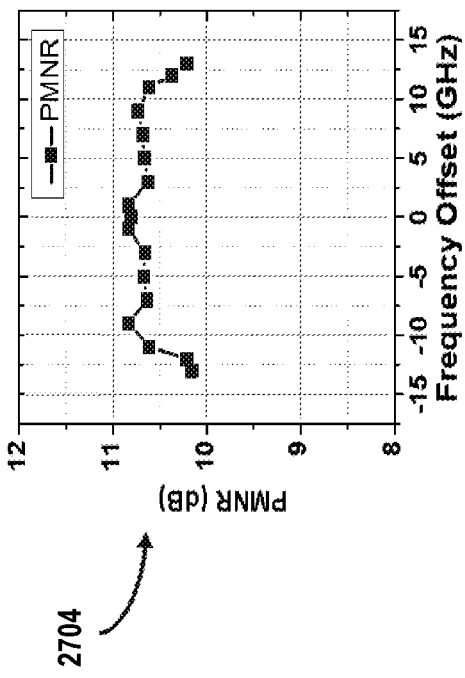
FIG. 27A
FIG. 27B
FIG. 27C
FIG. 27D

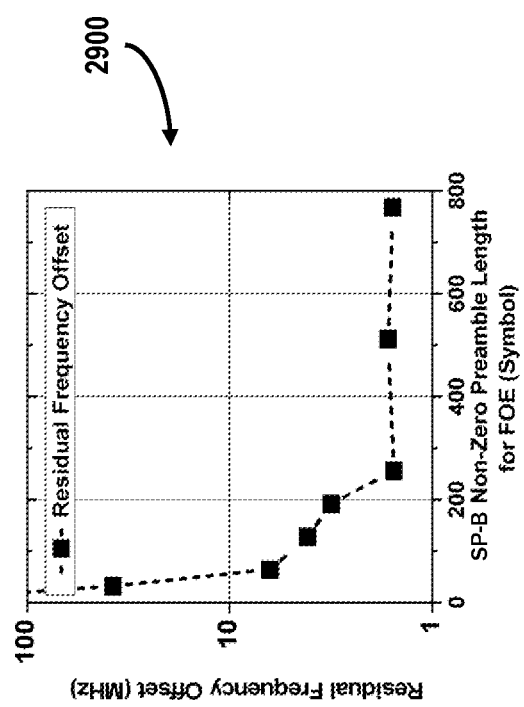
FIG. 29
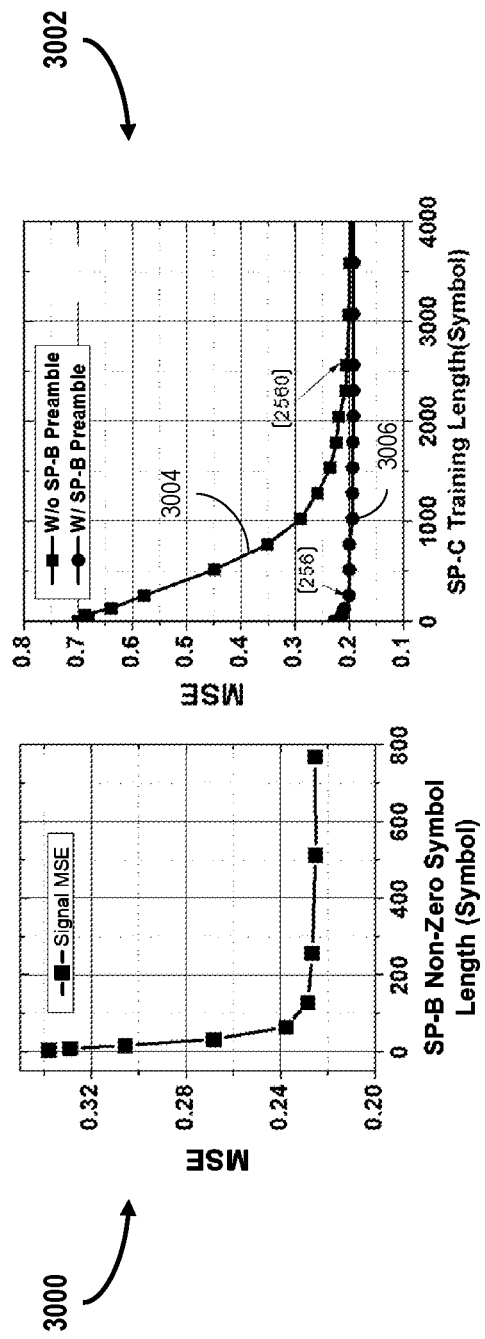
FIG. 30A
FIG. 30B

SYSTEMS AND METHODS FOR CARRIER PHASE RECOVERY

CROSS REFERENCE TO RELATED APPLICATIONS

This application is a continuation-in-part of U.S. patent application Ser. No. 16/738,831, filed Jan. 9, 2020, which prior application claims the benefit of and priority to U.S. Provisional Patent Application Ser. No. 62/790,146, filed Jan. 9, 2019. The present application also claims the benefit of and priority to U.S. Provisional Patent Application Ser. No. 62/924,427, filed Oct. 22, 2019, and to U.S. Provisional Patent Application Ser. No. 62/934,664, filed Nov. 13, 2019. The subject matter of all of these applications are incorporated herein by reference in their entireties.

BACKGROUND

The field of the disclosure relates generally to communication networks, and more particularly, to access networks capable of digitally processing carrier signals for point-to-point (P2P) and point-to-multipoint (P2MP) communication systems.

Access networks, driven by ever-increasing residential data service growth rates and numbers of supported services types (e.g., business services, cellular connectivity, etc.), have been undergoing frequent technological and architectural changes. High-speed data and video service bandwidth requirements for the access paradigm are expected to grow to multi-gigabits-per-second (Gb/s) for residential offerings, and over 10-Gb/s for business markets in optical access networks of the near-future. At present, 10-Gb/s passive optical networks (PONs), such as XG-PON or IEEE 10G-EPON, are rapidly being deployed for high-bandwidth applications. 40-Gb/s PONs, based on time and wavelength division multiplexing (TWDM), have been standardized, and the IEEE 802.3ca Task Force is considering 100-Gb/s Ethernet PONs utilizing 25-Gb/s data rate per lane. However, PONs and access optical systems supporting greater than 50 Gb/s per channel have not been conventionally adopted because present direct detection optical schemes do not achieve sufficient power budgets due to their low receiver sensitivity and limited options for long-term upgrading. These direct detection challenges are particularly prevalent in the legacy fiber environment, where network operators desire the continued use of existing infrastructures to avoid costly fiber re-trenching.

Coherent optics technology is becoming common in the subsea, long-haul, and metro networks, but has not yet been applied to access networks due to the relatively high cost of the technology for such coherent implementations. The coherent optical technology approach is different from the direct detection approach, and enables superior receiver sensitivity that allows for an extended power budget. The high frequency selectivity of the coherent approach enables closely spaced dense or ultra-dense WDM, but without requiring narrow band optical filters. Moreover, the multi-dimensional recovered coherent signal provides additional benefits to compensate for the linear transmission impairments such as chromatic dispersion (CD) and polarization mode dispersion (PMD), and efficiently utilize the spectral resource and benefiting future network upgrades through the use of multi-level advanced modulation formats.

Commercial coherent optical technology was first introduced in long haul applications to overcome fiber impairments that required complex compensation techniques when using direct detection receivers. These first-generation coherent optical systems are based on a single-carrier polarization division multiplexed quadrature phase shift keying (PDM-QPSK) modulation format, and the achieved spectral efficiency (SE) is 2 bit/s/Hz greater than that of conventional 50-GHz optical grids. The system capacity according to the conventional approach is thus increased to approximately 10 Tb/s in the fiber C-band transmission window.

Coherent solutions have recently migrated from long haul, to metro and access networks, by leveraging the development of CMOS digital signal processing (DSP) techniques, reductions in design complexity, and decreases in the price opto-electronic components. Whereas coherent technology in long-haul optical systems utilize best-in-class discrete photonic and electronic components (e.g., the latest digital-to-analog/analog-to-digital converters (DAC/ADC) and DSP application specific integrated circuits (ASICs) based on the most recent CMOS processors), coherent pluggable modules for metro solutions have gone through C Form-factor pluggable (CFP) to CFP2 and future CFP4 via multi-source agreement (MSA) standardization for a smaller footprint, lower cost, and lower power dissipation.

This metro solution, however, is nevertheless considered in the field to be over-engineered, and also too expensive, large, and power-demanding to be efficiently and practically implemented in the access paradigm, which is a significantly different environment than the long haul and metro environments. The shorter transmission reach of the access network results in less distance-dependent signal degradation, and therefore requires less link equalization (e.g., fewer digital filter taps) and less processing in the DSP ASIC for impairment compensation. Such shorter-reach access applications additionally tolerate a slight reduction in optical signal-to-noise-ratio (OSNR) performance. Nevertheless, conventional DSP techniques and algorithms are unable to meet the size and cost requirements for access applications in developing and future access networks. Accordingly, it is desirable to develop DSP processing schemes for the access network paradigm that are able to reduce the DSP complexity and power consumption thereof.

SUMMARY

In an embodiment, a digital receiver is configured to process a polarization multiplexed carrier from a communication network. The polarization multiplexed carrier includes a first polarization and a second polarization. The receiver includes a first lane for transporting a first input signal of the first polarization, a second lane for transporting a second input signal of the second polarization, a dynamic phase noise estimation unit disposed within the first lane and configured to determine a phase noise estimate of the first input signal, a first carrier phase recovery portion configured to remove carrier phase noise from the first polarization based on a combination of the first input signal and a function of the determined phase noise estimate of the first input signal, and a second carrier phase recovery portion configured to remove carrier phase noise from the second polarization based on a combination of the second input signal and the function of the determined phase noise estimate of the first input signal.

In an embodiment, a method is provided for performing carrier phase recovery on a polarization multiplexed carrier in a digital signal processor of a coherent optics receiver. The method includes steps of dynamically estimating phase noise of a first polarization direction of the polarization multiplexed carrier to generate a single-polarization phase noise estimate from the first polarization direction, and performing phase recovery for a second polarization direction of the polarization multiplexed carrier based on the single-polarization phase noise estimate from the first polarization direction.

BRIEF DESCRIPTION

These and other features, aspects, and advantages of the present disclosure will become better understood when the following detailed description is read with reference to the accompanying drawings in which like characters represent like parts throughout the drawings, wherein.

Figure 8A:
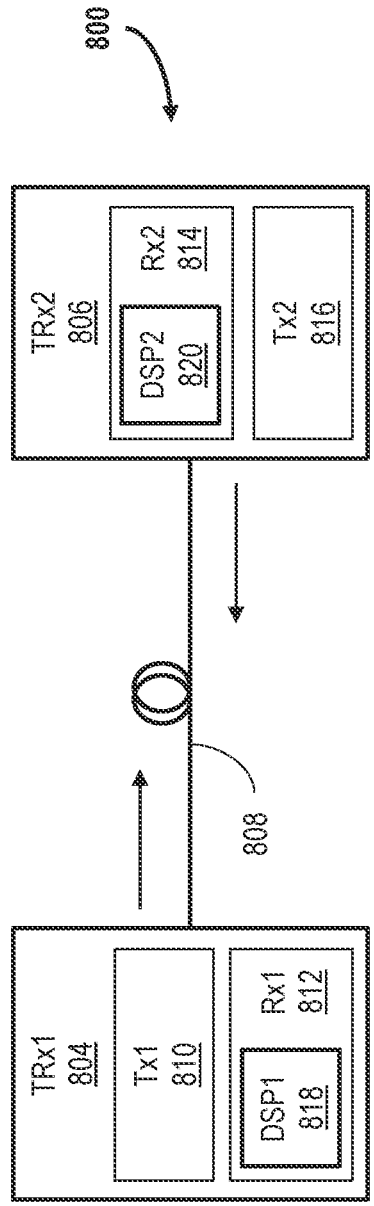
Figure 8B:
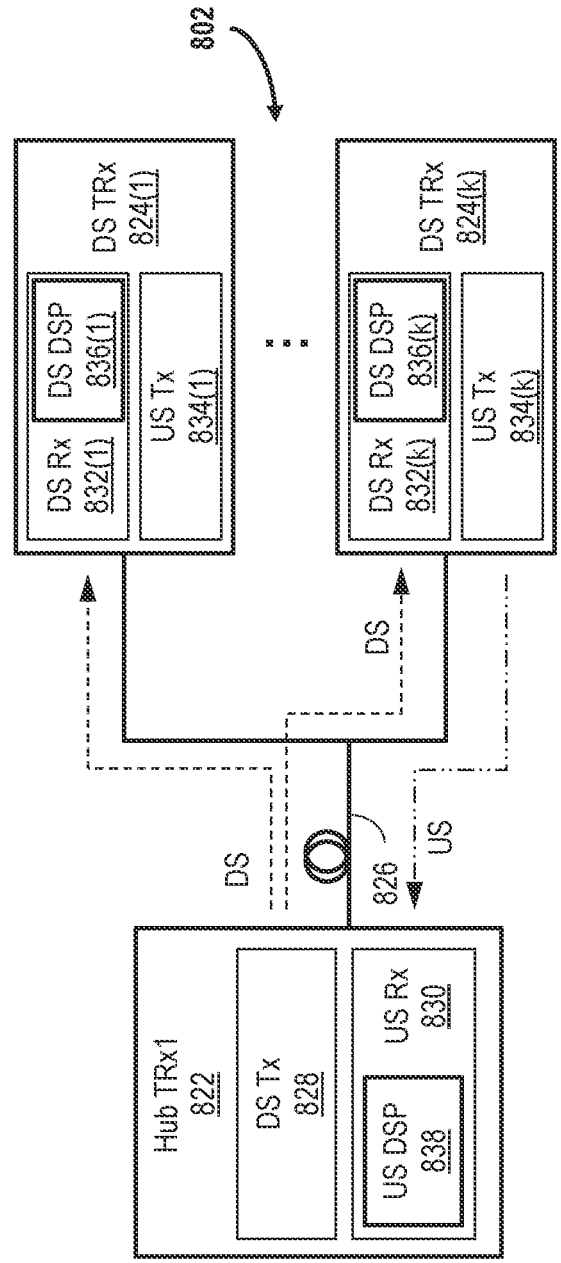

FIGS. 8A-B are schematic illustrations depicting exemplary optical network architectures.

Figure 9:
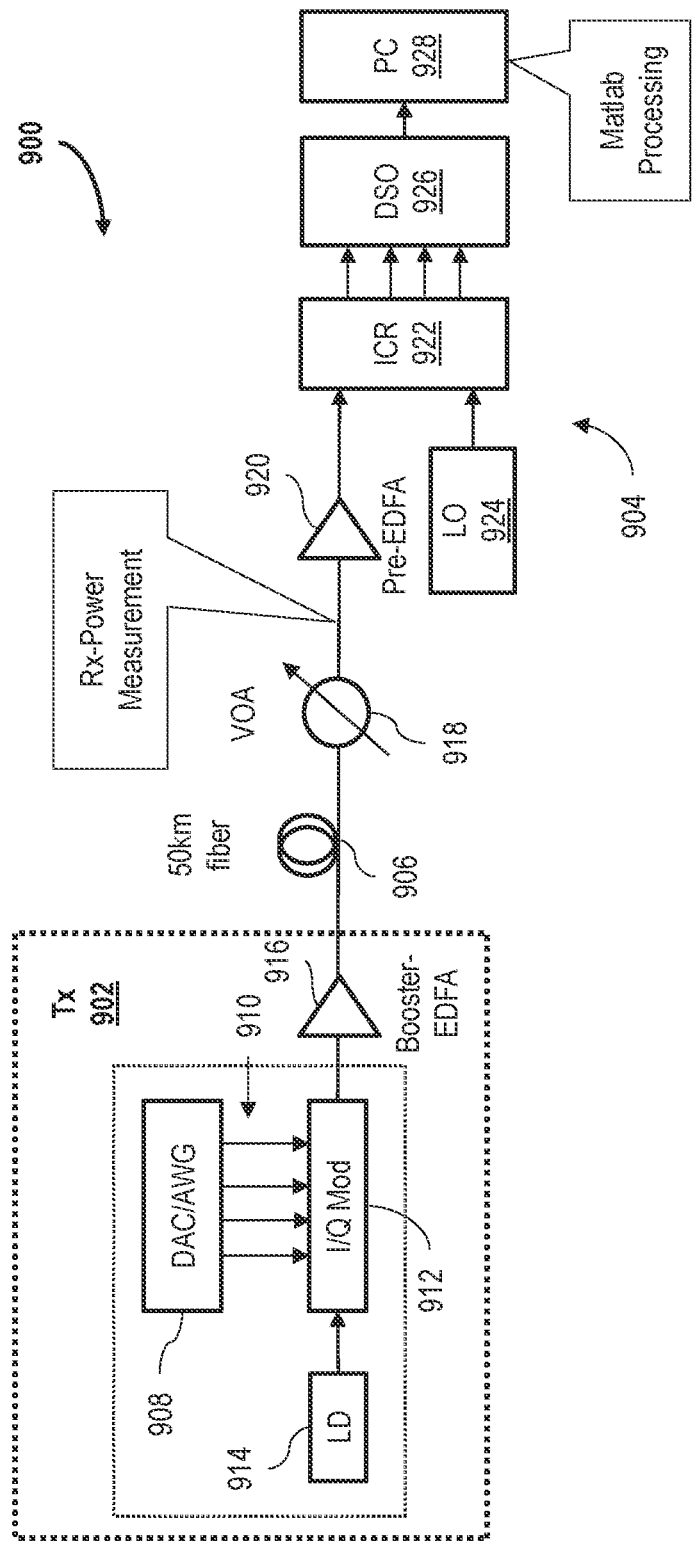

FIG. 9 is a schematic illustration of an exemplary test architecture for verifying experimental results implementing the receiver processing embodiments herein.

Figure 10A:
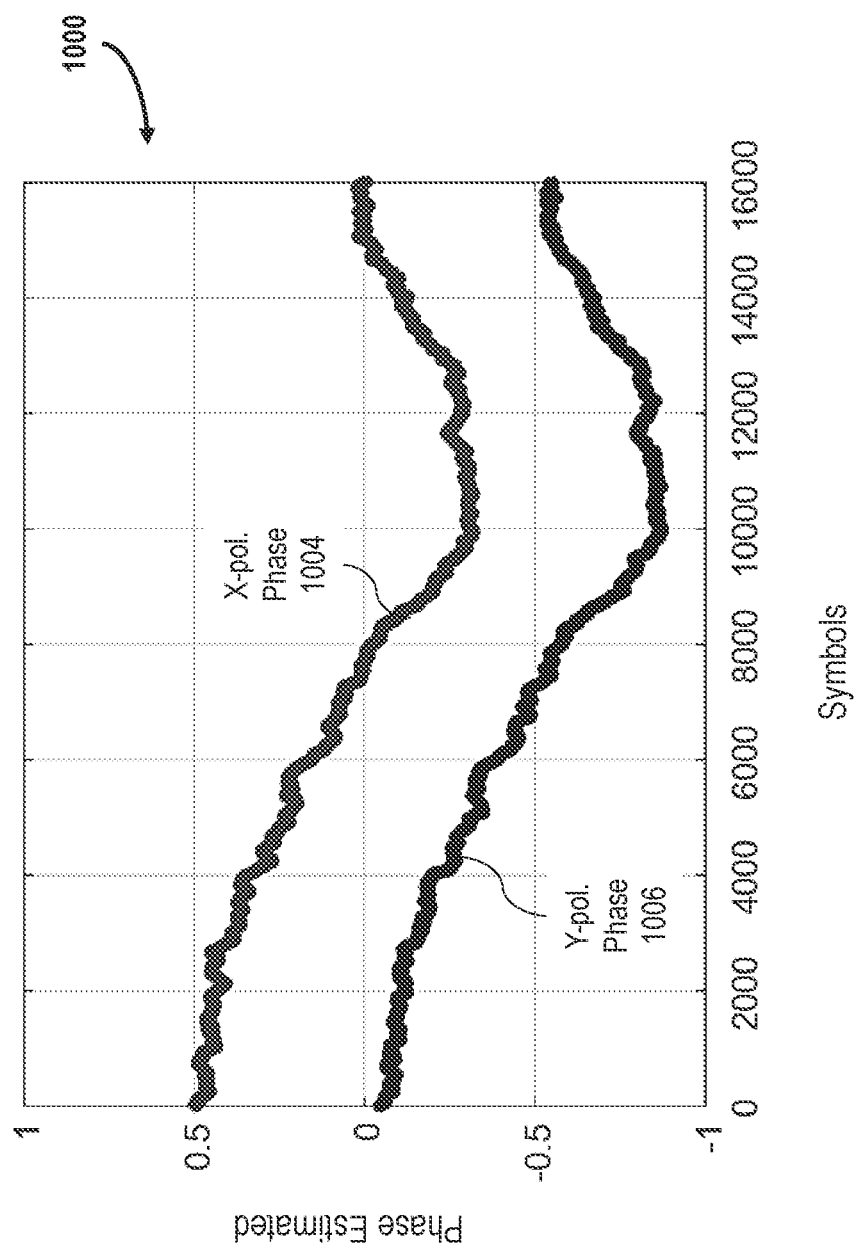
Figure 10B:
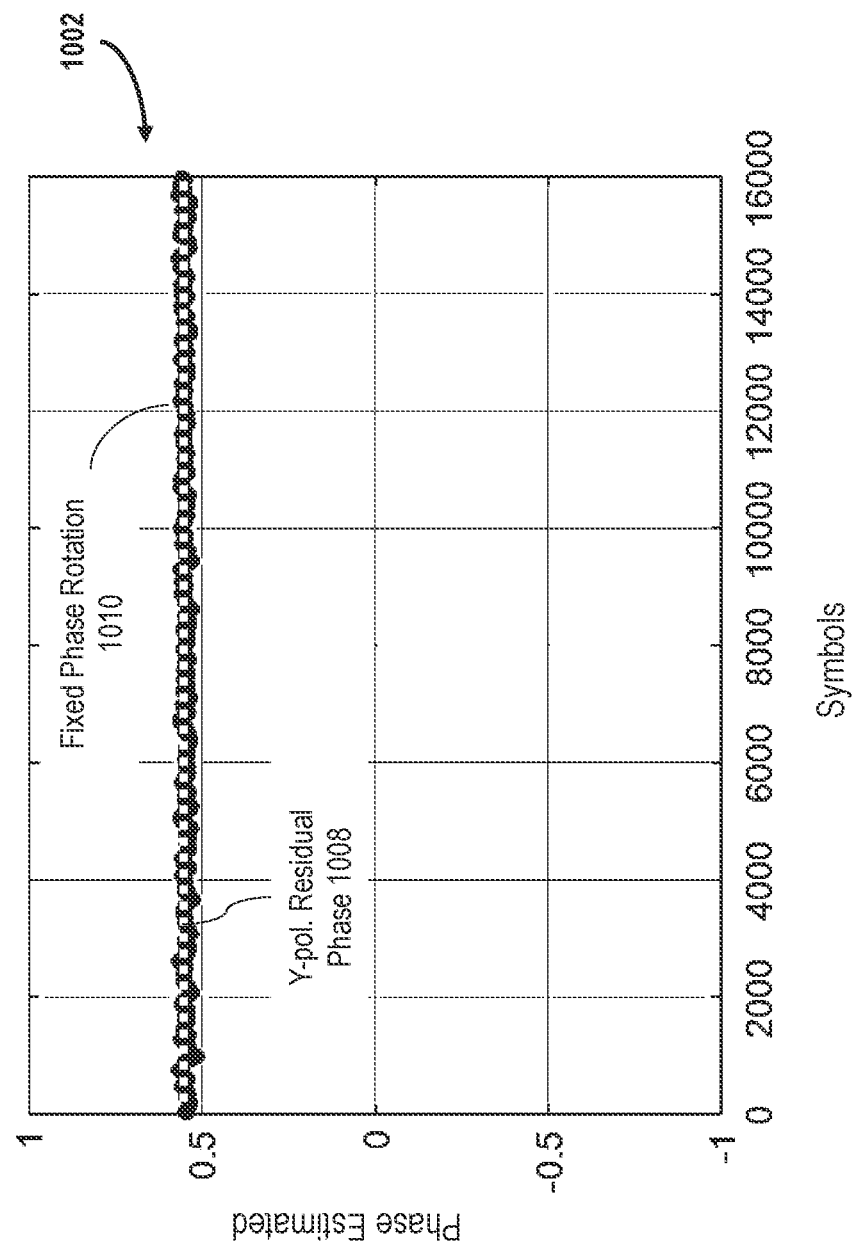

FIG. 10A-B are graphical illustrations depicting experimental phase estimation result plots obtained according to the test architecture depicted in FIG. 9.

Figure 11A:
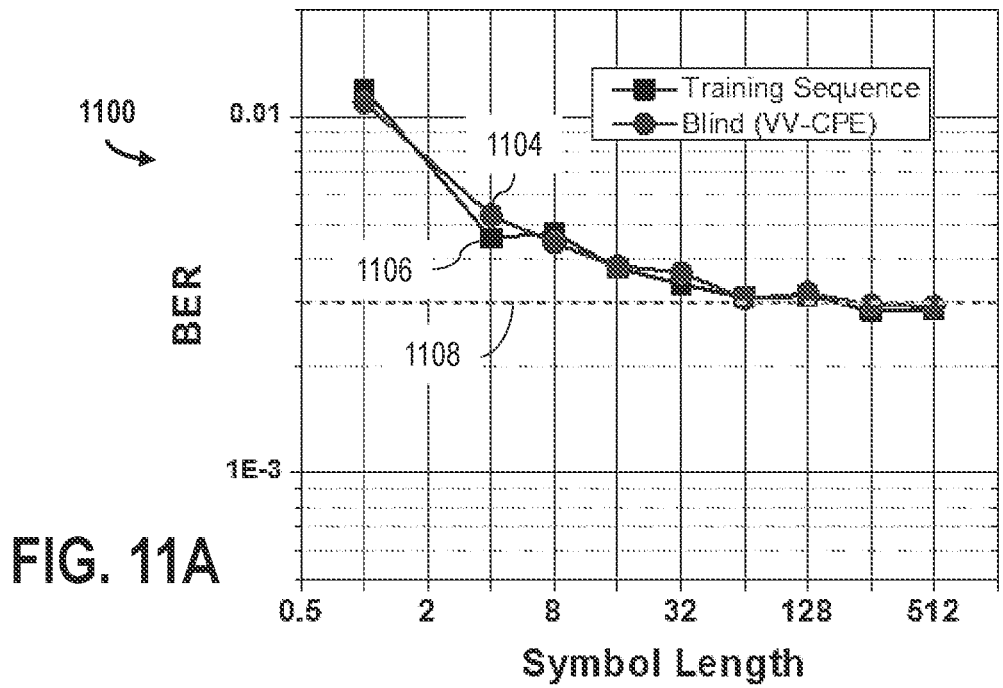
Figure 11B:
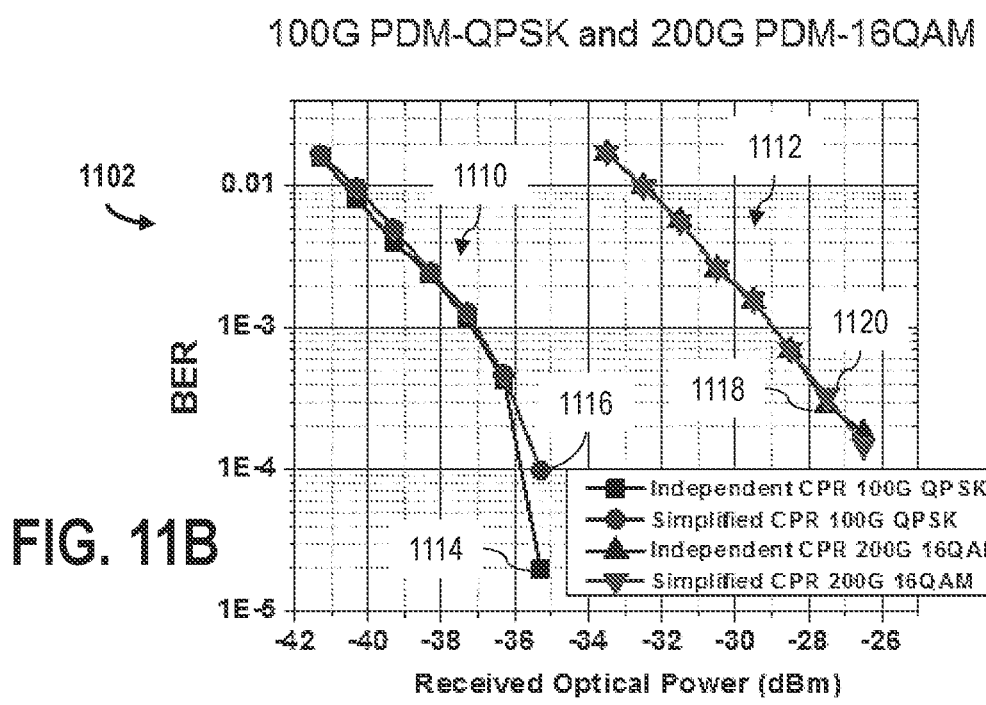

FIG. 11A-B are graphical illustrations depicting comparative bit-error-ratio performance result plots obtained according to the test architecture depicted in FIG. 9.

Figure 12:
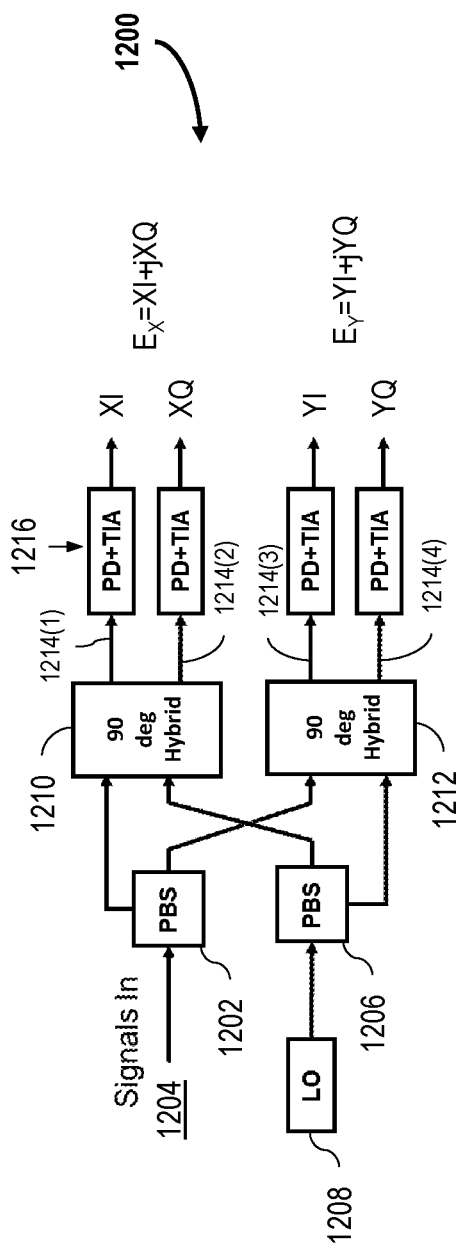

FIG. 12 is a schematic illustration depicting a polarization-diversity coherent receiver.

Figure 13:
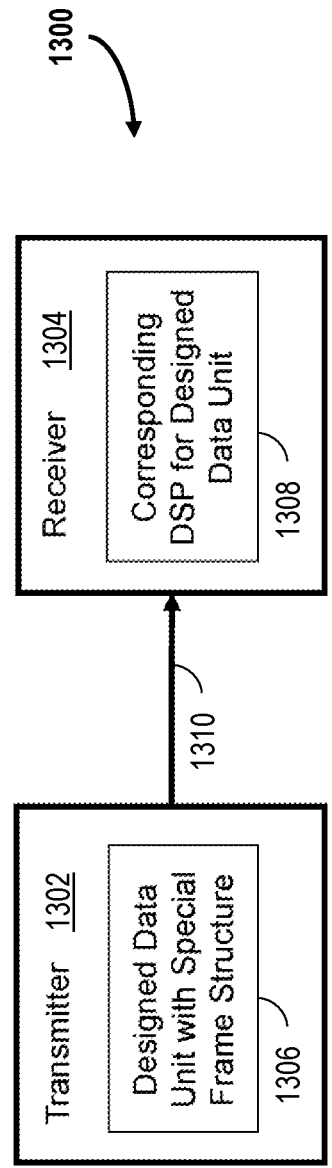

FIG. 13 is a schematic illustration depicting an exemplary network communication system.

Figure 14:
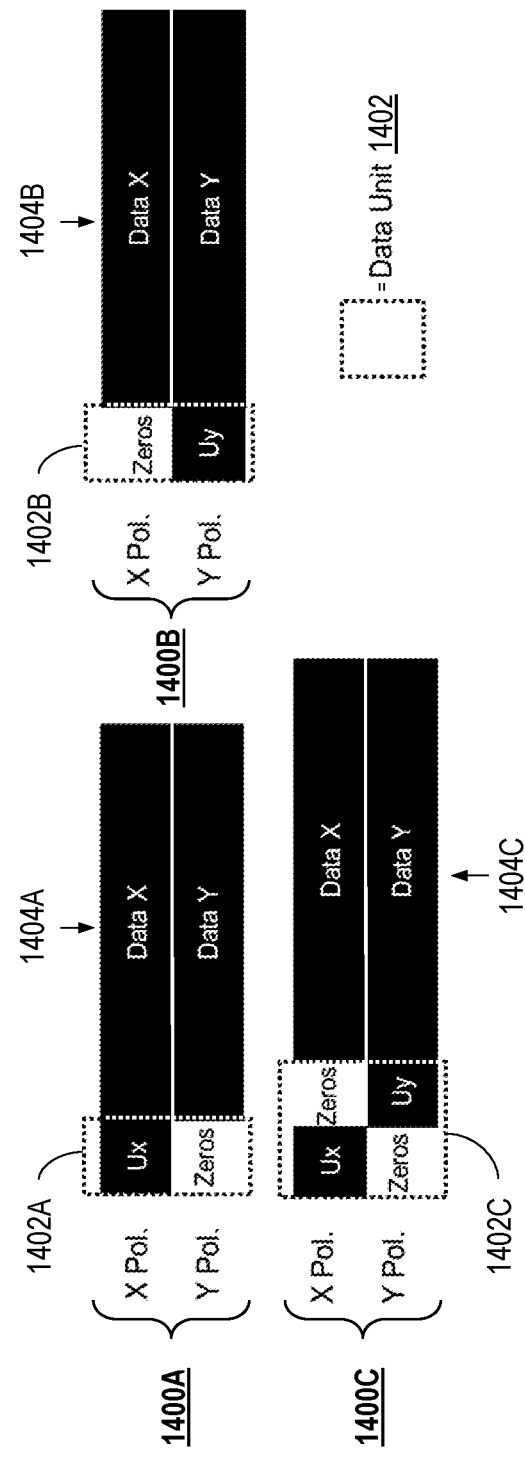

FIGS. 14A-C are schematic illustrations depicting exemplary respective data architectures generated in accordance with the data unit generator depicted in FIG. 13.

Figure 15:
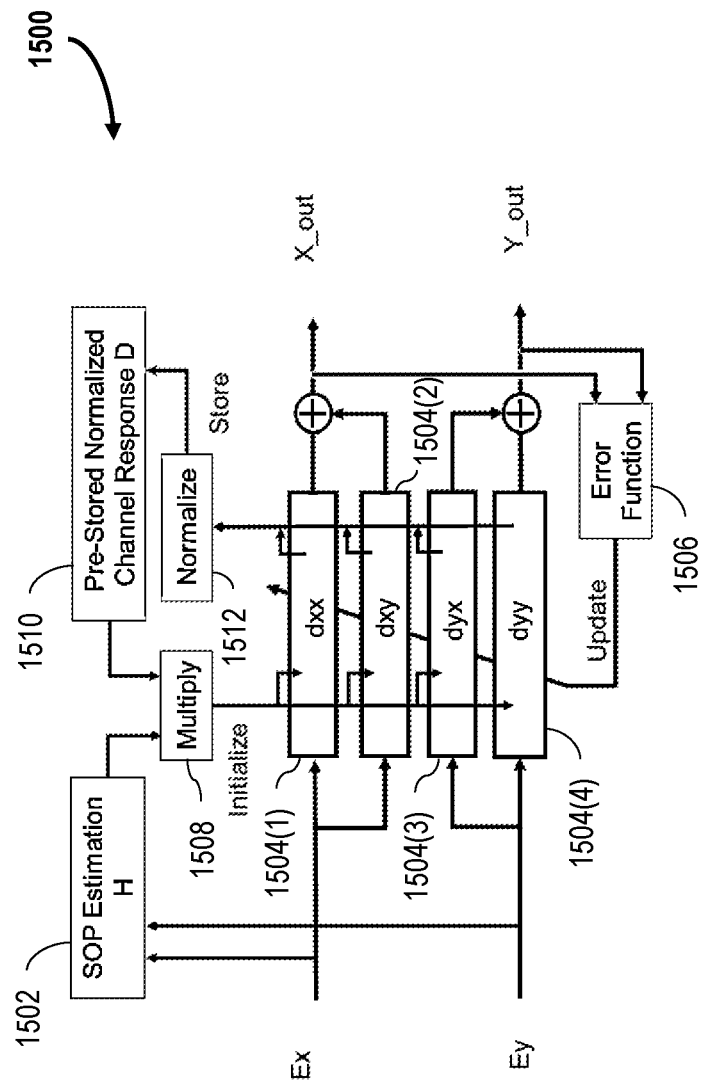

FIG. 15 is a flow diagram depicting an exemplary state-of-polarization estimation technique for digital signal processing.

Figure 16:
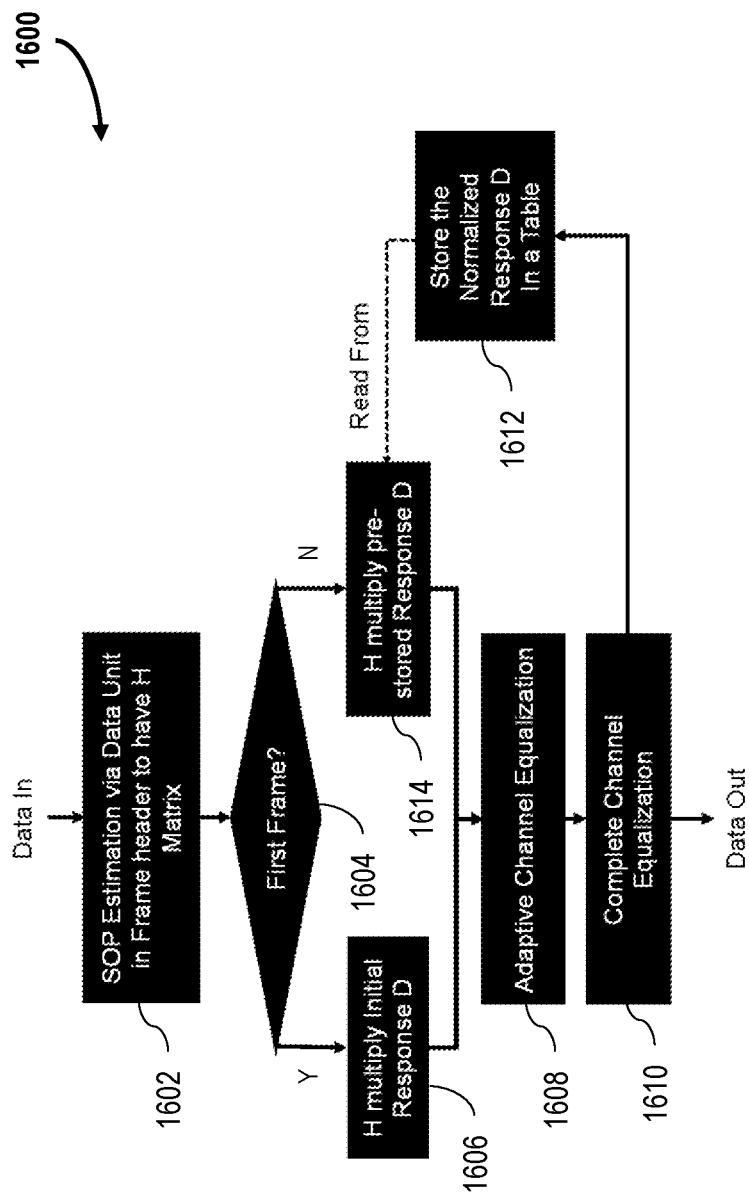

FIG. 16 is a flow diagram depicting an exemplary channel equalization process implementing the estimation technique depicted in FIG. 15.

Figure 17:
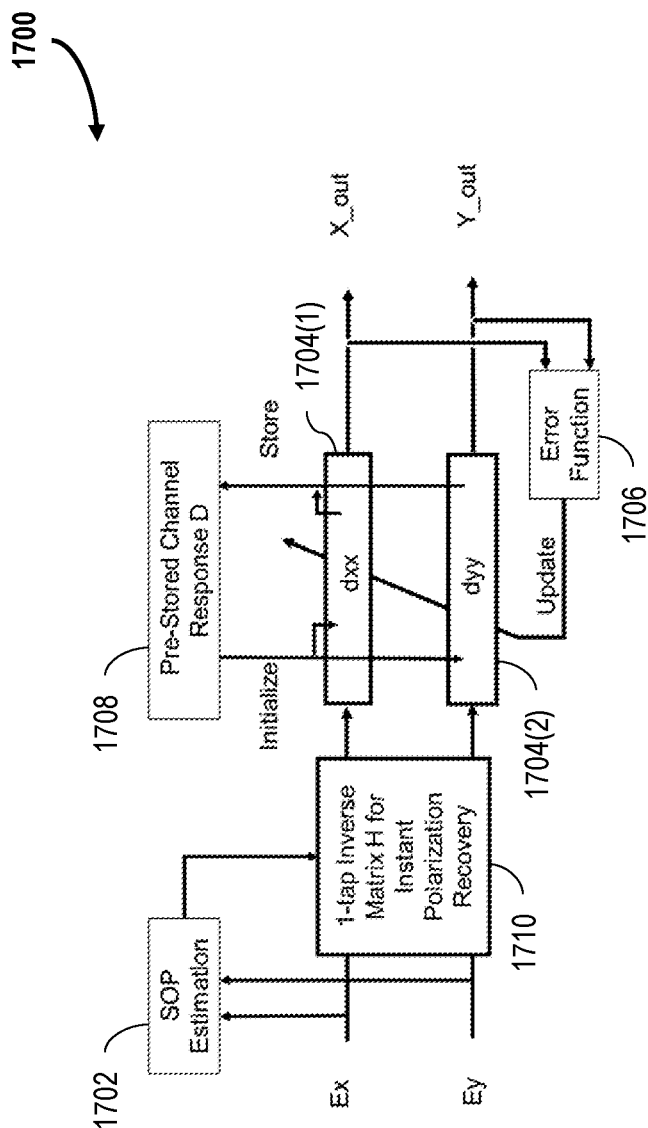

FIG. 17 is a flow diagram depicting an alternative state-of-polarization estimation technique for digital signal processing.

Figure 18:
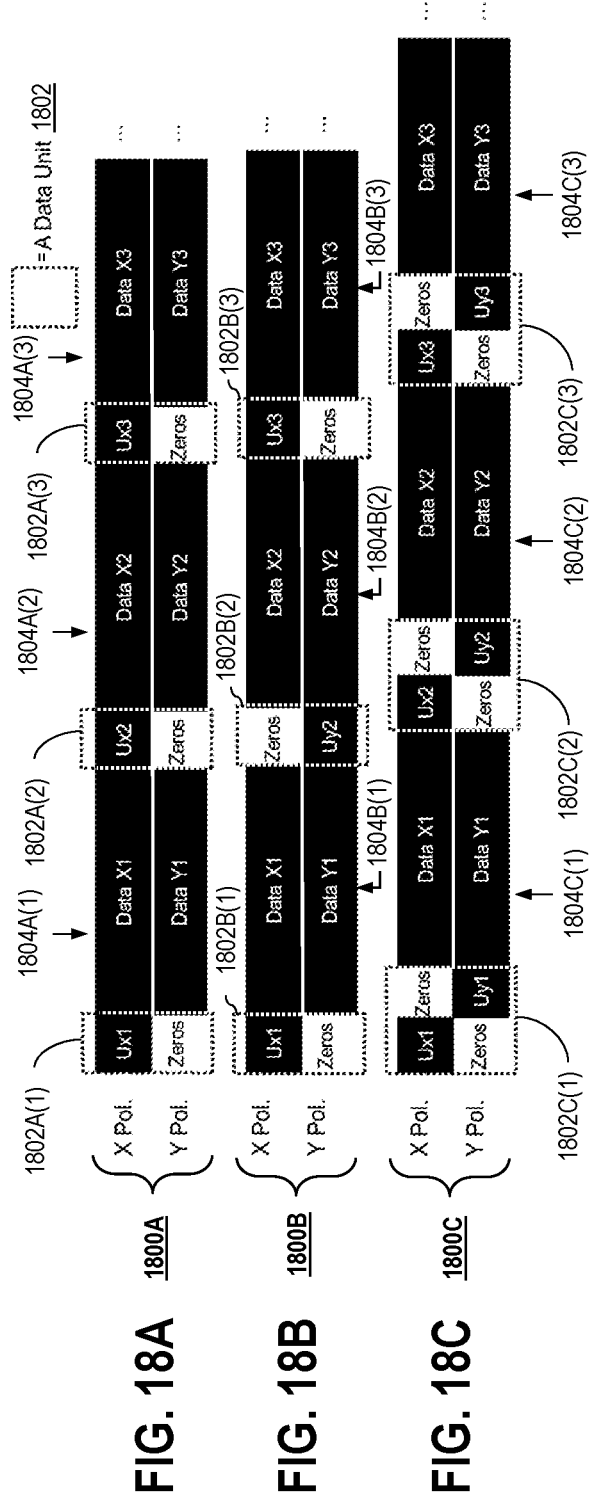

FIGS. 18A-C are schematic illustrations depicting alternative respective data architectures.

Figure 19:
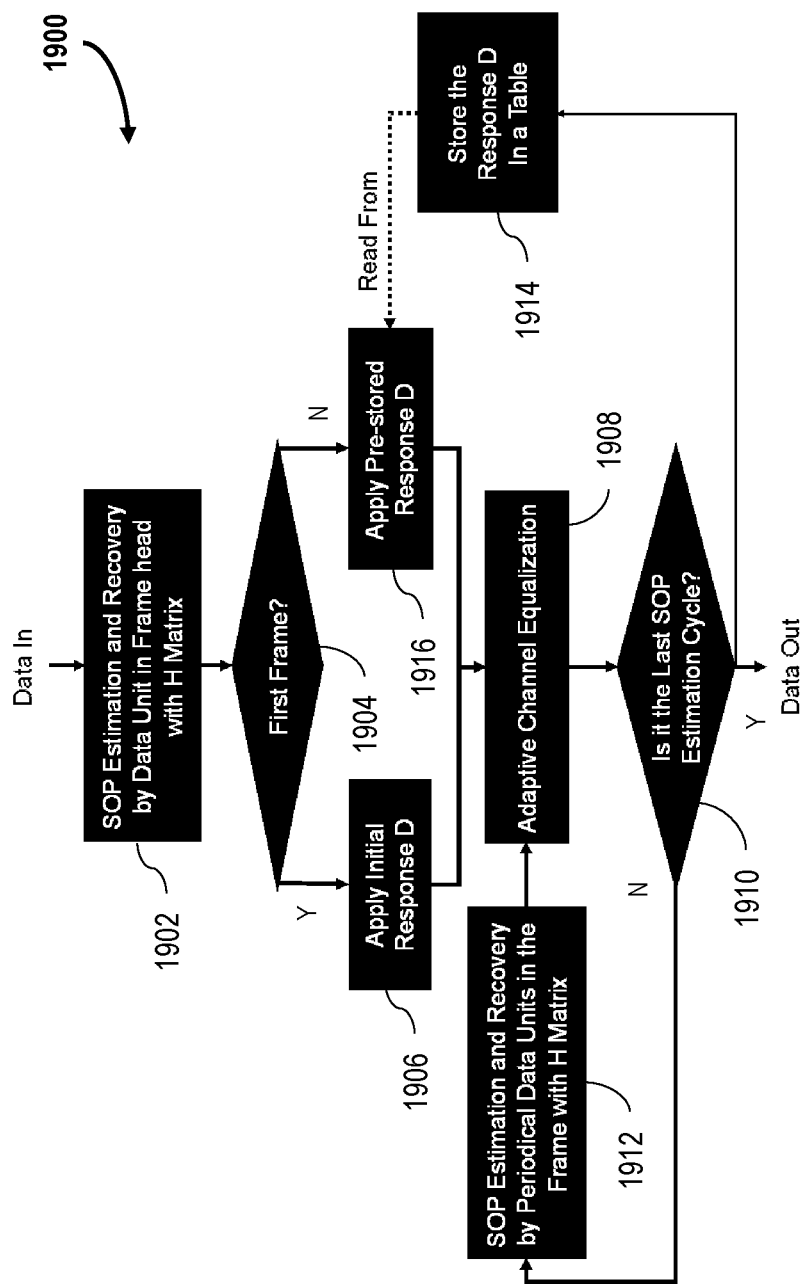

FIG. 19 is a flow diagram depicting an alternative channel equalization process implementing the estimation technique depicted in FIG. 17.

FIG. 20A is a graphical illustration depicting a signal plot before implementation of state-of-polarization estimation and polarization recovery.

FIG. 20B is a graphical illustration depicting a signal plot after implementation of state-of-polarization estimation and polarization recovery.

Figure 21:
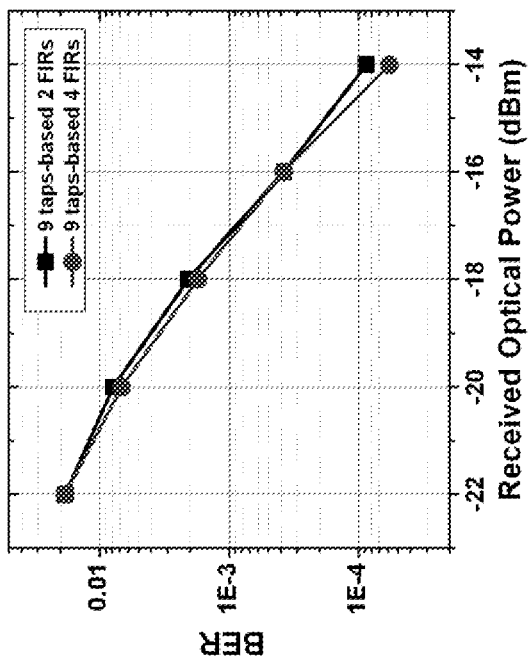

FIG. 21 is a graphical illustration depicting a comparative bit-error-ratio performance result plot obtained according to the techniques depicted in FIGS. 15 and 17.

Figure 22A:
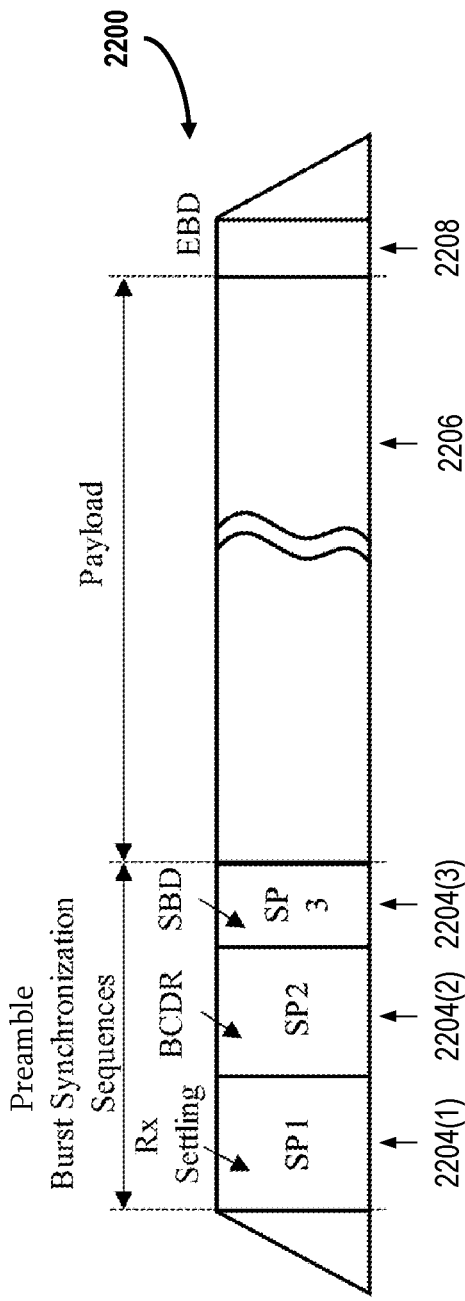

FIG. 22A is a schematic diagram depicting a burst-frame architecture for a conventional direct-detection passive optical network.

Figure 22B:
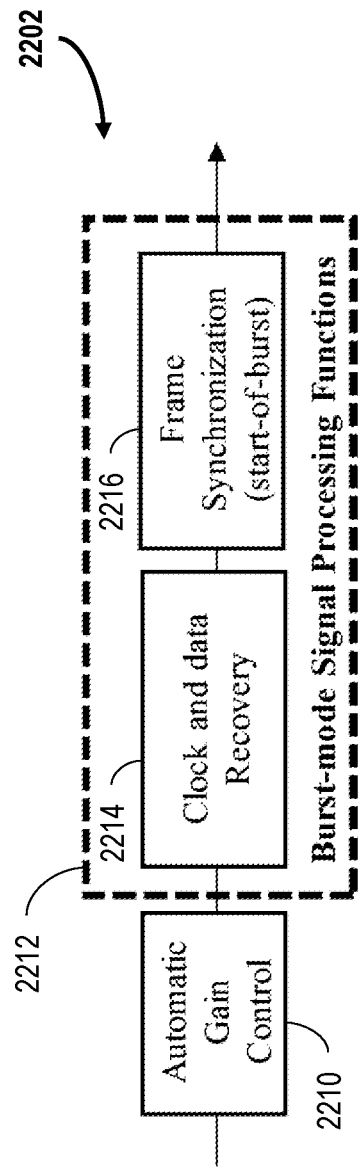

FIG. 22B is a schematic diagram depicting an upstream recovery technique for the direct-detection burst-frame architecture depicted in FIG. 22A.

Figures 23A, 23B:
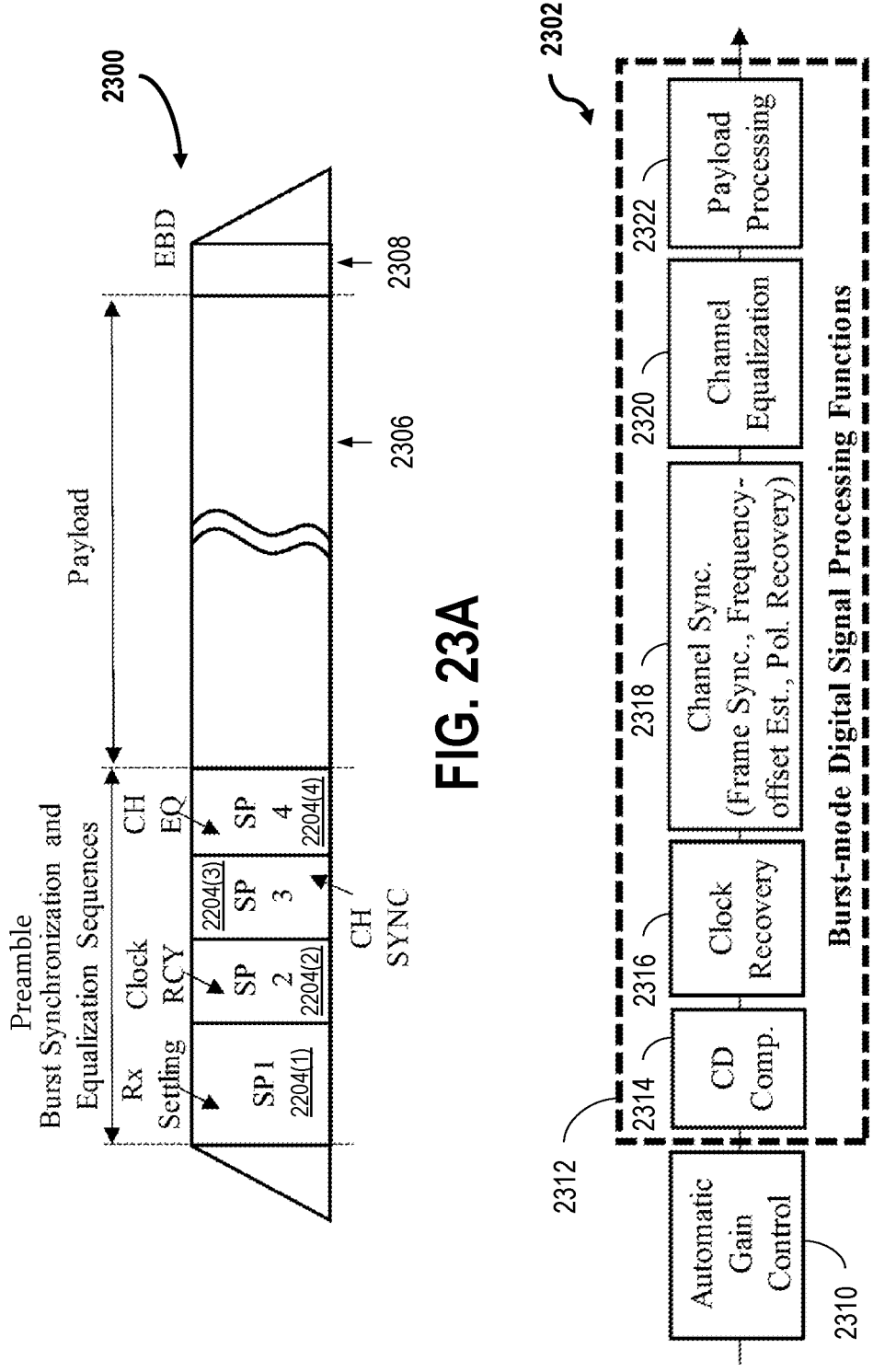

FIG. 23A is a schematic diagram depicting an exemplary burst-frame architecture for a coherent passive optical network.

FIG. 23B is a schematic diagram depicting an exemplary upstream recovery technique for the coherent burst-frame architecture depicted in FIG. 23A.

Figure 24:
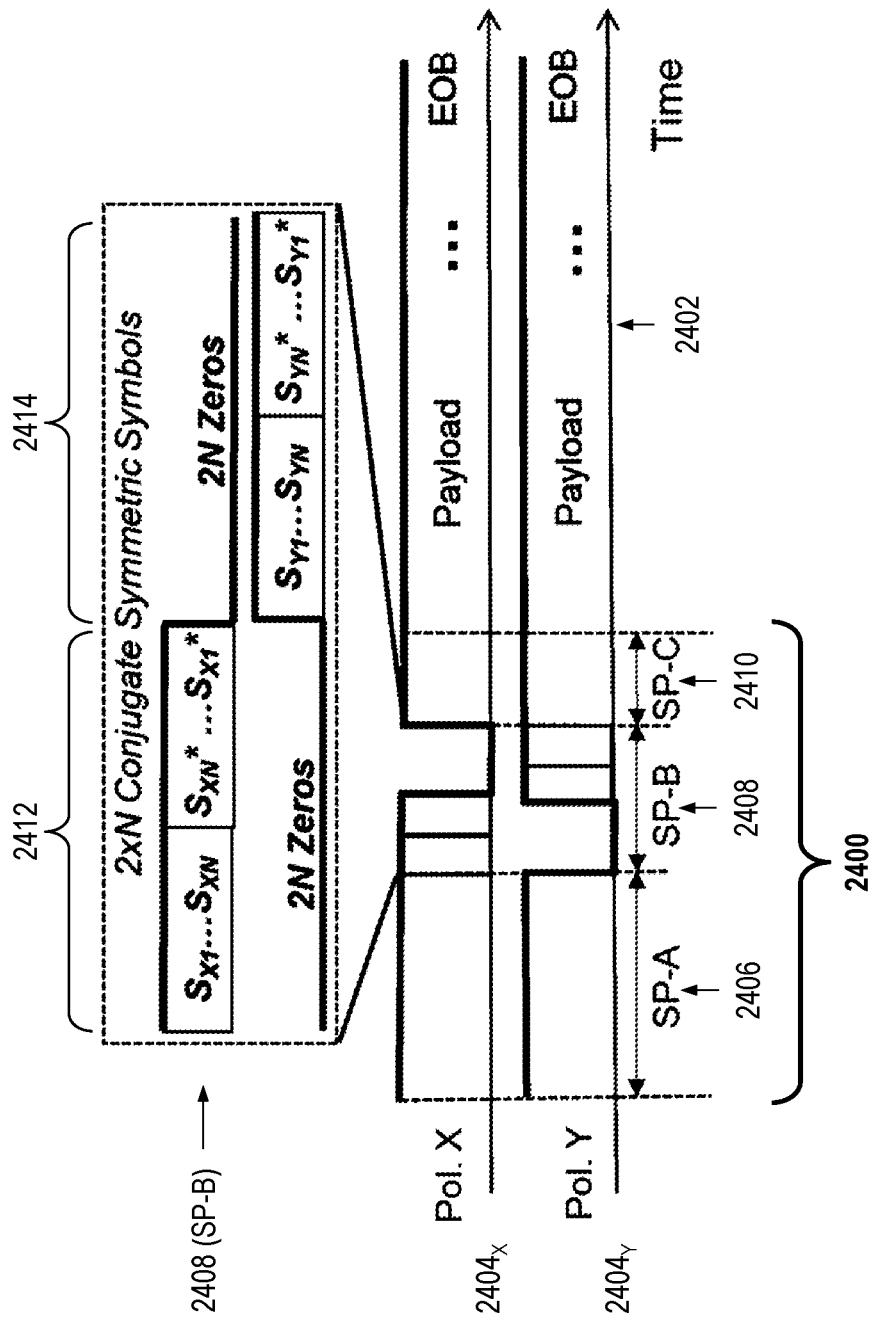

FIG. 24 depicts an exemplary preamble architecture for a coherent burst-mode passive optical network.

Figure 25:
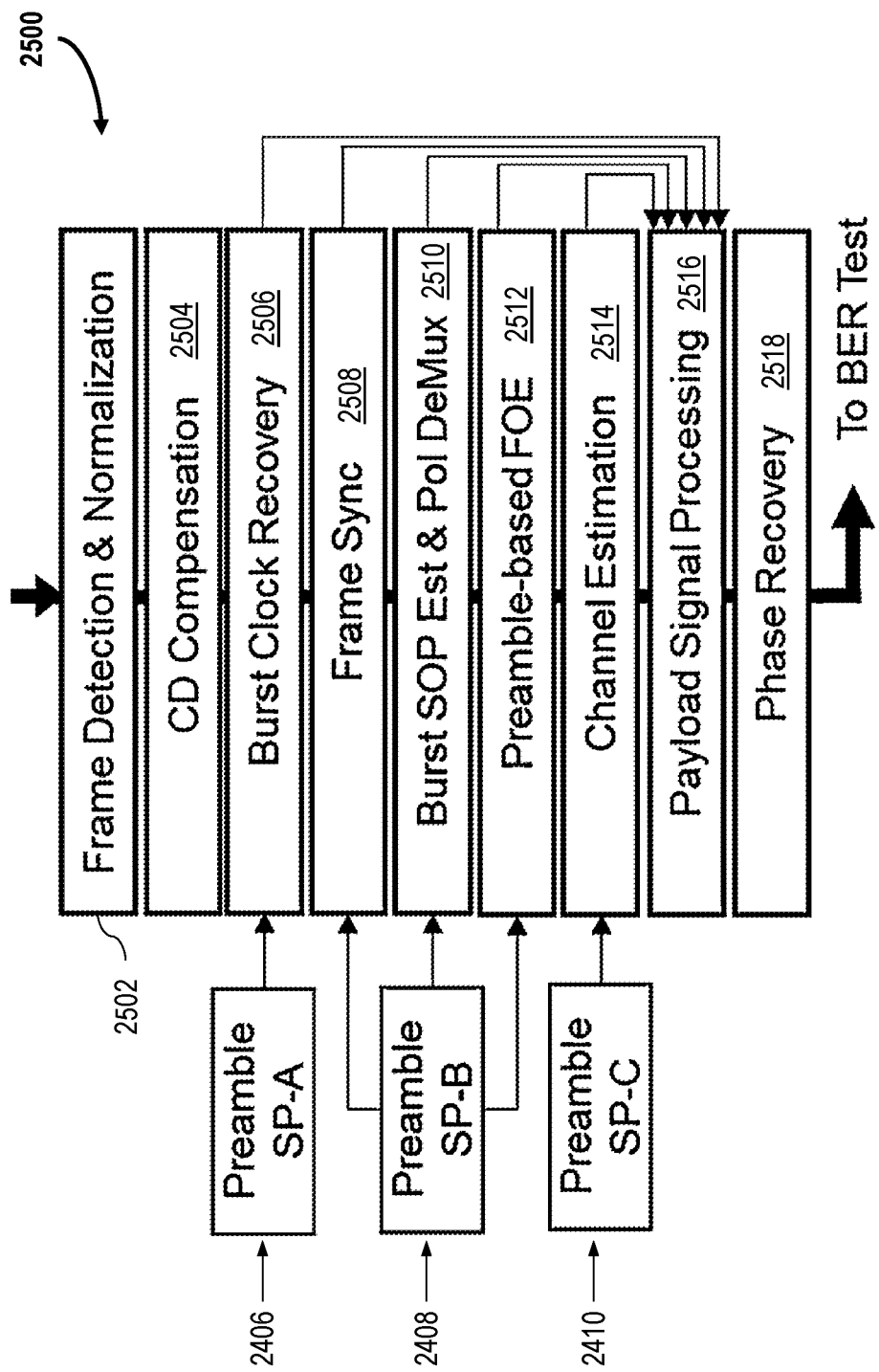

FIG. 25 depicts an exemplary digital signal processor for processing an upstream burst transmission implementing the preamble architecture depicted in FIG. 24.

Figure 26:
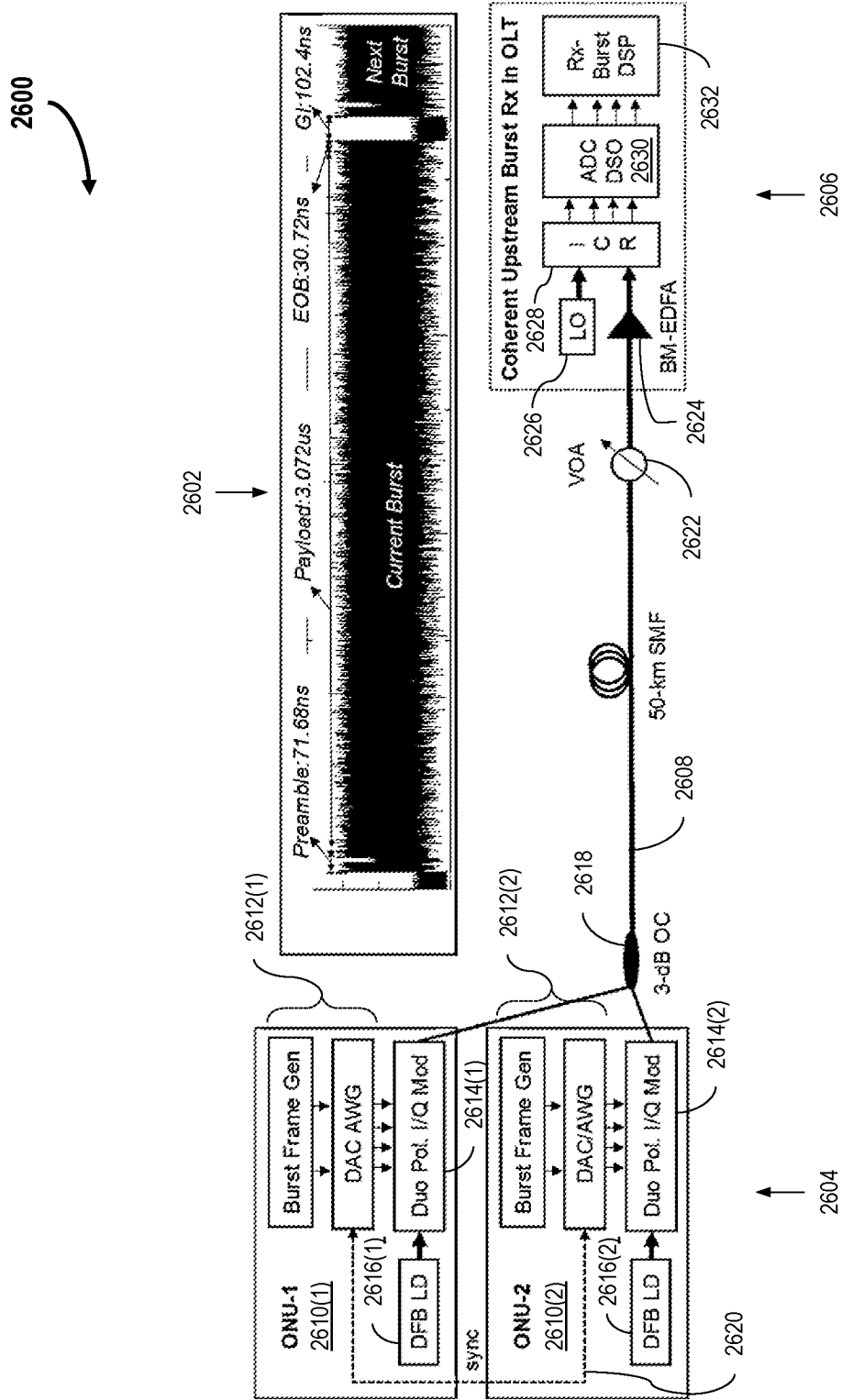

FIG. 26 is a schematic diagram depicting an exemplary test system for upstream burst detection.

FIGS. 27A-D are graphical illustrations depicting respective experimental result plots from the test system depicted in FIG. 26.

Figures 28A, 28B:
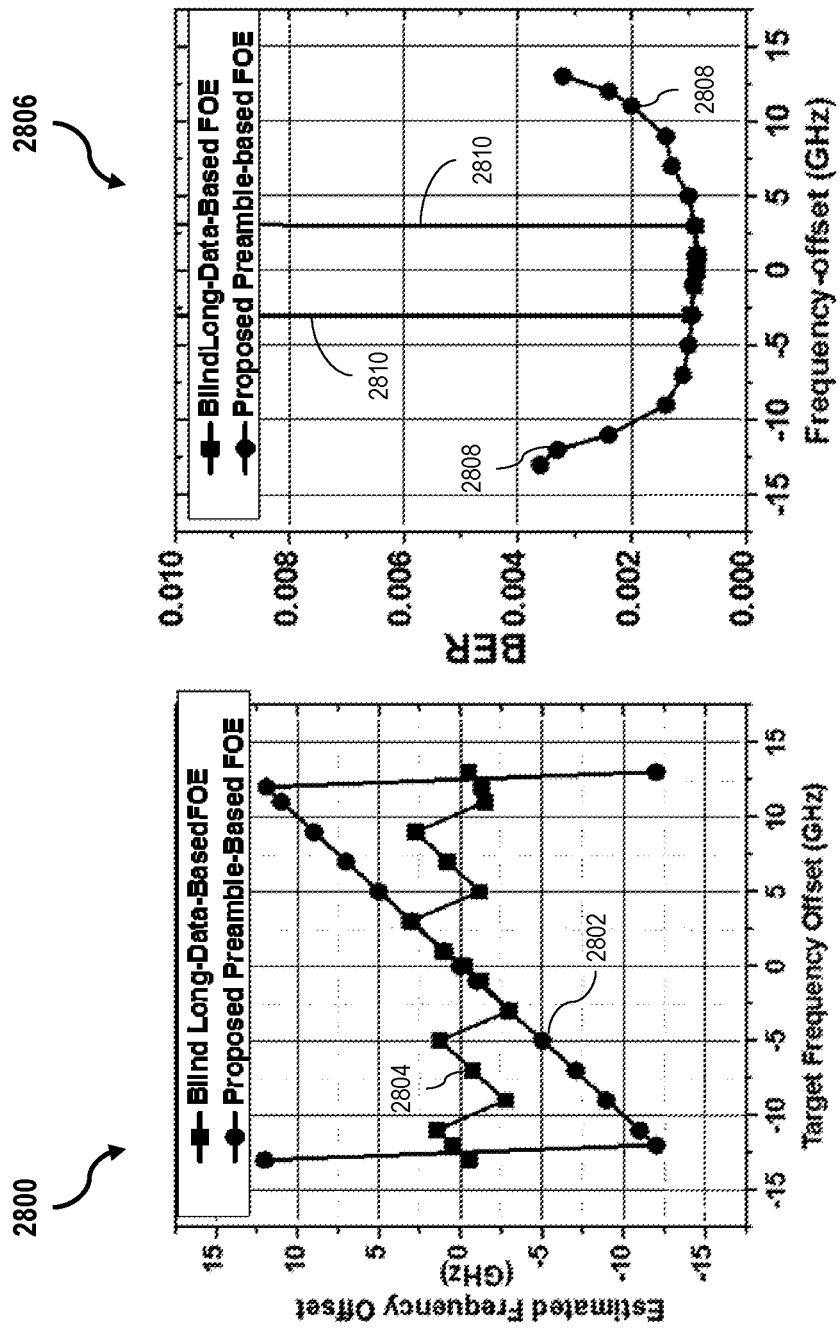

FIG. 28A is a graphical illustration depicting a comparative plot depicting an estimated frequency offset against a target frequency offset.

FIG. 28B is a graphical illustration depicting a comparative bit-error-ratio performance result plot for the subplots depicted in FIG. 28A.

FIG. 29 is a graphical illustration depicting a residual frequency offset plot.

FIG. 30A is a graphical illustration depicting a plot of signal mean square error before channel equalization.

FIG. 30B is a graphical illustration depicting a comparative plot of signal mean square error after channel equalization.

Figure 31:
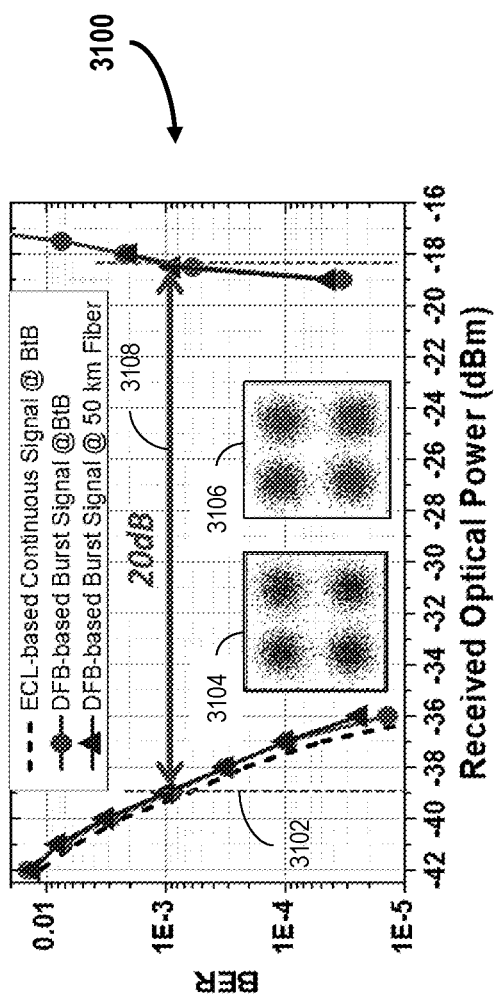

FIG. 31 is a graphical illustration depicting a comparative bit-error-ratio performance result plot.

Figure 32:
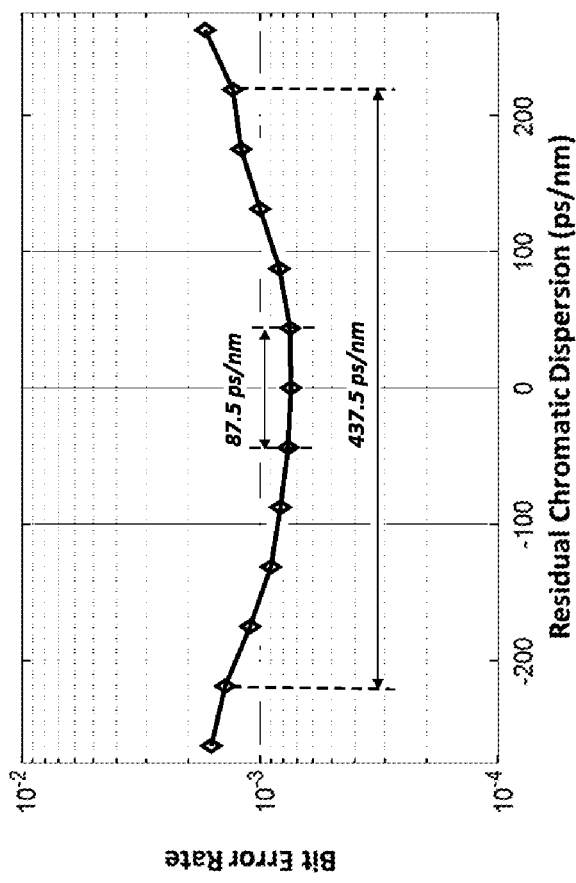

FIG. 32 is a graphical illustration depicting a bit-error-ratio performance plot as a function of residual chromatic dispersion.

Figure 33:
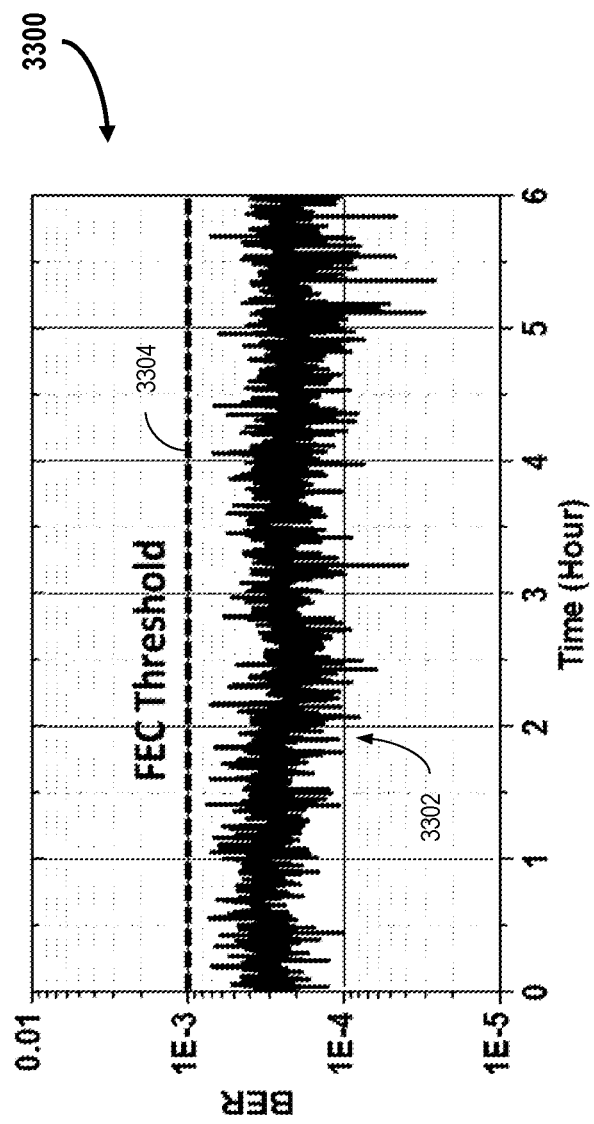

FIG. 33 is a graphical illustration depicting a long-term bit-error-ratio performance result plot.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, unless specified to the contrary, "modem termination system," or "MTS" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "transceiver," unless specified otherwise, refers to a P2P coherent optics transceiver, having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The embodiments described herein provide innovative access network architectures and processes that are useful for achieving simplified carrier phase recovery (CPR) for polarization multiplexed coherent optics in access network applications. In an exemplary embodiment, the present systems and methods leverage coherent optics technologies, and with respect to P2P or P2MP systems and communication links, to significantly improve the cable access network paradigm by reducing the cost, complexity, and power consumption from DSP on a received optical carrier.

In an embodiment, a CPR algorithm is implemented in three DSP steps or subprocesses for one or more single polarization signals: (1) a one-tap state-of-polarization (SoP) estimation/polarization demultiplexing step; (2) a training sequence (TS)-based frequency offset estimation (FOE)/compensation step; and (3) a digital filtering step (e.g., using two digital filters) for channel equalization. The output of the estimated carrier phase and noise from one polarization direction (e.g., X-polarization) may then be used for the signals from the other polarization direction (e.g., Y-polarization) and combined with an estimated fixed phase offset rotation between the two polarizations.

In another embodiment, the communication network includes a differential coded coherent system, such as polarization multiplexed differential quadrature phase shift keying (PM-DQPSK). In this embodiment, a fixed phase offset between the two polarizations is not required, thereby further reducing the total DSP complexity, which enables a significantly more hardware-efficient coherent optical system for the access network.

The following embodiments are described with respect to receivers operating at 100 and 200 Gb/s. However, the person of ordinary skill in the art will appreciate that such operating parameters are described by way of example, and not in a limiting sense. The principles herein are applicable to access networks, PONs, and coherent optics systems operating at different transmission speeds, and particularly as the demand for increased speed and bandwidth continues to grow. The following examples are also described with respect to exemplary fiber links of approximately 50 km. However, the person of ordinary skill in the art will further appreciate that the present techniques support links of up to 80 km, 120 km, or greater in some circumstances.

Figure 1:
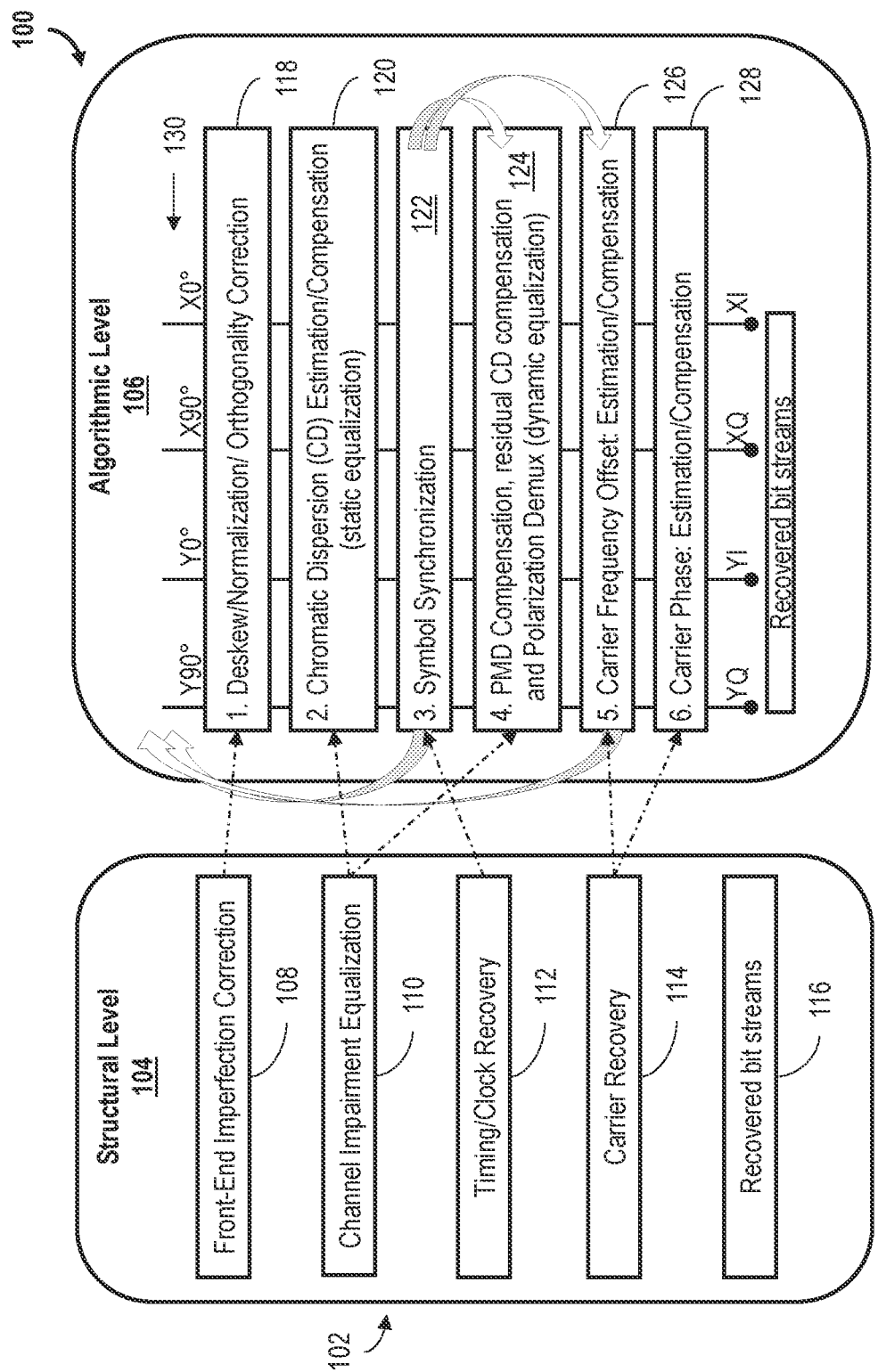
FIG. 1 depicts a digital signal processing flow of a receiver processor.

FIG. 1 depicts a DSP flow 100 of a receiver processor 102. In an exemplary embodiment, receiver processor 102 is a digital coherent optical receiver and DSP flow 100 illustrates the DSP functionality for a polarization multiplexed signal with respect to a structural level 104 and an algorithmic level 106 of processor 102. In an exemplary embodiment, the polarization multiplexed signal may be a dual-polarization (e.g., X/Y) in-phase/quadrature (I/Q) quadrature amplitude modulation (QAM, or PM-QAM) carrier signal. The structural and algorithmic functionality of the coherent optical receiver is described in further detail in co-pending U.S. patent application Ser. No. 16/370,873, filed Mar. 29, 2019, the subject matter of which is incorporated herein by reference.

Structural level 104 may, for example, include one or more of: a first block 108 for compensation of front-end imperfections; a second block 110 for channel impairment equalization and compensation of major channel transmission impairments; a third block 112 for timing and clock recovery; a fourth block 114 for carrier recovery; and a fifth block 116 for bit stream recovery. Algorithmic level 106 may, for example, include one or more of: a first module 118 for deskewing, normalization, and/or orthogonality correction; a second module 120 for chromatic dispersion (CD) estimation or compensation (e.g., static equalization); a third module 122 for symbol synchronization; a fourth module 124 for PMD compensation, residual CD compensation, and/or polarization demultiplexing (e.g., dynamic equalization); a fifth module 126 for estimation and/or compensation of carrier frequency offset; and a sixth module 128 for carrier phase estimation (CPE) and/or compensation.

In exemplary operation of DSP flow 100, four digitized signals 130 (i.e., I and Q components for each X and Y polarization) are passed through first block 108 (i.e., in digital form, for example, after conversion by an ADC) to compensate front-end imperfections. Such front end imperfections may be compensated by one or more correction algorithms of first module 118, which may include a deskew algorithm to correct the timing skew between the four channels resulting from the difference in both optical and electrical path lengths within the coherent receiver, normalization and orthogonality correction algorithms, and/or algorithms to compensate for differences between the respective output powers of the four channels (due to different responses of PINs and/or transimpedance amplifiers (TIAs) in the receiver), as well as quadrature imbalances resulting from a particular optical hybrid not exactly introducing a 90-degree phase shift.

In further operation of DSP flow 100, major channel transmission impairments may be compensated through use of appropriate digital filters of second block 110, which may, through second module 120, utilize estimation and compensation algorithms to address impairments such as CD and PMD. Second module may further include algorithms for performing, based on the different time scales of the dynamics of the respective impairments, static equalization for CD compensation because of its independence of SoP and modulation format, as well as the impact on subsequent blocks of structural level 102 before the CD estimation may be needed to achieve accurate compensation.

At third block 112, clock recovery for symbol synchronization may be processed within structural level 102 to track the timing information of incoming samples, for example, using third module 122. In an embodiment, joint processing between third block 112 and fourth module 124 may be performed to achieve symbol synchronization within algorithmic level 104 after all channel impairments are equalized (e.g., as represented by respective arrows indicated in FIG. 1). In at least one embodiment, a fast-adaptive equalization subprocess may be jointly performed for two polarizations within fourth module 124 through a butterfly structure and stochastic gradient algorithms, such as a constant modulus algorithm (CMA) and variants thereof. Fourth module 124 may further include one or more additional algorithms for further PMD compensation, residual CD compensation, and/or polarization demultiplexing (e.g., dynamic equalization).

At fourth block 114, carrier recovery is performed in cooperation with fifth module 126, which may include one or more algorithms to perform carrier frequency offset estimation or compensation. In an embodiment, fifth module 126 may further include algorithms configured to estimate, and then remove, the frequency offset between a source laser (not shown in FIG. 1) and a local oscillator (LO), to prevent the constellation rotation at the intradyne frequency. Within sixth module 128, algorithms may be configured such that the carrier phase noise may be estimated and removed from the modulated signal, which may further include algorithms for symbol estimation and hard or soft-decision forward error correction (FEC) for channel decoding. At fifth block 116, the final bit streams may be recovered at both structural level 104 and algorithmic level 106.

It may be noted that, for a particular digital coherent receiver, the ordering of blocks and modules for DSP flow 100 may, according to design choices at the receiver, differ from the order described above. For example, instead of, or in addition to, a feed-forward process, joint processing and feedback among different process blocks may be performed, including without limitation, clock recovery and polarization demultiplexing.

In some embodiments, a coherent receiver may include fewer, or additional, blocks and/or modules than those described herein. For example, an alternative algorithmic level architecture is described below with respect to FIG. 2. In other embodiments, similar functionality may be achieved through use of training sequences, data-aided, or blinded algorithms, as described further below with respect to FIGS. 3-7.

Coherent detection and DSP technologies have thus been key factors enabling the development of 100G coherent optical transmission systems. DSP technology has played in even more ubiquitous role, at both the transmitter and receiver, and the development of 200G coherent optical systems, and this trend is expected to continue in the development of further next-generation coherent optical systems. Although specific algorithms may be different for each block or module of the DSP, general functionality at the structural level (e.g., structural level 104) or functional abstractions (e.g., algorithmic level 106) are expected to be similar for relevant commercial products implementing such technology.

Figure 2:
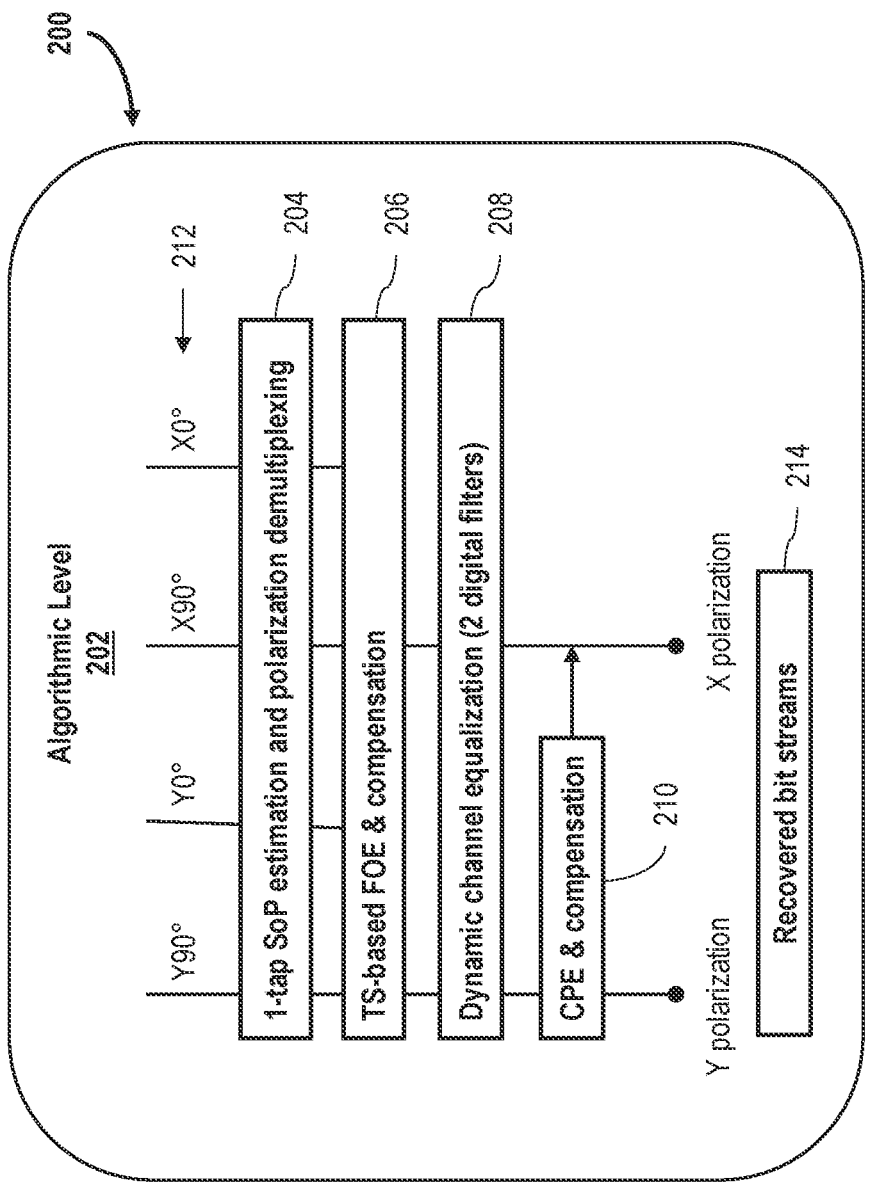
FIG. 2 depicts an exemplary digital signal processing flow in an algorithmic level of the receiver processor depicted in FIG. 1.

FIG. 2 depicts an exemplary DSP flow 200 in an algorithmic level 202 of receiver processor 102, FIG. 1. In an exemplary embodiment, algorithmic level 202 replaces algorithmic level 106, FIG. 1, within receiver processor 102. In some embodiments, algorithmic level 202 may include one or more algorithms, modules, or subprocesses of algorithmic level 106 in a complementary fashion.

In the exemplary embodiment, algorithmic level 202 may, for example, include one or more of: a first module 204 for performing SoP estimation and polarization demultiplexing (e.g., 1-tap); a second module 206 for performing training sequence (TS)-based FOE and compensation; a third module 208 for performing dynamic channel equalization (e.g., two digital filters); and a fourth module 210 for performing carrier phase estimation (CPE) and compensation.

In exemplary operation of DSP flow 200, first module 204 and second module 206 are all configured to functionally process all four of digitized signals 212 for the respective I/Q components of the X/Y polarizations, similar to the various respective modules of algorithmic level 106. In the embodiment depicted in FIG. 2 though, third module 208 may be configured to functionally process one component 212 from each polarization (e.g., YQ and XQ signals 212, in this example). The operational functionality of first module 204, second module 206, and third module 208 is otherwise described in greater detail in co-pending U.S. application Ser. No. 16/412,104, filed May 15, 2019, the subject matter thereof which is incorporated by reference herein.

Although similar in functional operation, fourth module 210 particularly differs from sixth module 128, FIG. 1, in that whereas sixth module 128 is configured to perform carrier phase estimation and compensation on all four signals 130 (i.e., the I/Q components of both X/Y polarizations), fourth module 210 is configured such that carrier phase estimation/compensation need be performed on one of only the I/Q components of one of the two polarizations (e.g., the YQ signal 212, in the example depicted in FIG. 2). That is, DSP flow 200 represents a significantly simplified algorithmic DSP flow in the digital optical coherent receiver for the optical access network, in comparison with algorithmic level 106 of DSP flow 100, FIG. 1. Accordingly, the following DSP embodiments are described with particular focus on the innovative simplified DSP techniques of fourth module 210 that produces recovered bit streams 214 for both X and Y polarizations, but through performance of CPE on only one such polarization signal 212.

According to the innovative embodiments described herein, the complexity of the DSP flow in the receiver processor is advantageously reduced such that the processor need not implement fixed CD compensation. Instead, as illustrated in the embodiment depicted in FIG. 2, the accumulated CD in the access network may be alternatively compensated within third module 208 (i.e., dynamic channel equalization). Moreover, the complexity of DSP flow 200 is still further reduced, in comparison with DSP flow 100 or conventional techniques, by the performance of adaptive polarization demultiplexing and PMD compensation with multiple taps in a single processing block/module, namely, first module 204. That is, a single tap is employed for SoP tracking and polarization demultiplexing prior to channel equalization (e.g., an third module 208). By separating these two functional blocks/modules within DSP flow 200, single polarization equalization may be achieved with two digital finite impulse response (FIR) filters, as opposed to conventional systems that implement a butterfly-based bank configuration with four finite impulse response (FIR) filters and crossing computation.

Thus, in comparison with conventional techniques, systems and methods according to the "simplified" configuration of DSP flow 200 are capable of reducing the DSP computational complexity by 50% for adaptive equalization functionality. In an exemplary embodiment of DSP flow 200, TS-based frequency-offset estimation and compensation may be further achieved (e.g., through implementation of second module 206) using a training sequence having an optimized length with respect to the single-polarization signals, or with respect to the average of the dual-polarization signals. Accordingly, after frequency offset correction (e.g., second module 206) and channel equalization (e.g., third module 208) accomplished, carrier phase recovery (CPR) may then be achieved at, or by implementation of, fourth module 210.

Figure 3:
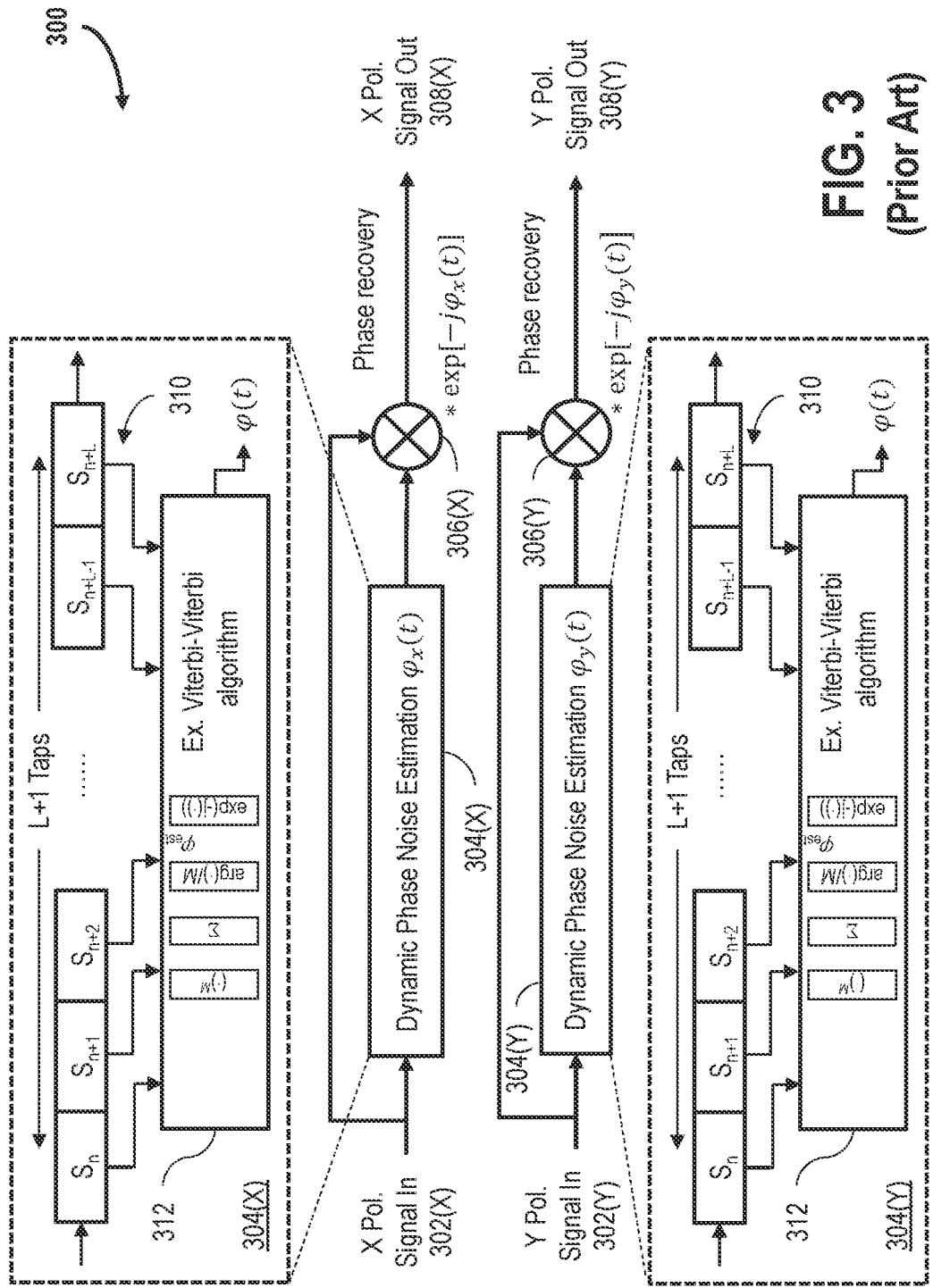
FIG. 3 is a schematic illustration depicting a conventional carrier phase recovery process for a dual-polarization carrier by a receiver processor.

FIG. 3 is a schematic illustration depicting a conventional CPR process 300, for a dual-polarization carrier input signal 302, by a receiver processor (not separately shown). For each single polarization of input signal 302 (i.e., 302(X) and 302(Y)), process 300 passes the original input signal 302 through a respective dynamic phase noise estimation unit 304. An output of unit 304 is then combined, at a respective mixer 306, with the original input signal 302 to achieve phase recovery and generate an output signal 308 for the respective single X- or Y-polarization of the dual-polarization carrier. In this example, unit 304 includes a plurality of taps 310 and a phase estimation module 312. Phase estimation module 312 implements, for example, a Viterbi-Viterbi (VV) CPR algorithm or a blind-phase-search (BPS) algorithm to obtain the phase estimate, $\varphi(t)$, for the respective single-polarization such that mixer 306 achieves phase recovery through a function $e^{-j\varphi(t)}$ based on that phase estimate (i.e., $e^{-j\varphi_x(t)}$ for the X-polarization and $e^{-j\varphi_y(t)}$ for the Y-polarization).

In further operation of conventional CPR process 300, dynamic phase noise estimation unit 304 includes L+1 taps 310 for L-tap symbols S. The symbols S are used for phase estimation of the center symbol $S_{n+L/2}$, based on, for example, a $4^{th}$ power VV CPR or BPS algorithm. In the case where input signal 302 is a QPSK signal having four phase states, the received complex symbols of the QPSK signal are first raised to the $4^{th}$ power to remove modulation, leaving only the phase noise present. Center symbol $S_{n+L/2}$ is then added to N predecessors and successors to average the estimated phase. In conventional CPR process 300, because the phase varies over a range of $2\pi$, the estimated phase must be "unwrapped" to provide a continuous and unambiguous phase estimation. After the phase unwrapping, estimated phase error compensation is performed with respect to the received complex symbols.

Again, and as illustrated in the example depicted in FIG. 3, conventional CPR process 300 requires that the processing for phase estimation is performed independently for each of the X-polarization and the Y-polarization signals. These conventional techniques, therefore, require considerable processing resources for complex dual-polarization signals, which presents particular challenges to the implementation of DSP processing in the developing near-future access network paradigm. An innovative solution is challenges is described further below with respect to FIG. 4.

Figure 4:
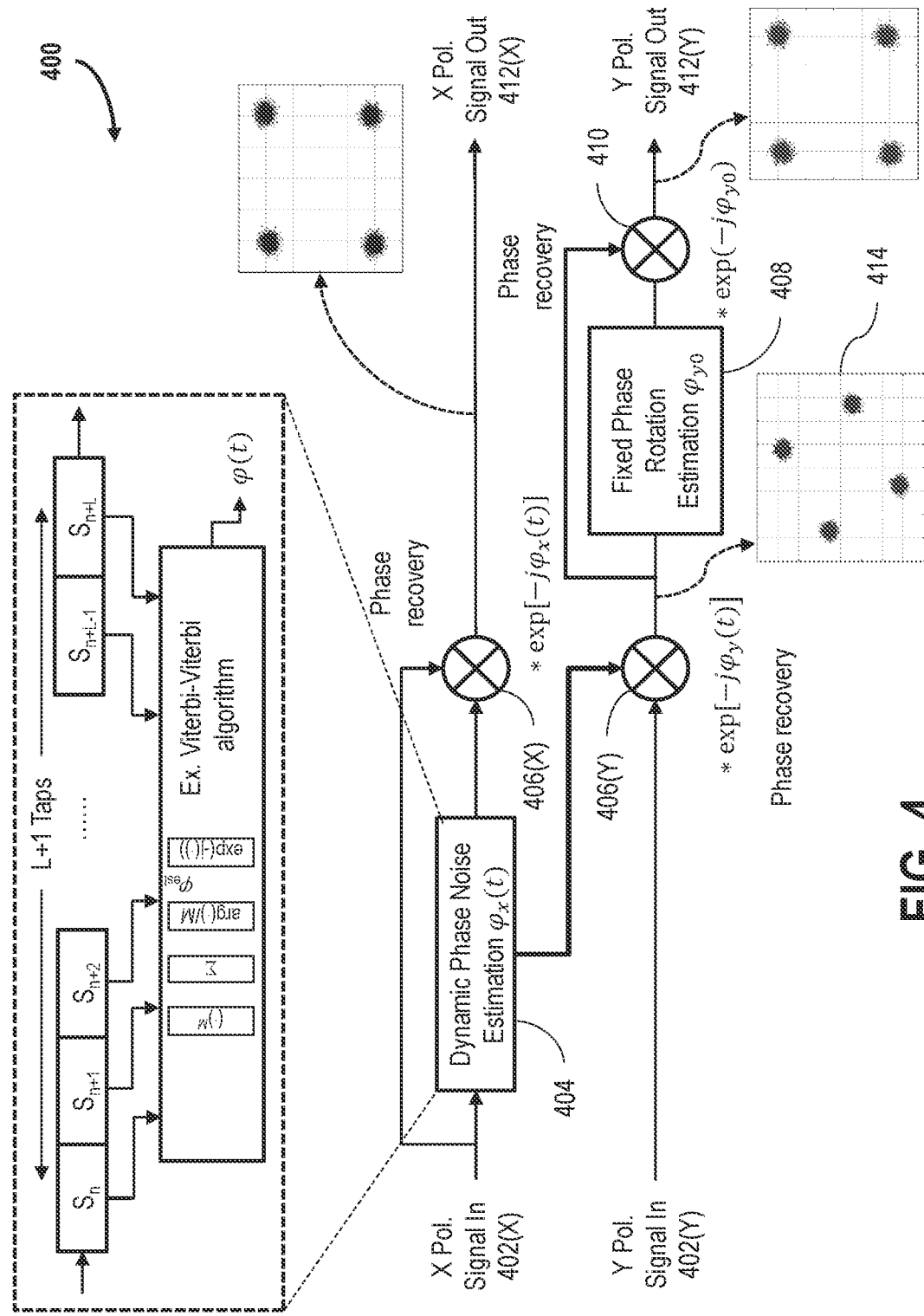
FIG. 4 is a schematic illustration depicting an exemplary carrier phase recovery process for a dual-polarization carrier by a receiver processor, in accordance with an embodiment.

FIG. 4 is a schematic illustration depicting an exemplary CPR process 400 for performing carrier phase recovery and compensation on a dual-polarization carrier input signal 402 by a receiver processor (e.g., processor 102, FIG. 1). CPR process 400 is architecturally similar, in some respects, to conventional CPR process 300, FIG. 3. CPR process 400 differs though, from conventional CPR process 300 in that CPR process 400 utilizes a single dynamic phase noise estimation unit 404 for both of the X-polarization and the Y-polarization portions (i.e., input signals 402(X) and 402 (Y), respectively) of input signal 402. In an exemplary embodiment, unit 404 may be similar in structure and functionality to dynamic phase noise estimation unit 304, FIG. 3, and similarly processes only a single-polarization input signal 402 (e.g., input signal 402(X), in this example). Different from unit 304, however, unit 404 outputs to both of two dynamic mixers 406(X) and 406(Y) for the two polarizations, respectively. Dynamic mixers 406(X) and 406(Y) may be otherwise similar to respective mixers 306 (X) and 306(Y), FIG. 3.

CPR process further differs from conventional CPR process 300 in that CPR process 400 may include, for the other single-polarization lane (e.g., Y-polarization, in this example), a fixed phase rotation estimation unit 408 and a fixed mixer 410 configured to receive an output from unit 408. More specifically, dynamic mixer 406(X) combines single-polarization input signal 402(X) with an output of single-polarization dynamic phase noise estimation unit 404 (e.g., $\varphi_x(t)$-based, in this example). Thus, in the example depicted in FIG. 4, phase recovery for an X-polarization output signal 412(X) is thereby achieved from dynamic mixer 406(X) through the function $e^{-j\varphi_x(t)}$.

In contrast, dynamic mixer 406(Y) combines single-polarization input signal 402(Y) with the same $\varphi_x(t)$-based output of the single dynamic phase noise estimation unit 404. Since a phase recovery output 414 of mixer 406(Y) is based on the function $e^{-j\varphi_x(t)}$, output 414 will exhibit rotation with respect to X-polarization output signal 412(X). Accordingly, in the example depicted in FIG. 4, output 414 is passed through fixed phase rotation estimation unit 408, and the output of unit 408 (e.g., $\varphi_{y0}$-based) is then combined with output 414 at fixed mixer 410 to achieve phase recovery for a Y-polarization output signal 412(Y) through a function $e^{-j\varphi_{y0}}$ relating to unit 408. The person of ordinary skill in the art will understand, through comprehension of the present description and illustrations, that either polarization direction may be selected for processing through the single dynamic phase noise estimation unit.

Therefore, according to the innovative configuration of CPR process 400, a simplified and hardware-efficient DSP flow (e.g., DSP flow 200, FIG. 2) is accomplished. In an exemplary embodiment, CPR process 400 is accomplished in two stages: (1) phase noise estimation using only a single polarization direction; and (2) phase recovery for both polarization directions using the same single-polarization-based phase noise estimation. More particularly, phase noise estimation is performed in the first stage at only a single polarization direction, and this single-direction estimate for the first polarization signal is thus also shared with the second polarization signal to accomplish phase recovery for both polarizations in the second stage. In the exemplary embodiment, phase recovery of the second polarization signal may further utilize fixed phase rotation estimation and recovery through implementation of data-aided or blind estimation processes.

Thus, according to the present systems and methods, DSP processing for a dual-polarization carrier signal be effectively accomplished through performance of only one dynamic phase noise estimation processing stage for both polarizations of the dual-polarization signal. Dynamic phase noise estimation processing is time varying, with high computational complexity. The innovative configuration depicted in FIG. 4 advantageously reduces this computational burden and complexity by approximately half. Whereas the particular example for CPR process 400 described herein does include an additional fixed phase rotation estimation that is not performed in conventional CPR process 300, FIG. 3, this fixed phase rotation estimation is considered, in comparison with dynamic phase noise estimation, to be a one-time process having a relatively negligible computation complexity. An exemplary technique for performing fixed phase rotation estimation is described below with respect to FIG. 5.

Figure 5:
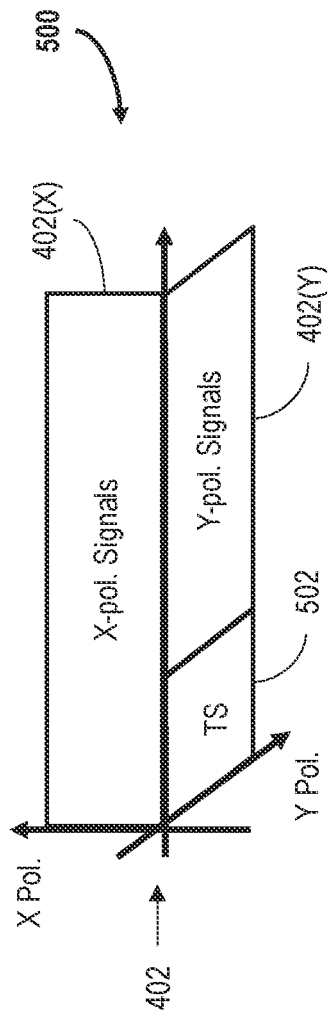
FIG. 5 is a graphical illustration depicting an exemplary fixed phase rotation estimation subprocess for the carrier phase recovery process depicted in FIG. 4.

FIG. 5 is a graphical illustration depicting an exemplary fixed phase rotation estimation subprocess 500 for CPR process 400, FIG. 4. In an exemplary embodiment, subprocess 500 may be implemented at fixed phase rotation estimation unit 408 for the second polarization direction that is not subject to dynamic phase noise estimation (i.e., through unit 404). Thus, according to the exemplary embodiment depicted in FIG. 4, because X-polarization input signal 402(X) and Y-polarization 402(Y) originate from the same carrier, subprocess 500 is able to advantageously leverage the relationship between these two signal portions to utilize a single dynamic estimation from only one signal polarization to achieve CPR for both signal polarizations. That is, even though the phase of the respective individual signal polarizations may change substantially in relation to one another (e.g., from multiple DSP stages on the individual polarization lanes), fixed phase estimation subprocess 500 may utilize one or more training sequences 502 in the second polarization signal (i.e., signal 402(Y), in this example) to achieve a TS-based estimate for phase recovery of the second polarization signal portion.

More particularly, and as illustrated in the example depicted in FIG. 5, a training sequence, Ts, is inserted into second input signal polarization 402(Y) to coincide with first input signal polarization 402(X). Thus, a given Ts 502 may be represented according to [$Ts_1$, $Ts_2$, . . . $Ts_N$], where N represents the training length in the Y-polarization direction. In this manner, a received signal, Rs, at the X-polarization is [$Rs_1$, $Rs_2$, . . . $Rs_N$], and may represent input signal 402(X), which may have been subject to FOE and channel equalization (e.g., from second module 206 and third module 208, respectively, FIG. 2), and after dynamic phase noise estimation (e.g., by dynamic phase noise estimation unit 404, FIG. 4). Using these values, subprocess 500 is able to determine the fixed phase rotation $\varphi_{y0}$ according to:

$$\varphi_{y0} = \text{avg}(\text{angle}(Rs/Ts)) \qquad (\text{Eq. 1})$$

Figure 6:
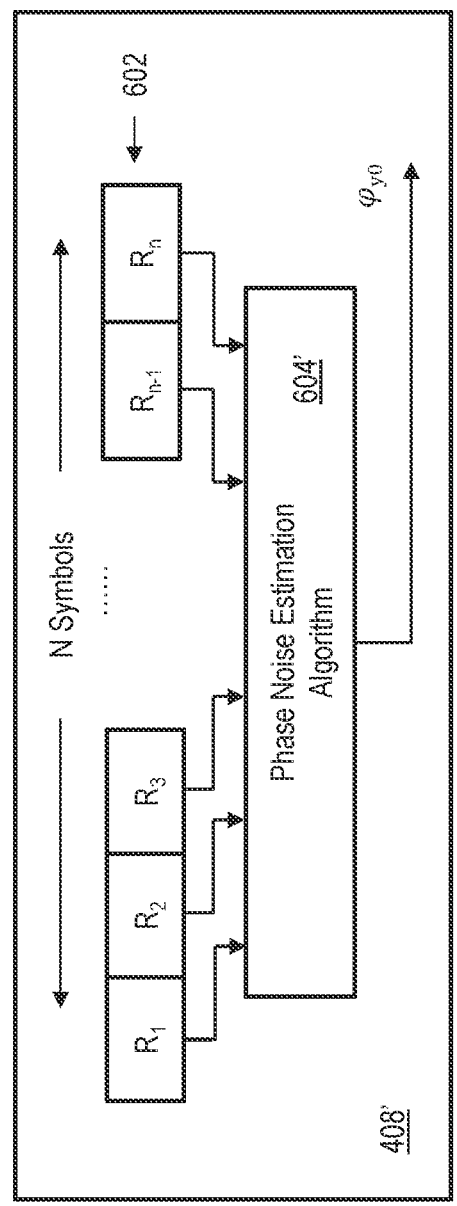
FIG. 6 is a graphical illustration depicting an alternative fixed phase rotation estimation subprocess for the carrier phase recovery process depicted in FIG. 4.

FIG. 6 is a graphical illustration depicting an alternative fixed phase rotation estimation subprocess 600 for CPR process 400, FIG. 4. In an exemplary embodiment, subprocess 600 may be implemented as an alternative to the implementation of TS-based fixed phase rotation estimation subprocess 500, FIG. 5, within or in conjunction with, an alternative embodiment of fixed phase rotation estimation unit 408', FIG. 4. In the exemplary embodiment, subprocess 600 represents a blind phase estimation processing technique useful to determine an estimate of the fixed phase rotation $\varphi_{y0}$. That is, similar to the innovative technique described above with respect to FIG. 5, the fixed phase rotation $\varphi_{y0}$ is still determined to achieve phase recovery for the second of the two single-polarization signals after dynamic phase noise estimation for only the first of the single-polarization input signals.

As depicted in the example illustrated in FIG. 6, a plurality of received symbols 602 (i.e., 1-N received symbols 602) are fed into and processed by an algorithm of a phase noise estimation unit 604, which in turn generates the fixed phase rotation estimation $\varphi_{y,0}$. That is, through this alternative subprocessing technique, the same fixed phase rotation estimation (i.e., $\varphi_{y,0}$) is obtained according to this blind phase estimation approach subprocess 600, as is obtained through implementation of training sequence-based subprocess 500. Both techniques fully support the simplified DSP flow approach described above with respect to FIGS. 2 and 4.

Although the blind phase estimation approach described with respect to FIG. 6 is similar, in some respects, to conventional blind phase recovery methods (e.g., BPS, or even VV). However, according to the innovative and simplified approach of subprocess 600, the sliding window that is necessary to the conventional approach, is no longer needed according to the blind phase estimation approach of subprocess 600. Indeed, according to subprocess 600 only a one-time phase estimation of the N symbols ($R_1$-$R_N$) is performed, and then the fixed phase rotation estimate $\varphi_{y,0}$ may be obtained by averaging these N symbols.

Figure 7:
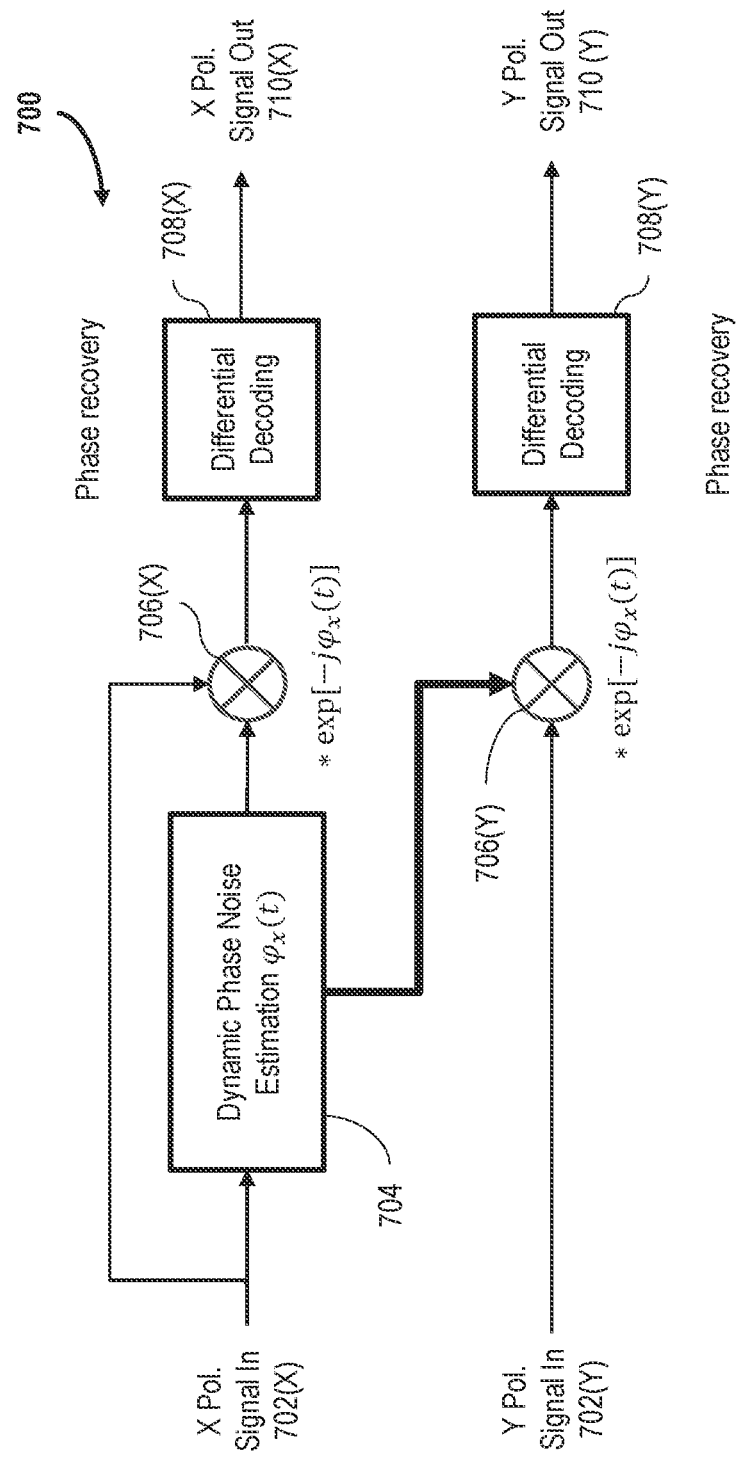
FIG. 7 is a schematic illustration depicting an alternative carrier phase recovery process, in accordance with an embodiment.

FIG. 7 is a schematic illustration depicting an alternative CPR process 700. CPR process 700 is similar in many respects to CPR process 400, FIG. 4, and performs carrier phase recovery and compensation on the respective polarizations of a dual-polarization carrier input signal 702 (i.e., 702(X) and 702(Y)) by a receiver processor (e.g., processor 102, FIG. 1). In the exemplary embodiments depicted in FIG. 7, CPR process 700 represents the implementation of the innovative and simplified algorithmic embodiments described above, but in this example, applied to a dual-polarized signal according to a differential modulation format, such as a DQPSK signal.

Similar to CPR process 400, CPR process 700 also implements only a single dynamic phase noise estimation unit 704, which may be similar in structure and function to dynamic phase noise estimation unit 404, FIG. 4. Also similar to unit 404, the phase noise estimation $\varphi_x(t)$ output from unit 704 is based only on a single polarization (i.e., the X-polarization signal, in this example) but shared with respective mixers 706 for both polarizations, that is, mixer 706(X) for the X-polarization and mixer 706(Y) for the Y-polarization. The phase recovery from both mixers 706(X), 706(Y) thus also utilizes the same function $e^{-j\varphi_x(t)}$ corresponding to the phase noise estimation value from unit 704.

However, for the exemplary embodiment depicted in FIG. 7, because dual-polarization carrier input signal 702 is a DQPSK signal, to implement the simplified DSP flow techniques described above, CPR process 700 implements only the dynamic phase noise estimation stage of processing, and may avoid the need for fixed phase rotation recovery for the polarization signals. Accordingly, in this example, CPR process 700 may employ an individual differential decoding unit 708 at the output of each mixer 706, respectively, to obtain the relevant output polarization signal 710. Accordingly, the person of ordinary skill the art can see that the complexity of DSP processing may be even further substantially reduced in the case of input carriers utilizing differential modulation formats.

FIGS. 8A-B are schematic illustrations depicting exemplary optical network architectures 800, 802, respectively. More particularly, optical network architecture 800 illustrates an exemplary implementation of the present DSP embodiments within a P2P configuration, and optical network architecture 802 illustrates an exemplary implementation of the present DSP embodiments within a P2MP configuration.

In an embodiment, P2P optical network architecture 800 includes a first transceiver 804 in operable communication with a second transceiver 806 over an optical communication transport medium 808. First transceiver 804 includes a first transmitter 810 and a first receiver 812, and second transceiver 806 includes a second receiver 814 and a second transmitter 816. In the exemplary embodiment, first receiver 812 includes a first DSP unit 818, and/or second receiver 814 includes a second DSP unit 820. In this exemplary P2P configuration, both of first and second receivers 812, 814 may be configured to operate as continuous mode coherent optical receivers, and either or both of first and second DSP units 818, 820 are configured to implement the reduced-complexity DSP flow techniques described above.

In contrast, P2MP optical network architecture 802 includes an upstream hub transceiver 822 (e.g., at a headend) in operable communication with a plurality (i.e., 1-k) of downstream transceivers 824 over an optical communication transport medium 826. Hub transceiver 822 includes a downstream transmitter 828 and an upstream receiver 830. In this exemplary P2MP configuration of architecture 802, each of downstream transceivers 824 may therefore include a respective downstream receiver 832 and an upstream transmitter 834. In an exemplary embodiment, one or more of downstream receivers 832 includes a respective downstream DSP unit 836, and upstream receiver 830 includes an upstream DSP unit 838. In an exemplary embodiment, some or all of upstream DSP unit 838 and downstream DSP units 836 are configured to implement the reduced-complexity DSP flow techniques described above. In an embodiment, downstream (DS) transmissions from downstream transmitter 828 to downstream receivers 832 may be sent as continuous mode coherent optical transmissions, and upstream (US) transmissions from respective upstream transmitters 834 to upstream receiver 830 may represent burst mode coherent optical transmissions.

FIG. 9 is a schematic illustration of an exemplary test architecture 900 for verifying experimental results implementing the receiver processing embodiments herein. More particularly, test architecture 900 was implemented in a real-world experimental setup to verify the proof of concept for the CPE and DSP flow systems and methods, as well as the several algorithmic blocks modules thereof, described above.

Test architecture 900 simulated a real-world operation of a coherent optics communication network, and included transmitter end 902 operably coupled to a receiver end 904 by an optical communication medium 906 (e.g., a 50-km single mode fiber (SMF), in this case). Transmitter end 902 included an arbitrary waveform generator (AWG) 908 (e.g., including an 80 GSa/s DAC), which generated of 25 GBaud polarization multiplexed QPSK and 16QAM signals 910. Signals 910 were modulated using an I/Q modulator 912 coupled with a laser source 914 (e.g., a laser diode, 100 kHz), and then amplified by amplifier 916 (e.g., a booster erbium-doped fiber amplifier (EDFA) for transmission over the 50-km SMF of medium 906.

At the receiver end 904, the power of the transmitted signal was measured after a variable optical attenuator (VOA) 918 deployed along medium 906 at an input of receiver end for coherent detection. The received signal was then amplified by a pre-EDFA 920, input to an integrated coherent receiver (ICR) 922 in operable communication with a local oscillator (LO) source 924, sampled by a digital sampling oscillator (DSO) 926 (e.g., also 80 GSa/s), and processed by a Matlab-capable computer (PC) 928. That is, in the actual experimental setup of test architecture 900, the several reduced-complexity algorithms, described above, for the receiver were implemented to demodulate the transmitted signal through a Matlab offline process employed by PC 928. In practical applications, such functionality may be performed within the coherent receiver itself, or by a DSP unit thereof. Results obtained from the experimental setup of test architecture 900 are described further below with respect to FIGS. 10A-11B.

FIG. 10A-B are graphical illustrations depicting experimental phase estimation measurement plots 1000, 1002, respectively, obtained according to test architecture 900, FIG. 9. More particularly, plots 1000, 1002 illustrate phase estimation results for both polarizations of a multi-symbol dual-polarization signal, as well as the comparative differences between the conventional approach (e.g., FIG. 3) and the reduced-complexity/simplified CPR systems and methods described herein (e.g., FIGS. 2, 4-7).

For example, plot 1000 illustrates the estimated phase-versus-symbol results according to the conventional technique that requires independent estimation of dynamic phase noise for each of the X- and Y-polarizations individually. As shown in plot 1000, an X-polarization phase subplot 1004 has the same phase evolution, but with a fixed phase offset, as a Y-polarization phase subplot 1006. That is, since the independent phase noise from fiber nonlinearity (e.g., from medium 906, FIG. 9) is considered to be relatively rather small at the transmission distances associated with the access paradigm, the respective phase noise in the two polarizations exhibits effectively the same behavior, except the fixed phase rotation.

In contrast, plot 1002 illustrates the estimated phase-versus-symbol results according to the CPR processing techniques described herein for the simplified DSP flow of a receiver processor. More particularly, a first subplot 1008 (solid line) illustrates the residual phase for one polarization using a dynamic phase estimation result, and a second subplot 1010 (dotted line) illustrates the results obtained using fixed phase rotation for the other polarization. As can be seen from the graphical illustration depicted in FIG. 10B, first and second subplots 1008, 1010 substantially align with one another, thereby demonstrating the particular effectiveness of embodiments according to the present systems and methods.

FIG. 11A-B are graphical illustrations depicting comparative BER performance result plots 1100, 1102, respectively, obtained according to test architecture 900, FIG. 9. More particularly, plot 1100, FIG. 11A illustrates a comparative BER-versus-symbol length overlay of a first subplot 1104 utilizing a training sequence-based fixed phase rotation estimation (e.g., FIG. 5) against a second subplot 1106 utilizing a BPS-based fixed phase rotation estimation (e.g., FIG. 6). As can be seen from the graphical illustration depicted in FIG. 11A, first and second subplots 1104, 1106 substantially align with one another. That is, BER performance is similar using either of the TS or blind estimation algorithms (in the condition of fixed receiver power at −38.3 dBm, for the experimental results of this example). As can also be seen from plot 1100, a converged result 1108 for fixed phase rotation estimation is obtained for a training sequence or average window size of 64 symbols.

In contrast, plot 1102 illustrates BER-versus-received optical power comparative overlays 1110, 1112 for a 100G QPSK signal and a 200G 16QAM signal, respectively. More particularly, comparative overlay 1110 superimposes a first subplot 1114 depicting the BER performance of the QPSK signal according to conventional CPR techniques (i.e., where both polarizations are independently subject to dynamic phase noise estimation) with a second subplot 1116 depicting the BER performance of the same QPSK signal according to the simplified CPR techniques described herein. Similarly, comparative overlay 1112 superimposes a third subplot 1118 depicting the BER performance of the 16QAM signal according to the conventional CPR techniques with a fourth subplot 1120 depicting the BER performance of the same 16QAM signal according to the present simplified CPR techniques. As can be seen from the optical power sensitivity comparisons of plot 1102, the innovative reduced-complexity DSP flow techniques of the present embodiments may be effectively implemented for different modulation formats with no significant or observable performance degradation therefrom.

The systems and methods described herein are therefore of particular advantageous use for the access network paradigm, for example, in the cable environment or other telecommunication applications, and may be implemented with respect to 4G, 5G, and 6G networks and related applications, as well as fronthaul, backhaul, and midhaul deployments, and also for both short- and long-haul architectures.

Exemplary embodiments of DSP systems and methods for digital and/or optical communication networks are described above in detail. The systems and methods of this disclosure though, are not limited to only the specific embodiments described herein, but rather, the components and/or steps of their implementation may be utilized independently and separately from other components and/or steps described herein.

Data-Aided SoP Estimation and Channel Equalization for Coherent Access Networks

As described above mobile Internet, 5G technology, cloud networking, and video streaming services are presently driving the growth of bandwidth requirements in optical access networks. As a P2MP system, PON technologies have been one of the dominant architectures to meet such high capacity demand for the end users. A high-speed PON, based on a single wavelength having a time-division multiplexing (TDM) mechanism, has been an attractive solution in the field due to its capability of reducing the number of required optical components and associated costs, while also saving wavelength resources. However, the limited sensitivity of such systems has become a critical challenge to support high-speed PONs with high power budgets using direct detection technologies. One such direct detection PON, for example, has a PR 30 power budget, transmits at greater than 50 Gbps per wavelength, and at a distance greater than 20 km.

Coherent detection offers a solution that both enables high-speed data transmission with advanced modulation formats, and also enhances the link power budget due to the increased sensitivity of the coherent receivers. However, implementation of digital coherent technologies into the optical access network paradigm creates new challenges arising from the differences between the access network and present long haul coherent technologies.

A first challenge arises from the fact that coherent detection in long haul transmissions requires powerful DSP at the receiver-side of the network to compensate for the channel linear and nonlinear distortions. In the access network (e.g., PON, P2P Ethernet), however, the transmission distance is generally limited, that is, over considerably shorter distances than in the long haul paradigm. In the access network, many distortions such as CD, PMD, and fiber nonlinearity, may be relatively small, and may often be ignored with little penalty. The long haul coherent detection techniques are considered too costly, in terms of hardware and power budget, to simply drop into the access network as is. Accordingly, it is necessary to fundamentally redesign the computation complexity of DSP functionality in the access network to reduce both the cost and power consumption in access network applications.

A second challenge arises with respect to upstream burst-mode digital coherent detection at the coherent digital receiver. In the long haul transmission paradigm, coherent detection operates in continuous mode, which may, for signal processing, tolerate convergence over significantly longer time durations, or larger latencies. One of the critical DSP functions at the coherent digital receiver though, is polarization recovery. The embodiments described above estimate the polarization and apply channel equalization to compensate for polarization dependent effects using such techniques as (i) blind estimation algorithms (e.g., 2×2 multi-input/multi-output (MIMO)-based adaptive equalization), (ii) CMA, and/or other known techniques, such as a multi-modulus algorithm (MMA). However, since these algorithms are based on the error signal feedback to update the filter coefficients, each such algorithm requires considerable convergence time. Furthermore, the blind algorithms are prone to sub-optimum convergence and instability, including the possibility of wrong convergence. Therefore, such techniques are not suitable for burst-mode coherent detection in the access network paradigm, particularly in the case of short burst frames.

Accordingly, the present embodiments offer an innovated technique for providing a data-aided method for performing both state-of-polarization (SoP) estimation, as well as, simplified channel equalization. In some embodiments, the present systems and methods are based on a specially designed data unit, in combination with a redesigned corresponding DSP, which separates the polarizations directly in a feedforward manner.

The unique data unit of the present embodiment is uniquely configured to generate special frame structuring for burst-mode signal frames. In some embodiments, by basing the proposed innovation on the feedforward estimation, the convergence time may be greatly reduced, which is a particular advantage in a burst-mode coherent communication system.

The present systems and methods achieve still further advantages over conventional techniques through the innovative implementation of data-aided features. That is, although the estimation techniques of the present embodiments may be data-aided, the estimation does not depend on the specific bit information carried by the data itself. Instead, according to the present systems and methods, the estimation may be advantageously based on the relationship between two detected polarization-diversity signals. Accordingly, a data unit that is specially designed according to these principles is not limited to SoP estimation only; such a data unit apparatus is further useful for carrying net bit information, as well as other DSP functions beyond estimation.

The following embodiments are therefore of particular use with channel equalization algorithms, while achieving equalization results with significantly reduced complexity and shorter convergence time. In some embodiments, the present techniques may reduce convergence time implementing a conventional 2×2 channel equalization structure, for example, by initializing the filter taps for the four adaptive equalizers of the 2×2 structure, or by pre-separating the respective polarizations before equalization. An exemplary embodiment of this principle, implemented with respect to a 2×2 channel equalization structure, is described further below with respect to FIG. 15.

In an alternative embodiment, a simplified channel equalization structure may utilize only two adaptive equalizers. In this example, after SoP estimation, the two adaptive equalizers may be independently utilized for channel equalization for each polarization of a polarization multiplexed signal, thereby reducing the computation complexity by approximately half, in comparison with non-data-aided techniques. For a single polarization signal, this simplified structure may be even further simplified, since only one adaptive equalizer would be needed according to this technique. An exemplary embodiment of this principle, implemented with respect to a simplified channel equalization structure, is described further below with respect to FIG. 17.

FIG. 12 is a schematic illustration depicting a polarization-diversity coherent receiver 1200. In the exemplary embodiment depicted in FIG. 12, coherent receiver 1200 is implemented to demonstrate an operational principle of detecting two polarizations with cross coupling. More particularly, in the exemplary embodiment, coherent receiver 1200 includes a first polarization beam splitter (PBS) 1202 configured to receive an input polarization multiplexed signal 1204 (e.g., from an optical transport medium, not shown in FIG. 12), and a second PBS 1206 configured to receive a local oscillator (LO) signal from an LO source 1208. In some embodiments, second PBS 1206 may be a conventional splitter.

Coherent receiver further includes a first 90 degree optical hybrid 1210 and a second 90 degree optical hybrid 1212. In this example, first 90 degree optical hybrid 1210 is configured to receive as inputs an X-polarization signal component from first PBS 1202 and the LO signal from second PBS 1204. Similarly, second 90 degree optical hybrid 1212 is configured to receive as inputs a Y-polarization signal component from first PBS 1202 and the LO signal from second PBS 1204. Each 90 degree optical hybrid 1210, 1212 is further configured to output separate I and Q components 1214 for its respective polarization signal component (i.e., XI and XQ, or YI and YQ, in this example). These components are described for purposes of illustration, and are not intended to be limiting. The person of ordinary skill in the art will understand, for example, that coherent receiver 1200 may include additional components 1216, such as photodetectors (PDs), amplifiers or transimpedance amplifiers (TIAs), ADCs, and/or additional components conventionally utilized in coherent optical receivers, without departing from the scope herein.

As illustrated in FIG. 12, polarization-diversity coherent receiver 1200 operates to detect signal 1204 on two polarizations. However, when signal 1204 is received over fiber transmission, the respective polarizations of signal 1204 may no longer be aligned to LO 1208. That is, along fiber transmission, the signal polarization may become randomly rotated due to birefringence from the fiber. Other polarization effects, such as PMD, may also affect the phase difference between the two polarizations, and the post-transmission SoP of signal 1204 may drift with time as a result of environmental conditions on the installed fibers/cables. Accordingly, in the exemplary embodiment, polarization-diversity coherent detection is achieved by separately detecting the two selected orthogonal polarizations (i.e., X/Y) of the received input signal 1204, thereby enabling coherent receiver 1200 to implement SoP estimation and recovery in the digital domain. The following embodiments are described with respect to particular specially-designed data sequences and/or frame structures for dual-polarization signals, that is, polarization division multiplexed signals. These examples are provided by way of illustration, and not in a limiting sense. The principles described herein will be understood to be applicable to other types of polarized multiplexed signals and multiplexed signals having multiple signal subcomponents.

FIG. 13 is a schematic illustration depicting an exemplary network communication system 1300. In an exemplary embodiment, system 1300 includes a transmitter-side 1302 and a receiver-side 1304, and transmitter-side 1302 includes a data unit generator 1306 configured for frame structuring and design of data units communicated to a corresponding digital signal processor (DSP) 1308 at receiver-side 1304. In the exemplary embodiment, data unit generator 1306 is configured to generate a data unit having a specially-designed frame structure for each of two polarizations, and then modulate the generated data unit onto the optical carrier corresponding to each polarization for transmission, for example, as a dual-polarization multiplexed signal (e.g., signal 1204, FIG. 12) to receiver-side 1304 over an optical fiber medium 1310.

At receiver-side 1304, DSP 1308 is configured to have knowledge of the frame structure(s) of the data unit(s) generated by data unit generator 1306, and applies DSP functions corresponding to the known data units after the respective signal components are coherently detected (e.g., at ICR 922, FIG. 9, optical hybrids 1210/1212, FIG. 12). In the exemplary embodiment, DSP 1308 is logically disposed after conversion by an ADC (not shown in FIG. 13), and operates in the digital domain to estimate and recover SoP with channel equalization, in coordination with data unit generator 1306 and/or knowledge of the special frame structures of the data units generated thereby.

In the exemplary embodiment, SoP estimation is therefore based on the data unit frame structures generated by specially-designed data unit generator 1306. In this respect, the exemplary embodiment depicted in FIG. 13 may be considered "data-aided," due to the insertion of the data units on to the respective polarization signal frames. Nevertheless, because the corresponding SoP estimation performed by DSP 1308 need not be based on the actual bit information carried by the data of the respective signal frames, and is instead based on the relation between the two polarization-diversity detected signals, the generated data units may also be utilized for information carrying, that is, in addition to their implementation for SoP estimation and recovery. In some embodiments, may alternatively or additionally be used to coordinate with other corresponding DSP functions at DSP 1308, such as those described above. Exemplary data unit frame structures are described further below with respect to FIGS. 14A-C.

FIGS. 14A-C are schematic illustrations depicting exemplary respective data architectures 1400A-C generated in accordance with data unit 1306, FIG. 13. In the exemplary embodiment, each respective data architecture 1400 includes at least one specially-designed data unit 1402 placed with respect to a dual-polarization signal frame 1404 (e.g., the data payload) in the time domain. In the example depicted in FIGS. 14A-C, dual-polarization signal frame 1404 is illustrated with respect to orthogonal X- and Y-polarizations, with data carried by their respective optical signals represented as Data X and Data Y (or Data Xi and Data Yi, in the case of multiple signal frames within the same data architecture 1400). Accordingly, data unit 1402 correspondingly structured to include an X-data component and a Y-data component represented herein as Ux and Uy (or Uxi and Uyi).

More particularly, FIG. 14A illustrates an implementation example of data unit 1402A including N-symbol length data only on the X-data component for the X-polarization, and zeros on the Y-data component for the Y-polarization; that is, the frame structure of data unit 1402A is configured such that Ux includes N-symbol length data in the time slot of data unit 1402A, and Uy includes zeros (no data) within that same time slot. Similarly, FIG. 14B illustrates the counter-implementation example of data unit 1402B including zeros on the X-data component Ux, and N-symbol length data on only the Y-data component Uy within the same time slot.

FIG. 14C, on the other hand, illustrates an implementation example of data unit 1402C having a hybrid frame structure spanning at least two time slots within a single data unit. That is, data unit 1402C includes N-symbol length data on both polarizations, but in different time slots within a single data unit. More particularly, within the first time slot of data unit 1402C, Ux includes N-symbol length data, and Uy includes zeros, whereas in the second time slot of data unit 1402C, Ux includes zeros, and Uy includes N-symbol length data. It will be understood by persons of ordinary skill in the art that the disposition of data within the two time slots of data unit 1402C may be reversed, as long as one polarization of data unit 1402C is structured no with zeros while the other polarization is structured to include data within a particular time slot.

The operating principles of data architectures 1400A-C may otherwise be considered similar to one another with respect to SoP estimation and recovery. However, the hybrid implementation example illustrated in FIG. 14C may be considered to provide more balanced data loading between the X- and Y-polarizations. In an exemplary embodiment, implementation of data architecture 1400C may further provide a more robust performance due to the enablement of corresponding DSP calculations on both of the two polarizations. An analysis of such DSP calculations and related processing is described further below.

In general, for an access network having relatively limited transmission distance, the polarization dependent loss and fiber nonreality may be ignored. Based on this principle, the Jones matrix of the fiber channel after signal transmission can be expressed, as a unitary matrix, according to:

$$J = \begin{bmatrix} \cos\theta e^{j\phi_1} & \sin\theta e^{j\phi_2} \\ -\sin\theta e^{-j\phi_2} & \cos\theta e^{-j\phi_1} \end{bmatrix} \quad \text{(Eq. 2)}$$

Here, $\theta$ represents the overall polarization rotation effect, whereas $\phi_1$ and $\phi_2$ represent the phase caused by PMD after fiber transmission. To solve this equation with three variables, the problem to be simplified by expanding Eq. 2 into:

$$J = \begin{bmatrix} \cos\theta e^{j\phi_1} & \sin\theta e^{j\phi_2} \\ -\sin\theta e^{-j\phi_2} & \cos\theta e^{-j\phi_1} \end{bmatrix} = \begin{bmatrix} \cos\theta e^{j(\phi_1+\phi_2)} & \sin\theta \\ -\sin\theta & \cos\theta e^{-j(\phi_1+\phi_2)} \end{bmatrix} \quad \text{(Eq. 3)}$$

$$\begin{bmatrix} e^{-j\phi_2} & 0 \\ 0 & e^{j\phi_2} \end{bmatrix} = \begin{bmatrix} \cos\theta e^{j\gamma} & \sin\theta \\ -\sin\theta & \cos\theta e^{-j\gamma} \end{bmatrix} \begin{bmatrix} e^{-j\phi_2} & 0 \\ 0 & e^{j\phi_2} \end{bmatrix} =$$

$$J_1 J_2$$

Here, $\gamma=\phi_1+\phi_2$, and it may thus be seen that J now has two parts, $J_1$ and $J_2$, with the first part $J_1$ having only two variables ($\theta$ and $\delta$), which may be solved more easily considering that the second part $J_2$ has no contribution to the polarization crosstalk (i.e., power transfer between the X- and Y-polarizations). Accordingly, this second part $J_2$ only adds a phase difference between the X- and Y-polarizations, which may be solved in the phase recovery process. Thus, only the first part of the equation requires a solution.

It is known that, for a unitary matrix, its inverse H is the conjugate transpose of that unitary matrix. Accordingly, the equation need be solved only to obtain:

$$H = \begin{bmatrix} \cos\theta e^{-j\gamma} & -\sin\theta \\ \sin\theta & \cos\theta e^{j\gamma} \end{bmatrix} \quad \text{(Eq. 4)}$$

The systems and methods of the present embodiments thus provide an advantageously simplified technique to solve this equation. For example, assuming that the received signal $E_R$ after polarization diversity detection may be represented as:

$$E_R = \begin{bmatrix} E_x \\ E_y \end{bmatrix}, \quad \text{(Eq. 5)}$$

then the recovery signal $E_T$ may be represented according to:

$$E_T = H\begin{bmatrix} E_x \\ E_y \end{bmatrix} = \begin{bmatrix} \cos\theta e^{-j\gamma}E_x - \sin\theta E_y \\ \sin\theta E_x + \cos\theta e^{j\gamma}E_y \end{bmatrix} \quad \text{(Eq. 6)}$$

Here, $E_x$ and $E_y$ represent the revised signals on the two respective polarizations. As described above, the second part $J_2$ has no contribution on the power transfer between the X- and Y-polarizations. Accordingly, the innovative data unit frame structure of the present embodiments enables a simplified solution to the equation, due to the unique property of the present data unit that one polarization is null with zeros. For example, in the case where the Y-polarization of the transmitted data unit is null with zeros (e.g., data unit 1402A), the following is true:

$$\sin\theta E_x + \cos\theta e^{j\gamma}E_y = 0 \quad \text{(Eq. 7)}$$

Under this principle, the equation may then be solved according to:

$$\sin\theta = \sqrt{\frac{|E_y/E_x|^2}{1+|E_y/E_x|^2}}, \quad \text{(Eq. 8)}$$

$$\cos\theta = \sqrt{\frac{1}{1+|E_y/E_x|^2}},$$

$$\gamma = \text{angle}\left(-\frac{E_x}{E_y}\right)$$

Accordingly, the inverse matrix H for SoP estimation, polarization recovery, and demultiplexing may be easily obtained. A similar algorithmic process may be implemented in the case where the X-polarization of the transmitted data unit is null with zeros (e.g., data unit 1402B). That is, in the case where the X-polarization of the transmitted data unit is null with zeros, the following is true:

$$\sin\theta = \sqrt{\frac{|E_x/E_y|^2}{1+|E_x/E_y|^2}}, \quad \text{(Eq. 9)}$$

$$\cos\theta = \sqrt{\frac{1}{1+|E_x/E_y|^2}},$$

$$\gamma = -\text{angle}\left(\frac{E_y}{E_x}\right)$$

Thus, the inverse matrix H may be solved through implementation of any data units 1402A-C. Namely, as long as one of the respective data components of the polarizations is null with zero, the equation may be solved according to either Eq. 8 or Eq. 9, depending on the configuration of the particular data unit 1402 that is used. For example, in the case of hybrid data unit 1402C, the equation may be solved using both Eq. 8 and Eq. 9, but in different respective time slots.

In an exemplary embodiment, in practical use, each data unit 1402 may contain N symbols to improve the estimation accuracy. Therefore, for either of data 1402A and 1402B, the respective results from Eq. 8 and Eq. 9 may be averaged by the N symbols. In the case where data unit 1402C is implemented, since both of Eq. 8 and Eq. 9 are separately calculated for the inverse matrix H, the matrix is counted twice as many times. In this case, the results from both equations may also be separately averaged. Alternatively, the results of the first equation may be averaged prior to calculation of the second equation, namely, between the X- and Y-polarizations, to further improve accuracy. In at least one embodiment, Eq. 8 may be implemented for the lower two elements of the inverse matrix H, and Eq. 9 may be implemented for the upper two elements of the inverse matrix H.

In an exemplary embodiment, the respective implementation examples depicted in FIGS. 14A-C may be further implemented with a channel equalization. In this case, the inverse Jones Matrix H may be a 2×2, 1-tap filter, which can be used for polarization recovery and demultiplexing independently before any channel equalization is performed, as described further below with respect to FIG. 15. Alternatively, the inverse matrix H may be used for the initialization of a 2×2 multi-tap adaptive equalizer, as described further below with respect to FIG. 17.

FIG. 15 is a flow diagram depicting an exemplary SoP estimation technique 1500 for digital signal processing. In the exemplary embodiment depicted in FIG. 15, technique 1500 illustrates the DSP flow of an SoP estimation unit 1502 implemented together with a 2×2 multi-tap equalization schemes using adaptive equalizers 1504 for initialization. More specifically, each of the four adaptive equalizers 1504(1), 1504(2), 1504(3), 1504(4) are utilized in the exemplary embodiment for channel equalization. In some embodiments each of adaptive equalizers 1504 is further enabled to compensate for both intra-polarization linear channel distortions (e.g., inter-symbol-interference (ISI) from transmitter and receiver bandwidth limitations, residual CD) and inter-polarization cross-talk.

In exemplary operation of technique 1500, both of revised polarization signals $E_x$ and $E_y$ are input to SoP estimation unit 1502, whereas only revised polarization signal $E_x$ is input to adaptive equalizers 1504(1) and 1504(2), and only revised polarization signal $E_y$ is input to adaptive equalizers 1504(3) and 1504(4). Outputs from adaptive equalizers 1504(1) and 1504(2) are summed to generate an output X-polarization signal $X_{out}$, and outputs from adaptive equalizers 1504(3) and 1504(4) are summed to generate an output Y-polarization signal $Y_{out}$. Both of output signals $X_{out}$ and $Y_{out}$ may then be fed back into an error function unit 1506. In an exemplary embodiment, the respective filter coefficients of adaptive equalizers 1504 (i.e., [$d_{xx}$, $d_{xy}$; $d_{yx}$, $d_{yy}$]) may then be updated (e.g., using CMA, MMA, or LMS algorithms, described above) based on the error signal feedback processed by error function unit 1506.

As discussed above, using all-blind adaptive equalization (e.g., FIGS. 3, 6) the initialization of the filter coefficients of adaptive equalizers 1504 may be non-optimized with a default starting point. For example, assuming no polarization rotation, and setting the values of the center tap coefficients $d_{xx}$, $d_{xy}$, $d_{yx}$, $d_{yy}$ as [1 0 0 1], a gradual update to these filter coefficients may cost and unreasonable amount of time when significant polarization rotation occurs. Accordingly, considering that the most significant determinant of the convergence time for adaptive equalizers 1504 is the initialization, the present embodiments advantageously avoid this cost by implementing the SoP estimation (i.e., SoP estimation unit 1502) together with the four multi-tap adaptive equalizers 1504 for initialization, as depicted in FIG. 15. Furthermore, since four adaptive equalizers 1504 are utilized for adaptive equalization, the polarization change may be tracked, including the inter-polarization time of $d_{xy}$ and $d_{yx}$. That is, for each frame, no further estimation is needed after initialization. Accordingly, the respective frame structures described above with respect to FIGS. 14 A-C may be implemented with technique 1500, with only the respective data unit 1402 heading data architecture 1400 in time before the data payload of signal frame 1404.

Therefore, according to technique 1500, using the detected signals from each of two polarizations (i.e., $E_x$ and $E_y$), the SoP estimation may be initially performed based on the first data unit 1402 in the frame head of the respective data architecture 1400. That is, SoP estimation unit 1502 may be programmed with algorithms or computer-executed instructions to perform the calculations described above with respect to Eq. 8 and 9, and thereby obtain the inverse matrix H.

In an embodiment, technique 1500 further includes a multiplication unit 1508, a channel response storage unit 1510, and a normalization unit 1512. In exemplary operation of this embodiment, the convergence time may be further reduced by multiplying, using multiplication unit 1508, the inverse matrix H output from SoP estimation unit 1502 with an initial normalized channel response stored in channel response storage unit 1510 to initialize the four adaptive equalizers 1504. That is, the normalized channel response D=[$D_{xx}$, $D_{xy}$; $D_{yx}$ $D_{yy}$] may be initially set, at the very beginning of system operation according to technique 1500, with the initial pre-stored channel response such that the center taps of $D_{xx}$ and $D_{yy}$ are 1, and all other elements of D are set to zero.

For example, in the case of a 5-tap channel response, the initial pre-stored normalized channel response D in channel response storage unit 1510 may be set according to:

$$D = \begin{bmatrix} D_{xx} & D_{xy} \\ D_{yx} & D_{yy} \end{bmatrix} = \begin{bmatrix} 00100 & 00000 \\ 00000 & 00100 \end{bmatrix} \quad \text{(Eq. 10)}$$

The initialization for the four adaptive equalizers 1504 may then be set according to:

$$\begin{bmatrix} d_{xx} & d_{xy} \\ d_{yx} & d_{yy} \end{bmatrix} = H \begin{bmatrix} D_{xx} & D_{xy} \\ D_{yx} & D_{yy} \end{bmatrix} \quad \text{(Eq. 11)}$$

Thus, after this initialization procedure, the SoP estimation is complete. In further operation according to technique 1500, respective adaptive equalizers 1504 may then proceed with continuous updating taps to track the channel response and polarization changes. As described above, the respective filter coefficients of adaptive equalizers 1504 (i.e., [$d_{xx}$, $d_{xy}$; $d_{yx}$, $d_{yy}$]) may then be updated based on the error signal feedback from error function unit 1506 (e.g., CMA, MMA, LMS algorithms). In some embodiments, training sequences may be implemented when updating the filter coefficients to achieve faster convergence.

In further exemplary operation of technique 1500, when channel equalization is completed, the tap values of adaptive equalizers 1504 (i.e., [$d_{xx}$, $d_{xy}$; $d_{yx}$, $d_{yy}$]) may be fed to normalization unit 1512, normalized as an updated channel response D, and stored in channel response storage unit 1510. The value of updated channel response D may then be utilized to equalize the next sequential frame. In the exemplary embodiment, any or all of the respective components illustrated with respect to technique 1500 may be contained within a DSP of a receiver (e.g., DSP 1308 of receiver-side 1304, FIG. 13), and/or executed as a software module by a processor thereof.

According to the exemplary embodiment depicted in FIG. 15, technique 1500 is of particular use for, and fully compatible with, upstream burst detection in a PON, where each ONU of the PON may have its own stored channel response D (e.g., and a memory thereof), that is, a particular channel response $D_i$ for the respective $ONU_i$. Thus, according to technique 1500, the channel response $D_i$ may be utilized in the initialization process for next burst frame coming from that $ONU_i$, whereas different ONUs may have different pre-stored coefficients. An exemplary implementation process of technique 1500 is described below with respect to FIG. 16.

FIG. 16 is a flow diagram depicting an exemplary channel equalization process 1600 implementing estimation technique 1500, FIG. 15. In the exemplary embodiment, process 1600 begins at step 1602, in which SoP estimation is performed (e.g., by SoP estimation unit 1502) using a data unit (e.g., data unit 1402A, 1402B, or 1402C, FIG. 14) in the frame header of a received data frame (e.g., respective data architecture 1400A, 1400B, or 1400C, FIG. 14) of an input data signal (e.g., $E_x$ and/or $E_y$). In an exemplary embodiment of step 1602, the SoP estimation utilizes non-zero data in the data unit to calculate the inverse matrix H.

Step 1604 is a decision step. If, in step 1604, process 1600 determines that the received data frame is the first frame in the received signal sequence, process 1600 proceeds to step 1606. In step 1606, the calculated inverse matrix H is multiplied (e.g., by multiplication unit 1508) by an initial pre-stored normalized channel response D (e.g., in channel response storage unit 1510), and the multiplied result thereof is fed the respective taps of adaptive equalizers (e.g., adaptive equalizers 1504) for adaptive channel equalization.

In step 1608, the adaptive filters perform adaptive channel equalization on the multiplied inverse matrix H. In step 1610, process 1600 determines that channel equalization has been completed, outputs the respective polarization output signal (e.g., $X_{out}$ and/or $Y_{out}$), and feeds an updated normalized channel response D to the channel response storage unit (e.g., from adaptive filters 1504 by way of normalization unit 1512). In step 1612, the channel response storage unit stores the updated normalized channel response D. In an exemplary embodiment of step 1612, the updated normalized channel response D is stored within a table contained within the channel response storage unit.

Referring back to step 1604, if process 1600 alternatively determines that the received data frame is not the first frame in the signal sequence, process 1600 instead proceeds to step 1614. In step 1614, the calculated inverse matrix H is multiplied (e.g., by multiplication unit 1508) by a stored updated normalized channel response D (e.g., from step 1612) read from the channel response storage unit, and the multiplied result thereof is fed the respective taps of adaptive equalizers (e.g., adaptive equalizers 1504) for adaptive channel equalization. Process 1600 then proceeds from step 1614 to step 1608, and process 1600 may then be repeated for each successive received signal frame.

In an alternative embodiment, SoP estimation, polarization recovery, and demultiplexing may be implemented independently from adaptive channel equalization. An exemplary technique for such independent SoP estimation is described further below with respect to FIG. 17.

FIG. 17 is a flow diagram depicting an alternative SoP estimation technique 1700 for digital signal processing. In the exemplary embodiment, components of processing technique 1700 are implemented within, and/or using software-based processing algorithms of, a DSP of a coherent receiver (e.g., DSP 1308, FIG. 13). In the embodiment depicted in FIG. 17, technique 1700 is similar in some respects to technique 1500, FIG. 15, and includes an SoP estimation unit 1702, two adaptive equalizers 1704 (as opposed to the four adaptive equalizers 1504 utilized according to technique 1500), an error function unit 1706, and a channel response storage unit 1708.

Although individual elements of technique 1700 are thus similar to analogous elements of technique 1500, the operating principle of technique 1700 is different from that of technique 1500. For example, different from technique 1500, technique 1700 utilizes a 1-tap inverse matrix H unit 1710 to achieve instant polarization recovery, and before channel equalization by adaptive equalizers 1504(1), 1504(2). Accordingly, because unit 1710 is able to recover both of the X- and Y-polarization signals prior to equalization, only two adaptive equalizers 1704(1) and 1704(2) (e.g., $d_{xx}$ and $d_{yy}$, respectively), are needed at the receiver, thereby significantly reducing the computation complexity, in comparison with technique 1500, by approximately half.

However, since technique 1700 does not include inter-polarization equalizers (e.g., $d_{xy}$ and $d_{yx}$ in example 1), the two adaptive equalizers 1704(1) and 1704(2)/$d_{xx}$ and $d_{yy}$ will not be able to track slower polarization changes. For example, in the case of short burst frames, there may be little or no change in the polarization, and therefore the inability to track slower polarization changes would be considered to result in a very small penalty on the performance. However, in the case of longer bursts or continuous mode operation, technique 1700 may be further configured to periodically check the polarization state and apply SoP estimation and recovery as needed. Nevertheless, even with this additional periodic checking, receiver DSP systems and methods according to technique 1700 represent significantly simplified channel equalization schemes, and with respect to both hardware costs and the processing resource burdens thereof.

In exemplary operation of technique 1700, both of revised polarization signals $E_x$ and $E_y$ are input to SoP estimation unit 1702, and both also to 1-tap inverse matrix H unit 1710. The outputs from adaptive equalizer 1704(1) becomes the output X-polarization signal $X_{out}$, and the outputs from adaptive equalizer 1704(2) becomes the output Y-polarization signal $Y_{out}$. Both of output signals $X_{out}$ and $Y_{out}$ may again be fed back into error function unit 1706, similar to the analogous operation in technique 1500.

In further exemplary operation of technique 1700, using the detected signals from two polarizations (e.g., $E_x$ and $E_y$), the SoP estimation is initially performed based on the data unit received in the frame head (e.g., data unit 1402A, 1402B, 1402C, FIGS. 14A-C, described further below with respect to FIGS. 18A-C). That is, SoP estimation unit 1702 is programmed to process the detected polarization signals according to either or both of Eq. 8 and Eq. 9, above, to solve for the inverse matrix H. Instant polarization recovery unit 1710 then performs polarization recovery for the received signals $E_x$ and $E_y$ using the inverse matrix H produced by SoP estimation unit 1702 to output two polarization-recovered signals for the respective X- and Y-polarizations, which may then be separately fed to respective adaptive equalizers 1704. In the example illustrated in FIG. 17, the recovered X-polarization signal is input to first adaptive equalizer 1704(1), and the recovered Y-polarization signal is input to second adaptive equalizer 1704(2), both of which may then apply channel equalization to the respective input recovered polarization signal.

As discussed above, in the example depicted in FIG. 17, only two adaptive equalizers 1704 are implemented, and are not expected to include tracking capability for polarization state changes according to this configuration. Nevertheless, a receiver DSP that implements technique 1700 may easily configured such that SoP estimation unit 1702 is enabled to perform SoP estimation a plurality of times for a single frame, depending on the length of the particular frame. Technique 1700 is thus further different from technique 1500, FIG. 15, in that technique 1500 would be expected implement SoP estimation (e.g., by SoP estimation unit 1502) only once for each received frame/data unit. In contrast, technique 1700 may advantageously perform SoP estimation the plurality of times between received data units.

In further exemplary operation of technique 1700, after SoP estimation is performed, adaptive equalizers 1704 may be initialized using a pre-stored channel response D=[$D_{xx}$; $D_{yy}$] stored in a memory of channel response storage unit 1708. Similar to the exemplary embodiment described with respect to FIG. 15, channel response storage unit 1708 may also set with a pre-stored default channel response value to reduce the convergence time. Thus, at the very beginning of system operation according to technique 1700, the pre-stored default channel response may be set with center tap of $D_{xx}$ and $D_{yy}$ having a value of 1, and all other elements of D set to zero.

Accordingly, again considering the case of a 5-tap channel response, the initial pre-stored channel response D in channel response storage unit 1708 may be set according to:

$$D = \begin{bmatrix} D_{xx} \\ D_{yy} \end{bmatrix} = \begin{bmatrix} 00100 \\ 00100 \end{bmatrix} \qquad \text{(Eq. 12)}$$

And thus, adaptive equalizers 1704 may be initialized according to:

$$\begin{bmatrix} d_{xx} \\ d_{yy} \end{bmatrix} = \begin{bmatrix} D_{xx} \\ D_{yy} \end{bmatrix} \quad \text{(Eq. 13)}$$

After this initialization, each adaptive equalizer 1704 may then start with continuously updating taps to track the channel response and polarization changes. The corresponding filter coefficients [$d_{xx}$; $d_{yy}$] of adaptive equalizers 1704 may then be updated based on the error signal feedback from error function unit 1706 (e.g., which may use algorithms such as CMA, MMA, LMS etc.). Similar to technique 1500, technique 1700 may further utilize training sequences when updating the filter coefficients to achieve faster convergence.

Once channel equalization is completed, the tap values [$d_{xx}$; $d_{yy}$] of adaptive equalizers 1704 may be stored channel response storage unit 1708 as an updated channel response D. This stored value for the updated channel response D may then be used for equalization processing of the next frame in the signal sequence. Different from technique 1500, technique 1700 does not include a normalization unit or normalization processing, since SoP estimation is performed before channel equalization according to technique 1700.

According to the exemplary embodiment depicted in FIG. 17, technique 1700 is also of particular use for, and fully compatible with, upstream burst detection in a PON, where each ONU of the PON may have its own stored channel response D (e.g., and a memory thereof), that is, a particular channel response $D_i$ for the respective $ONU_i$. Thus, according to technique 1700, the channel response $D_i$ may be utilized in the initialization process for next burst frame coming from that $ONU_i$, whereas different ONUs may have different pre-stored coefficients.

According to technique 1700, the respective data architectures and data units thereof may be similar to those described above with respect to FIG. 15. However, whereas the operating principles may be the same, the particular data architectures used with respect to technique 1700 may differ somewhat from those used with respect to technique 1500, as described below with respect to FIGS. 18A-C. Additionally, an exemplary implementation process of technique 1700 is described further below with respect to FIG. 19.

FIGS. 18A-C are schematic illustrations depicting alternative respective data architectures 1800A-C. Data architectures 1800A-C are similar in principle to data architectures 1400A-C, FIGS. 14A-C, but illustrate alternative designs and/or dispositions of data units 1802 with respect to a sequential series of dual-polarization signal frames 1804 containing data payloads. Similar to data architectures 1400A-C, data units 1802 are structured to include an X-data component and a Y-data component (i.e., Uxi and Uyi), and signal frames 1804 include both X-polarization data and Y-polarization data (i.e., Data Xi and Data Yi). FIGS. 18A-C thus depict three respective exemplary implementation examples of data unit frame structures having periodic frame units 1802 generated within the respective frame architecture 1800 for the simplified channel equalization processing described above with respect to technique 1700, FIG. 17.

More particularly, FIG. 18A illustrates an implementation example of periodic data units 1802Ai including N-symbol length data only on the X-data component Ux, and zeros on the Y-data component Uy. In this example, the same frame structure is employed for each data unit 1802A in the sequential series of data architecture 1800A, such that a first data unit 1802A(1) that precedes a first signal frame 1804A(1) has the same frame structure as a second data unit 1802A(2) preceding a second signal frame 1804A(2) and a third data unit 1802A(3) preceding a third signal frame 1804A(3), etc. Data architecture 1800A is therefore substantially similar to data architecture 1400A, FIG. 14A, but applied to a sequence of signal frames 1804Ai.

The frame structure of data architecture 1800A is depicted in FIG. 18A, by way of example and not in a limiting sense, as implementing a frame structure having X-data Uxi on the X-polarization and zeros on the Y-polarization. Persons of ordinary skill in the art will understand though, that the operating principle of data architecture 1800A will be substantially the same if implemented using frame structure having zeros on the X-polarization and Y-data Uyi on the Y-polarization, which is therefore similar in principle to data architecture 1400B, FIG. 14B, but applied to a sequence of signal frames 1804Ai.

FIG. 18B illustrates an implementation example of data architecture 1800B having periodic data units 1802Bi that are individually similar to data units 1802A, FIG. 18A (i.e., N-symbol length data on one polarization, zeros on the other polarization), but is different than data architecture 1800A when the plurality of data units 1802Bi are considered in the aggregate, seen over the entire series of signal frames 1804Bi included within data architecture 1800B. That is, although each data unit 1800B N-symbol length data on one polarization and zeros on the other polarization, the polarization that includes the N-symbol length data alternates for each sequential data unit 1802B in the series. Thus, in the example depicted in FIG. 18B, the frame structure for a first data unit 1802B(1) preceding a first signal frame 1804B(1) includes data Ux on the X-polarization and zeros on the Y-polarization, but a second data unit 1802B(2) preceding a second signal frame 1804B(2), which is next in the sequence, reverses the frame structure to include zeros on the X-polarization and data Uy on the Y-polarization. The frame structure of a third data unit 1802B(3) then alternates again to a frame structure substantially similar to that of first data unit 1802B(1), and the subsequent sequence of frames is processed accordingly.

FIG. 18C illustrates an implementation example of data architecture 1800C utilizing data units 1802Ci having a hybrid frame structure substantially similar to that of data units 1402C, FIG. 14C, but applied to the sequence of signal frames 1804Ci. That is, each of data units 1802Ci similarly include at least two time slots within a single data unit, with N-symbol length data on one polarization/zeros on the other polarization in the first time slot, and alternating in the second time slot of the same data unit 1802C. Because the respective U-data and zeros thus alternate within a single data unit, the same overall frame structure may remain the same for each periodic data unit 1802C(1), 1802C(2), 1802C(3), etc.

Accordingly, a general operational principle of the present systems and methods fundamental is to periodically leave one polarization of periodic data units 1802 null with zeros, while placing data on the other polarization. According to the exemplary embodiments depicted in FIGS. 18A-C, SoP estimation may be easily and rapidly performed for sequential frames in a data stream. Thus, data units 1802Ai and 1802Ci operate according to the principles described above, with the implementation of data units 1802Ci providing more balanced data loading between the X- and Y-polarizations, as well as a more robust performance due to the calculation on both of the two polarizations. Implementation of data units 1802Bi, on the other hand, strike a balance between the different approaches that implement data units 1802Ai or 1802Ci. That is, use of data units 1802Bi may achieve the more balanced data loading between polarizations, similar to that achieved through use of data units 1802Ci, but implementing only a single time slot within each periodic data unit.

FIG. 19 is a flow diagram depicting an alternative channel equalization process 1900 implementing the estimation technique 1700, FIG. 17. In the exemplary embodiment, process 1900 begins at step 1902, in which SoP estimation is performed (e.g., by SoP estimation unit 1702) using a data unit (e.g., data unit 1802A, 1802B, or 1802C, FIG. 18) in the frame header of a received data frame (e.g., respective data architecture 1800A, 1800B, or 1800C, FIG. 18) of an input data signal (e.g., $E_x$ and/or $E_y$). In an exemplary embodiment of step 1902, the SoP estimation utilizes non-zero data in the data unit to calculate the inverse matrix H, and then uses the calculated inverse matrix H (e.g., in instant polarization recovery unit 1710) to recovered outputs for each respective polarization.

Step 1904 is a decision step. If, in step 1904, process 1900 determines that the received data frame is the first frame in the received signal sequence, process 1900 proceeds to step 1906. In step 1906, an initial pre-stored channel response D (e.g., from channel response storage unit 1708) is applied to each of the recovered polarization outputs (e.g., at adaptive equalizers 1704). In step 1908, the adaptive filters perform adaptive channel equalization on the recovered polarization outputs according to the channel response D (e.g., obtained from channel response storage unit 1708).

Step 1910 is also a decision step, in which process 1900 determines whether a last SoP estimation cycle has been performed on the data sequence. If, in step 1910, process 1900 determines that the SoP estimate is not for the last estimation cycle, process 1900 proceeds to step 1912. In step 1912, process 1900 performs an additional SoP estimation and recovery operation (e.g., using SoP estimation unit 1702 and instant polarization recovery unit 1710) using the periodic data units in the frame and the calculated inverse matrix H, after which, process 1900 returns to step 1908 for additional adaptive channel equalization. If, however, in step 1910, process 1900 determines that the last SoP estimation cycle has been completed, process 1900 outputs the respective polarization output signal (e.g., $X_{out}$ and/or $Y_{out}$), and then proceeds to step 1914, in which an updated channel response D is provided to the channel response storage unit (e.g., from adaptive filters 1704). In an exemplary embodiment of step 1914, the updated channel response D is stored within a table contained within the channel response storage unit.

Referring back to step 1904, if process 1900 alternatively determines that the received data frame is not the first frame in the signal sequence, process 1900 instead proceeds to step 1916. In step 1916, the stored updated channel response D (e.g., from step 1914) is read from the channel response storage unit, and then applied to each of the recovered polarization outputs by the adaptive equalizers. Process 1900 then proceeds from step 1916 to step 1908, and process 1900 may then be repeated for each successive received signal frame or subsequent SoP cycle.

In accordance with the DSP systems and methods described above, performance of the respective SoP estimation techniques was tested in an experimental simulation set up. For the simulation performance testing, 25 GBaud dual-polarization 16QAM training symbols were used. Experimental results of the simulated performance testing are described further below with respect to FIGS. 20A-B and 21.

FIG. 20A is a graphical illustration depicting a signal plot 2000 before implementation of SoP estimation and polarization recovery. FIG. 20B is a graphical illustration depicting a signal plot 2002 after implementation of SoP estimation and polarization recovery. A comparison of the respective results of signal plots 2000 and 2002 indicates that the polarizations of the respective PDM-16QAM signals, seen before SoP estimation and polarization recovery in plot 2000, were correctly separated implementing the innovative techniques described above, as indicated in plot 2002, scene after SoP estimation and polarization recovery.

FIG. 21 is a graphical illustration depicting a comparative BER performance result plot 2100 obtained according to techniques 1500, FIGS. 15, and 1700, FIG. 17. More particularly, plot 2100 superimposes the BER-versus-received optical power results, scene after SoP estimation and polarization recovery, for both of a two-equalizer DSP implementation and a four-equalizer DSP implementation (i.e., FIR equalizers, for this performance test). More particularly, the two-equalizer implementation is representative of the simplified channel equalization technique illustrated in FIG. 17, and the four-equalizer implementation is representative of the more complex channel equalization technique depicted in FIG. 15. As may be seen from plot 2100, the penalty resulting from the selection of one technique over the other is substantially negligible. Nevertheless, implementation of DSP equalization according to the simplified channel equalization technique of FIG. 17 will reduce the computation complexity by half.

According to the systems and methods described above, an innovative data-aided technique is provided for SoP estimation and simplified channel equalization. These techniques advantageously utilize a specially designed data unit at the transmitter-side, which, in cooperation with complementary DSP at the receiver-side, efficiently and correctly separate the polarizations of a dual-polarization directly in a feedforward manner. The innovative data units of the present embodiments therefore include a frame structure that is particularly useful for burst-mode signal frames. Additionally, because the present systems and methods are based on feedforward estimation, convergence time may be greatly reduced, which is a unique advantage, in comparison with conventional techniques, to burst-mode coherent communication systems.

Additionally, because the DSP estimation techniques described herein are not based on the bit information carried by the data, but instead based on the relation between polarization-diversity detected signals, the innovative data units of the present embodiments may also be used for carrying bit information, if desired, or other DSP functions. The present techniques are thus also fully compatible with the utilization of channel equalization algorithms having reduced complexity and reduced convergence time, and may be implemented utilizing a conventional 2×2 channel equalization architecture to reduce he convergence time, whether by initializing the filter taps of the four adaptive equalizers therein, or by pre-separating the polarizations of the dual-polarization signal.

Alternatively, the present techniques further provide significantly simplified channel equalization using two adaptive equalizers instead of the four equalizers of the conventional 2×2 channel equalization architecture. That is, after SoP estimation, two independent adaptive equalizers perform channel equalization on each respective polarization of a polarization multiplexed signal, thereby reduces the computation complexity by 50% when compared with non-data-aided methods. Additionally, for single polarization signals, these techniques may be even further simplified to utilize only one adaptive equalizer. Efficient Preamble Design and DSP in Coherent-PON Upstream Burst-Mode Detection As described above, the advance of high-speed optical access networks has been propelled by new business and application drivers, such as 5G, mobile x-haul, cloud networking, and high-bandwidth 4K/8K video streaming services. As a result of this advance, the bandwidth requirements in the optical access network have grown significantly in proportion. PON technologies have been a dominant solution to meet such high-capacity demand from end users, by offering relatively low-cost P2MP services.

Accordingly, the industry expects to upgrade the access network to 25/50-Gb/s, and even 100-Gb/s, PON technologies in the near future. The IEEE 802.3ca Task Force has recently, for example, released a 25/50G NG-EPON specification based on wavelength multiplexing of 25 Gb/s per single channel, and ITU-T/FSAN has launched new projects to standardize higher speed PONs, such as 50G single-wavelength TDM-PONs. However, both of these recent PON standardization proposals are based on intensity modulation and direct detection (IM/DD) in physical layer, and not, for example, based on coherent detection.

Single-wavelength high-speed TDM-PON systems are nevertheless of great interest in the industry, in comparison with system mechanisms for bonding multiple wavelengths, because the single-wavelength solution not only reduces the number of required optical components and the associated costs thereof, but also saves wavelength resources. Furthermore, 100G PON proposals using wavelength multiplexing and IM/DD of four 25 Gb/s, or two 50 Gb/s, channels are considered in the industry to be too challenged by their limited power budget and complicated wavelength resource management techniques. For example, a 100G PON based on O-band IM/DD has been recently proposed downstream transmission, however, this proposal requires a prohibitively large launch power at the OLT-side. A correspondingly high launch power is therefore considered out of reach at the ONU-side, that is, for upstream transmission. Moreover, appropriate transmission wavelength windows are difficult to obtain in the O-band in consideration of coexistence with legacy PON services. Therefore, the limited sensitivity of the 100G TDM-PON is considered too great of a challenge to increasing the data rate on a single wavelength to meet the PR-30 (>29-dB link loss) power budget using direct detection in the O-band.

The present embodiments overcome these challenges by providing a 100-Gb/s, single wavelength, coherent detection TDM-PON. Coherent PONs, for example, provide higher sensitivity, and due to continuing DSP advancements, coherent PONs enable significantly higher access capacity and longer coverage reach. Coherent technology though, remains costly. Recent efforts to reduce the cost and complexity of coherent optics in the access network include semi-coherent systems using heterodyning, amplitude modulation, and Alamouti-coding based polarization-independent detection. However, these efforts to simplify the complexity have resulted in trade-offs that have penalized the sensitivity of the network, increased the device bandwidth requirements, and required non-standard coherent transceiver architectures. For example, where a single Mach-Zehnder modulator has been substituted for the dual-polarization I/Q modulator at the transmitter-side, this reduction to the complexity of the transmitter as required a corresponding increase to the complexity of the receiver, which in this example requires twice the bandwidth in comparison with an analogous receiver in a full-coherent QPSK system. This example of a semi-coherent system also still suffers the sensitivity penalty trade-off.

Because coherent optics in a fully-coherent system is at present the only practically-available, commercially-developed, and mass-deployed optical coherent communication technology in the field, the present embodiments build on this existing mature platform, in consideration of recent developments in opto-electronic integration and CMOS technology, as well as the existing market size in the access network, to achieve 100G coherent PON in a full-coherent system. The present embodiments are further fully compatible with related techniques that reduce and optimize the costs, complexity, and power consumption of the access network.

To realize these advantageous results, the following embodiments provide systems and methods for robustly achieving upstream burst mode coherent detection. That is, as discussed above, upstream transmission in the TDM-PON is burst-mode, which is different from the operation of the downstream transmission, where signals are continuously broadcast to all end users. In an exemplary embodiment, a centralized OLT receives signals, burst-by-burst, from different user-side ONUs. The different respective incoming upstream bursts signals are typically received by the OLT at different respective signal powers, carrier phases, times or clocks, and/or SoPs.

The present embodiments thus realize significant improvements to signal recovery and processing of the upstream burst signals at the OLT. For efficient recovery and processing of upstream transmissions at the OLT, the OLT must be able to respond rapidly to recover the burst signals from the various ONUs within a short time duration, and then be able to reset itself for the next incoming upstream burst. In comparison with burst-mode signal recovery techniques used by direct-detection PONs, signal recovery in the coherent PON is considerably more challenging due to the greater complexity of coherent optical signals, which are modulated and multiplexed on phase, polarization, and amplitude.

The present embodiments still further overcome the unsuitability of conventional continuous-mode coherent detection and DSP used in P2P links, which are typically based on blind or feedback-type equalization techniques, and thus required too long an acquisition time to accomplish signal recovery for burst-mode detection. The present systems and methods additionally effectively address the additional challenges arising from burst-mode DSP, such as: (i) other non-DSP subsystems are required to operate at sufficient similar high speed to detect the short optical bursts; and (ii) frequency-offset estimation must be similarly sufficiently fast, and also able to withstand a large offset range due to possible laser wavelength drift.

Some recent proposals attempt to address these additional challenges through techniques such as: (i) designed preambles and fast DSPs to achieve fast polarization separation, which fit pilot sequences into the burst-mode detection of a 100G PDM-QPSK coherent TDM-PON; (ii) a real-time 20-Gb/s single-polarization QPSK coherent burst-mode detection using 1.0-MHz clock frequency difference; and (iii) fast I/Q imbalance compensation for 100G PDM-QPSK burst-mode detection with using an 826-ns preamble. However, none of these recent proposals provide practical details on the overall preamble design, the related burst-mode signal processing performance, or importantly, how to reduce and optimize the preamble length for the 100G coherent TDM-PON. Although a burst-mode DSP architecture for coherent PONs has also been proposed, this previous architectural proposal utilizes pre-calculated tap coefficients for adaptive equalization during the ONU discovery process to enable preamble lengths, and is thus unsuitable for easy integration with different architectural configurations.

The following embodiments therefore further solve these additional problems, by providing systems and methods for reliable and efficient preamble design, with corresponding burst-mode DSP, for coherent upstream burst-mode detection in a 100G coherent TDM-PON. The present systems and methods still further provide detailed descriptions of the preamble design configuration and associated principles, as well as related key DSP functions, such as frame synchronization, SoP estimation, and FOE.

The following description additionally provides detailed analyses that demonstrate the utility of the present systems and methods, including experimental results showing improvements with respect to frequency-offset and fiber CD, as well as verification of the efficiency and overall performance using the present designed preamble techniques under different test conditions. According to the present systems and methods, the preamble length may be advantageously reduced by sharing the preamble unit among multiple DSP functions, and a robust performance in large frequency-offset and residual fiber dispersion is confirmed.

FIG. 22A is a schematic diagram depicting a burst-frame architecture 2200 for a conventional direct-detection PON. FIG. 22B is a schematic diagram depicting an upstream recovery technique 2202 for direct-detection burst-frame architecture 2200, FIG. 22A. In the embodiments depicted in FIGS. 22A-B, burst frame architecture 2200 and recovery technique 2202 respectively represent burst frame structures and upstream burst-mode signal recovery functions for a conventional direct-detection TDM-PON according to the IEEE 802.3ca NG-EPON example.

As illustrated in FIG. 22A, upstream burst-frame architecture 2200 begins with three synchronization patterns (SPs) 2204, which are not under the FEC protection. More specifically, a first SP 2204(1) (SP1) is used for receiver (Rx) settling with the function of automatic gain control, a second SP 2204(2) (SP2) is used for the function of burst clock and data recovery (BCDR), and a third SP 2204(3) (SP3) is used for frame synchronization with the state-of-burst delimiter (SBD) function to indicate the start of the burst after synchronization. Upstream burst-frame architecture 2200 further includes a payload portion 2206 following SPs 2204, and an end-of-burst delimiter (EBD) portion 2208 following payload portion 2206.

As illustrated in FIG. 22B, corresponding burst-mode signal recovery functions of conventional technique 2202 include an automatic gain control section 2210 and a burst-mode signal processor 2212. In operation, automatic gain control section 2210 is configured to first perform automatic gain control with SP1, for example, using a burst-mode transimpedance amplifier (BM-TIA, not separately shown in FIG. 22B). After the BM-TIA achieves steady-state, the burst-mode signal processor in the receiver of the OLT begins processing the steady-state signal from automatic gain control section 2210 to acquire phase lock on the incoming data stream at a clock and data recovery portion 2214. In the conventional direct-detection PON, no channel equalization is generally required. Once processor 2212 of the receiver successfully locks the clock of burst signal, the data will also be recovered with SP2. Once recovered, a frame synchronization unit of processor 2212 then processes payload portion 2206 after the SBD of SP3 indicates the start-of-burst. Finally, end of the upstream burst is indicated upon detection of EBD portion 2208.

A comparison of this conventional direct-detection frame architecture and processing functionality may be seen with respect to the exemplary coherent architecture and functionality described further below with respect to FIGS. 23A-B. For example although some of the burst-mode detection principles of the conventional direct-detection PON may be applicable to a coherent PON, coherent upstream burst-mode detection is known to be significantly more challenging due to the increased complexity of coherent optical signals, which are modulated and multiplexed on phase, polarization, and amplitude. As described further below, the DSP of a coherent OLT receiver is required to process different clocks, different carrier frequency-offsets, different carrier phases, random SoPs, and different channel responses from different bursts.

FIG. 23A is a schematic diagram depicting an exemplary burst-frame architecture 2300 for a coherent passive optical network. FIG. 23B is a schematic diagram depicting an exemplary upstream recovery technique 2302 for coherent burst-frame architecture 2300, FIG. 23A. The exemplary embodiments depicted in FIGS. 23A-B respectively depict exemplary burst-frame structures and upstream burst-mode signal recovery functions for a coherent PON.

As illustrated in FIG. 23A, different from the three-SP structure of upstream burst-frame architecture 2200, FIG. 22A, upstream burst-frame architecture 2300 includes four different SPs 2304 for coherent detection of upstream burst PDM signals, which generally require polarization separation and channel equalization for DSP, as described in greater detail with respect to the embodiments above. According to the exemplary frame structure of burst-frame architecture 2300, the overall preamble is advantageously designed for coherent burst synchronization and channel equalization.

More specifically, a first SP 2304(1) (SP1) is used for receiver (Rx) settling with the function of automatic gain control (e.g., similar to first SP 2204(1), FIG. 22A), a second SP 2304(2) (SP2) is designed for digital clock recovery (Clock RCY), a third SP 2304(3) (SP3) may be optimized for channel synchronization (CH SYNC) with multiple functions, and a fourth SP 2304(4) (SP4) is used for channel adaptive equalization (CH EQ). Upstream burst-frame architecture 2300 further includes a payload portion 2306 following SPs 2304, and an EBD portion 2308 following payload portion 2306.

As illustrated in FIG. 23B, corresponding burst-mode signal recovery functions of coherent recovery technique 2302 include an automatic gain control section 2310 and a burst-mode signal processor 2312, similar to conventional technique 2202, FIG. 22B. In operation, automatic gain control section 2310 is configured to first perform automatic gain control with first SP 2304(1). At the time of this application there is no commercially-available BM-TIA for coherent upstream burst-mode detection. Accordingly, in an embodiment, automatic gain control section 2310 may perform optical automatic gain control using a semiconductor optical amplifier (SOA) or an erbium doped fiber amplifier (EDFA). Nevertheless, the present inventors contemplate that, once a linear coherent BM-TIA is demonstrated and available, such a coherent BM-TIA may be integrated with automatic gain control section 2310 to perform optical automatic gain control without departing from the scope of the embodiments herein.

In further operation of coherent recovery technique 2302, burst-mode signal processor 2312 is configured to perform burst-mode digital signal processing functions after automatic gain control section 2310, and based on the preamble design of second, third, and fourth SPs 2304(2-4). In the exemplary embodiment, all functions of burst-mode signal processor 2312 may be implemented digitally, acting as a DSP, and which may follow an ADC (not separately shown in FIG. 23B). Burst-mode signal processor 2312 may further include one or more of an optional CD compensation unit 2314, a clock recovery unit 2316, a channel synchronization unit 2318, a channel equalization unit 2320, and a payload processing unit 2322.

After the receiver achieves steady-state from automatic gain control section 2310, digital clock recovery may be implemented by clock recovery unit 2316, with second SP 2304(2), to acquire frequency and phase lock to the clock of an incoming burst structured according to burst-frame architecture 2300. After digital clock recovery, channel synchronization unit 2318 may perform channel synchronization, with third SP 2304(3), and which may employ additional multiple sub-functions, including one or more of accurate frame synchronization, carrier frequency-offset estimation, and SoP estimation for polarization separation and recovery. Channel equalization unit 2320 may then apply, with fourth SP 2304(4), channel response estimation for adaptive channel equalizations. Using the relevant respective information obtained from SPs 2304(2-4) of the preamble, a payload demodulation process implemented by payload processing unit 2322 may be greatly simplified, along with a significant reduction of the convergence time.

Persons of ordinary skill in the art will appreciate that the particular order of burst-mode DSP functions/functional units of burst-mode signal processor 2312 are illustrated in FIG. 23B for illustration purposes, and are not intended to be limiting. The functional order may, for example, differ according to the particular algorithms implemented, as shown by the different implementation techniques described above with respect to FIGS. 15 and 17. Additionally, because many DSP algorithms that based on training sequences typically require accurate starting positions, frame synchronization is a first sub-function implemented in the channel synchronization process performed by channel synchronization unit 2318, in the case where training sequences are employed. In some embodiments, two or more of SPs may be combined into a single SP using the same sequence pattern. Nevertheless, all of the corresponding functions described herein may still be applied to incoming bursts.

Additional robust and efficient preamble architectures, having data-assisted burst-mode DSPs in coherent upstream burst-mode detection after Rx-settling, are described further below.

FIG. 24 depicts an exemplary preamble architecture 2400 for a coherent burst-mode passive optical network. In the embodiment depicted in FIG. 24, preamble architecture 2400 represents an innovative high-efficiency upstream frame structure for preambles preceding payload sections 2402 of respective polarization signals 2404 of an upstream burst transmission polarization multiplexed signal in a 100G coherent PON.

In an exemplary embodiment, preamble architecture 2400 includes a first preamble processing SP 2406 (SP-A), a second preamble processing SP 2408 (SP-B), and a third preamble processing SP 2410 (SP-C). In this example, first, second, and third preamble processing SPs 2406, 2408, 2410 are respectively analogous to SP 2304(2), SP 2304(3), SP 2304(4), FIG. 23A. That is, SP-A is analogous to SP2, SP-B is analogous to SP3, and SP-C is analogous to SP4. As illustrated in FIG. 24, second preamble processing SP 2408 is configured for each respective polarization signal 2404 to have a 2×N conjugate symmetric symbol length over each of a first time slot 2412 and a second time slot 2414 within SP-B, for a total length of 4N symbols (described further below). As illustrated, each time slot 2412, 2414 includes 2N conjugate symmetric symbols in one polarization, and 2N zeros on the other polarization in that time slot with the symbol/zero polarization relationship alternating in the other time slot. In this respect, second preamble processing SP 2408 may be seen to include a frame structure similar to data unit 1402C, FIG. 14C.

It may be noted here that the exemplary preamble architecture 2400 depicted in FIG. 24 does not exclude the additional inclusion of a preceding control SP analogous to SP1 of FIG. 23A, namely, a preamble control SP used for Rx-settling and automatic gain control. However, as illustrated above with respect to FIGS. 22A and 23A, because the control SP1 is not utilized for DSP, such a control SP is not further illustrated in FIG. 24 to simplify the illustration. That is, the design of preamble processing SPs 2406, 2408, 2410 is drawn toward the corresponding burst-mode DSP functions of the receiver that utilize the relevant preamble processing SPs.

Therefore, in the exemplary embodiment, in practical application of the techniques described herein, a preamble control SP1 is included in the preamble before preamble architecture 2400, and therefore the length (in time) of the entire preamble will be the sum of the respective lengths of SP1, SP-A, SP-B, and SP-C. As described further below with respect to FIG. 25, the overall burst-mode DSP flow at the corresponding receiver may be designed according to a feed-forward configuration to reduce the processing latency and shorten the burst preamble length of preamble architecture 2400.

FIG. 25 depicts an exemplary DSP 2500 for processing an upstream burst transmission implementing preamble architecture 2400, FIG. 24. In the example depicted in FIG. 25, DSP 2500 represents a data-aided burst-mode DSP for a 100G coherent PON. In an exemplary embodiment, DSP 2500 includes one or more of a frame detection and normalization unit 2502, a CD compensation unit 2504, a burst clock recovery unit 2506, a frame synchronization unit 2508, a burst SoP estimation and polarization demultiplexing unit 2510, a preamble-based FOE unit 2512, a channel estimation unit 2514, a payload signal processing unit 2516, and a phase recovery unit 2518. As with processor 2312 of coherent recovery technique 2302, FIG. 23B, some of the respective functional units of DSP 2500 may be optional and/or disposed in a different functional order, without departing from the scope of the embodiments herein. In some embodiments, additional processing units or functionality may also be included beyond the DSP functions shown in FIG. 25. In the exemplary embodiment, DSP 2500 is disposed after Rx-settling has occurred (e.g., after an automatic gain control section of that particular receiver).

In exemplary operation of DSP 2500, after normalization and non-data-aided CD compensation is performed by frame detection and normalization unit 2502 and CD compensation unit 2504, respectively, five particular data-aided DSP functions are performed based on the three preamble processing SPs 2406, 2408, 2410 (SP-A, SP-B, SP-C). In this example, first preamble processing SP 2406/SP-A is used by burst clock recovery unit 2506 for burst-clock-recovery based on DC-balanced, state QPSK symbols that are distributed nearly equally. In an exemplary embodiment, a fast square-timing-recovery algorithm may additionally be applied based on the received symbols (not separately shown) within SP-A. In this case, because the square-timing-recovery algorithm is not training based, there would be no need for accurate frame synchronization, which may eliminate the need for the separate frame synchronization unit 2508. In at least one embodiment, the particular pattern used for SP-A may also be used to achieve burst-mode automatic gain control. For example, SP-A may include a symbol portion corresponding to an additional preamble control SP1. In this case, the overall length of SP-A would be increased to include the additional SP 1 symbol portion.

In further operation of DSP 2500, second preamble processing SP 2408/SP-B is of particular importance, and which may be specially designed to perform one or more of three key data-aided DSP functions: (1) frame synchronization (e.g., by frame synchronization unit 2508); (2) SoP estimation (e.g., by burst SoP estimation and polarization demultiplexing unit 2510); and (3) FOE (e.g., by preamble-based FOE unit 2512). Accordingly, by utilizing a single preamble SP to perform all three of these DSP functions, the overall preamble length is advantageously reduced by sharing the same preamble SP (i.e., SP-B). Of these three key functions, it may be desirable to implement accurate frame synchronization first, in the case where the other key functions may be based on a training sequence that requires perfect frame synchronization. Thus, where training sequences may be implemented, frame synchronization unit 2508 may be logically placed prior to burst SoP estimation and polarization demultiplexing unit 2510 and preamble-based FOE unit 2512. In this example, it is therefore assumed that the relevant frame synchronization algorithm is tolerant of carrier frequency offset.

In an exemplary embodiment, the sub-architecture of second preamble processing SP 2408 is advantageously designed to include 4N symbols within SP-B, including 2N conjugate symmetric symbols and 2N zeros on each respective polarization, as described above. As illustrated in FIG. 24, the dual-polarization SP-B may be transmitted according to the pattern [$S_X$, 0; 0, $S_Y$]. In this example, $S_X=[s_{x1}, \ldots, s_{xN}, s_{xN}^*, \ldots, s_{x1}^*]$, and $S_Y=[s_{y1}, \ldots, s_{yN}, s_{yN}^*, \ldots, s_{y1}^*]$. In this manner, essentially all of the 4N symbols in SP-B of the preamble may be staggered and transmitted with 2N symbols for each polarization. Additionally, without inter-polarization crosstalk between the X- and Y-polarizations, accurate frame synchronization may, for example, be realized using a sliding window with normalized auto-correlation processing on each polarization according to:

$$C_{x,y}(m) = \text{abs}\left[\sum_{k=0}^{N-1} r_{x,y}(m+k)r_{x,y}(m+2N+k-1)\right]/P_N \quad \text{(Eq. 14)}$$

Here, $C_x$ and $C_y$ represent respective normalized auto-correlation functions on each polarization, $P_N$ represents a normalization signal power factor, and $r_x$ and $r_y$ represent the received signals from X- and Y-polarizations, respectively. Because of the conjugate symmetric symbol distribution across the two time slots SP-B, it may therefore be demonstrated that the correlation results of Eq. 14 is tolerant of FOE. Accordingly, referring to the transmitted signals by $T(mt_s)$, the received signals $r(mt_s)$ may be expressed according to:

$$r(mt_s)=T(mt_s)\exp(j2\pi\Delta f(mt_s)+\varphi) \quad \text{(Eq. 15)}$$

Here, $\varphi$ represents the carrier phase, and $\Delta f$ represents the frequency-offset between the burst signal and the LO in the OLT. Assuming $m_0$ two symbolize the first symbol of the designed 2N conjugate symmetric symbols, the following is true:

$$T_S(k+1)=T_S(2N-k)^*=S_k, \quad 0 \le k \le N \quad \text{(Eq. 16)}$$

Therefore, when synchronized, the normalized auto-correlation peak may be expressed according to:

$$\begin{aligned}
C_x(m_0) &= \text{abs}\left\{\sum_{k=0}^{N-1} r_x[(m_0+k)]r_x[(m_0+2N-k-1)]\right\}/P_N \\
&= \text{abs}\Big\{\sum_{k=0}^{N-1} T_S[(m_0+k)]\exp[j2\pi\Delta f(m_0+k)t_s+\varphi] \times \\
&\quad T_S[(m_0+k)]^*\exp[j2\pi\Delta f(m_0+2N-k-1)t_s+\varphi]\Big\}/P_N \\
&= \text{abs}\Big\{\sum_{k=0}^{N-1} |T_S[(m_0+k)t_s]|^2 \exp[j2\pi\Delta f(2m_0+ \\
&\quad 2N-1)t_s+2\varphi]\Big\}/P_N \\
&= \sum_{k=0}^{N-1} |T_S[(m_0+k)t_s]|^2/P_N
\end{aligned} \quad \text{(Eq. 17)}$$

According to this advantageous processing configuration, both the frequency-offset and the signal phase may be seen to have no impact on these processing results, while the normalized auto-correlation peak is nevertheless tolerant of carrier frequency offset errors.

Polarization, however, is known to randomly rotate after fiber transmission. Accordingly, to improve the tolerance to such polarization rotations, a combining scheme may be further implemented according to:

$$C(m)=W_x(m)C_x(m)+W_y(m)C_y(m), \quad \text{(Eq. 18)}$$

where $C(m)$ represents the combined function for peak searching, and $W_x$ and $W_y$ are defined to represent the respective power ratio of each polarization.

For example, $W_x$ and $W_y$ may be expressed according to:

$$W_x(m) = \frac{P_x(m)}{P_x(m)+P_y(m)}, \quad \text{(Eq. 19)}$$
$$W_y(m) = \frac{P_y(m)}{P_x(m)+P_y(m)}$$

In this manner, an exact location of the SP-B symbols may be found from the received signal, and the synchronization algorithm discussed above is shown to be robust to carrier frequency-offset and polarization rotations.

In an exemplary embodiment, the same SP-B portion of the preamble may also be used for SoP estimation. For example, assuming that the received SP-B symbols may be expressed according to $[r_{x1}, r_{x2}; r_{y1}, r_{y2}]$, the SoP may be instantly estimated after frame synchronization from the received SP-B symbols.

Thus, considering the single polarization case described above, the inverse Jones Matrix H may be estimated according to:

$$H = \begin{bmatrix} \sqrt{\alpha_2}\, e^{-j\gamma_2} & -\sqrt{(1-\alpha_1)} \\ \sqrt{(1-\alpha_2)} & \sqrt{\alpha_1}\, e^{j\gamma_1} \end{bmatrix}, \quad \text{(Eq. 20)}$$

where $\alpha_2$ and $\gamma_2$ may be calculated based on the received signals according to:

$$\alpha_1 = \frac{|r_{x1}/r_{y1}|^2}{(1+|r_{x1}/r_{y1}|^2)}, \quad \text{(Eq. 21)}$$

$$\gamma_1 = \arg(r_{x1}/r_{y1})$$

In a similar manner, $\alpha_2$ and $\gamma_2$ may be obtained using the second half of the symbols within SP-B (e.g., within second time slot 2414, FIG. 24). Polarization separation may thus be effectively realized based on the inverse of Jones Matrix H. After separating the two polarizations, frequency-offset may be estimated based on the same training symbols contained in SP-B.

In an exemplary embodiment, to achieve fast and accurate FOE, a maximum likelihood (ML) criteria FOE algorithm may be modified, by considering the different polarizations, and implemented to estimate the carrier frequency-offset according to:

$$\Delta f = \text{avg}(\Delta f_x, \Delta f_y), \quad \text{(Eq. 22)}$$

where $\Delta f_x$ and $\Delta f_y$ represent the estimated frequency-offset in the X- and Y-polarizations based on the 2N non-zero symbols described above.

In the exemplary embodiment, third preamble processing SP 2410/SP-C may be advantageously designed to include training QPSK symbols for channel estimation (e.g., by channel estimation unit 2514), and which may be based on a CMA algorithm for DSP. It is noted that this implementation of CMA in DSP is different than the conventional CMA implementation in a continuous-mode DSP, where the CMA is blind, without any information regarding the SoP. Here we apply the inverse of Jones Matrix H to reduce the convergence time of CMA. In contrast, the CMA implementation for SP-C enables all relevant information to be obtained from the preamble, and then applied to the following payload processing performed by payload signal processing unit 2516, thereby greatly simplifying the payload demodulation process while also significantly reducing the convergence time in comparison with the conventional blind CMA techniques that are devoid of any SoP information of SoP, as confirmed by the experimental demonstration results described further below. In at least one embodiment, a feed-forward phase recovery algorithm is implemented by phase recovery unit 2518 as a final step in the signal recovery process before BER measurements.

FIG. 26 is a schematic diagram depicting an exemplary test system 2600 for upstream burst detection. The embodiment depicted in FIG. 26, system 2600 represents an experimental setup to demonstrate coherent upstream burst detection in a 100-Gb/s/TDM coherent PON, which exhibited a detected power waveform 2602 of a burst frame transmitted therein including a preamble design according to preamble architecture 2400, FIG. 24.

For the experimental demonstration set up depicted in FIG. 26, system 2600 included an ONU-side 2604 transmitting upstream to an OLT-side 2606 over a 50 km single mode fiber (SMF) 2608. At ONU-side 2604, two synchronized ONUs 2610 were separately run to generate respective 25-GBaud PDM-QPSK burst frames utilizing a preamble frame structure according to preamble architecture 2400, FIG. 24. For this setup, the burst frames were generated by respective 80-GSa/s arbitrary waveform generators (AWGs) 2612, and then fed into respective dual-polarization I/Q modulators 2614. For this setup, each dual-polarization I/Q modulator 2614 included four drivers for optical signal modulation. Each ONU 2610 further included a respective tunable DFB laser 2616, each tuned to a 1550-nm wavelength with a linewidth of approximately 1 MHz as the laser source of that ONU 2610.

For demonstration purposes, after modulation by dual-polarization I/Q modulator 2614(1), the burst signals generated from first ONU 2610(1) are combined with a dummy signal from second ONU 2610(2) using a 3-dB optical coupler (OC) 2618, and the respective burst frames from the two ONUs 2610 were staggered to avoid collision. Using an automatic bias-control and synchronization 2620 between the two AWGs 2612, the burst signal from one ONU 2610 was coupled only with the null signal from the other ONU 2610.

The combined burst signals from ONU-side 26 044 then transmitted over 50-km SMF 2608, and received optical power to OLT-side 2606 was controlled by a variable optical attenuator (VOA) 2622 for BER testing. At OLT-side 2606, a burst-mode EDFA 2624 was used for signal pre-amplification. The pre-amplified signal was then mixed with LO 2626 in an integrated coherent receiver (ICR) 2628 for coherent detection. In this setup, LO 2626 included a tunable external-cavity-laser (ECL) at 1550-nm and a linewidth<100 kHz. After coherent detection by ICR 2628, the received signals were sampled by an 80-GSa/s digital sampling oscilloscope (DSO) 2630 and then processed using an offline burst-mode 2632 conforming to the exemplary configuration of DSP 2500, FIG. 25. For this setup, DSO 2630 was free-running, and there was no synchronization deployed between DSO 2630 and AWGs 2612.

The symbol lengths of the respective preamble processing SPs, used in the burst frames generated by ONUs 2610, are listed below in Table 1, which features a summary of the respective preamble SP types, lengths, and functions.

TABLE 1

| Preamble | Length (Symbols) | Functions |
|---|---|---|
| SP-A | 1024 | Burst Clock Recovery |
| SP-B | 512 | Frame Sync, Pol DeMux, FOE |
| SP-C | 256 | Channel Estimation |

As may be seen from Table 1, SP-A, SP-B, and SP-C have symbol length of 1024, 512, and 256 symbols, respectively. Accordingly, each burst frame may be calculated to contain a total preamble length of 71.68 ns (i.e., 1792 symbols), a payload length of 3.072 µs, an end of burst (EOB) length of 30.72 ns. For this setup, a guard interval (GI), having a length of 102.4 ns, was included to separate the bursts.

FIGS. 27A-D are graphical illustrations depicting respective experimental result plots 2700, 2702, 2704, 2706 from test system 2600, FIG. 26. Because SP-B is configured to have the most notable processing impact of the present preamble embodiments, plots 2700, 2702, and 2704 were generated to demonstrate the testing performance of SP-B with respect to frame synchronization, SoP estimation, and FOE, respectively.

More particularly, plot 2700 of FIG. 27A depicts the experimental results of the normalized auto-correlation output for peak search. Plot 2700 therefore demonstrates the frame synchronization result based on the combined auto-correlation result of C(m). It may be seen from plot 2700 that two peaks 2708 appear at the respective X- and Y-polarizations, and peak very sharply at the synchronization point locations. These sync-peak locations therefore represent the start of non-zero SP-B symbols in the received signals. To quantify this performance of the frame synchronization, peak-to-maximum-noise ratio (PMNR) metric 2710 is here defined to indicate the quality of sync-peaks in comparison with noise peaks.

Plot 2702 of FIG. 27B depicts experimental results of PMNR against the length of SP-B non-zero symbols. As may be seen from plot 2702, each polarization had 256 non-zero symbols in SP-B, that is, 512 symbols total within SP-B that included 256 zeros, provided over 10-dB PMNR, showing very high-quality peaks.

Plot 2704 of FIG. 27C depicts experimental results of PMNR against frequency offset. As described above, the present frame synchronization techniques are tolerant of FOEs, which is demonstrably verified by the experimental results shown in plot 2704. Plot 2704 further confirms that a PMNR of over 10 dB may be achieved even with a 25 GHz offset range (−12.5 to 12.5 GHz, in this example).

Plot 2706 of FIG. 27D, on the other hand, depicts the experimental results of PMNR against different polarization rotations namely, the X-polarization, the Y-polarization, and a combination thereof. Plot 2706 thus demonstrates the performance of frame synchronization under different polarization rotation states. According to plot 2706, it may further be seen that the PMNR from each individual polarization is polarization-dependent, and changes according to the polarization rotation, as shown by individual polarization PMNR subplots 2712. In contrast, as shown by combined PMNR subplot 2714, the combined PMNR is substantially polarization-independent thereby verifying the mathematical principles described above with respect to Eq. 18 that indicate the advantageous tolerance of polarization rotation.

FIG. 28A is a graphical illustration depicting a comparative plot 2800 depicting an estimated frequency offset against a target frequency offset. More particularly, comparative plot 2800 illustrates the FOE performance of the present preamble-based DSP FOE (e.g., of preamble-based FOE unit 2512 using second preamble processing SP 2408/SP-B), over the 25 GHz estimation range, shown in a first subplot 2802 of plot 2800. For comparison, a second subplot 2804 of plot 2800 is superimposed to show the performance of a feed-forward blind FOE DSP technique, which, in this example, was based on a long data sequence. A comparison of first subplot 2802 with second subplot 2804 demonstrates that the present preamble-based FOE technique, which utilizes the innovative SP-B architecture described above, outperforms the blind long-data-based technique. Additionally, it is notable that the present preamble-based FOE technique realized a larger estimation range (e.g., from −12.5 to 12.5 GHz), and the blind FOE technique used 2500 symbols, whereas the present preamble-based FOE technique used only 512 symbols within SP-B (i.e., 256 non-zero symbols on each polarization).

FIG. 28B is a graphical illustration depicting a comparative BER performance result plot 2806 for subplots 2802, 2804, FIG. 28A. More particularly, comparative BER performance result plot 2800 includes a first subplot 2808 demonstrating the BER performance of the present preamble-based FOE over the 25 GHz range, and a second subplot 2010 demonstrating the BER performance of the blind long-data-based FOE over the same range. From first subplot 2808, it may be seen that the BER penalty is almost negligible for the present preamble-based FOE when the frequency offset is less than ±10 GHz. However, as illustrated by second subplot 2810, due to the phase ambiguity, the feed-forward blind FOE method fails when the frequency-offset is greater than ±2.5 GHz.

FIG. 29 is a graphical illustration depicting a residual frequency offset plot 2900. More particularly, plot 2900 illustrates the performance of residual FOE against the length of non-zero training symbols in SP-B. The results illustrated in plot 2900 thus confirm that 256 non-zero symbols for each polarization in SP-B is sufficient to accurately achieve a residual offset of <2-MHz. In an exemplary embodiment, this residual offset value may be subsequent processed in carrier phase recovery function/functional unit of the DSP (e.g., phase recovery unit 2518, FIG. 25).

FIG. 30A is a graphical illustration depicting a plot 3000 of signal mean square error (MSE) before channel equalization. FIG. 30B is a graphical illustration depicting a comparative plot 3002 of signal MSE after channel equalization. More particularly, plot 3000 illustrates the results of SoP estimation by plotting the MSE against the length of non-zero symbols in SP-B, and comparative plot 3002 illustrates the signal MSE against the training length of symbols in SP-C. These SoP estimation results of comparative plot further demonstrate the impact on the required symbol length in SP-C used for channel estimation (e.g., by channel estimation unit 2514, FIG. 25).

Plot 3000 further shows the results from testing the required SP-B symbols for SoP estimation before the channel equalization. It may be seen from plot 3000 that 256 non-zero symbols on each polarization in SP-B (512 symbols in total) is sufficient to minimize the impact from MSE. Comparative plot further shows the results from testing the impact on adaptive channel equalization (i) without using SP-B for SoP estimation, as illustrated in a first subplot 3004, and (ii) with SP-B, as illustrated in a second subplot 3006. First subplot 3004 thus illustrates how, without SP-B as described herein, the CMA process for channel equalization requires a considerably long convergence time due to the random polarization rotation. In contrast, as illustrated in second subplot 3006, use of SP-B for SoP estimation, drastically reduces the minimum convergence time (i.e., indicating the length of SP-C training symbols) from 2560 symbols without SP-B to only 256 symbols with SP-B. Accordingly, by greatly reducing the channel response estimation time in this manner, the overall preamble length is also similarly reduced.

FIG. 31 is a graphical illustration depicting a comparative BER performance result plot 3100. More particularly, plot 3100 depicts the BER performance against received optical power for an ECL-based continuous 100G PDM-QPSK signal, a back-to-back (B2B) DFB-based burst signal, and the DFB-based burst signal transmitted over 50 km SMF 2608, FIG. 26. After 50-km fiber transmission, plot 3100 demonstrates that a required optical power value 3102, at an average BER of $1\times10^{-3}$, is shown to be −39 dBm. Plot 3100 therefore further includes, for illustration purposes, a first constellation 3104 of the 50 km DFB-based burst signal and a second constellation 3106 of the B2B DFB-based burst signal, with both of first and second constellations 3104, 3106 taken at −39 dBm.

For further comparison, the plotted results of the ECL-based continuous 100G PDM-QPSK signals demonstrate the consistent performance over the different signal types. Furthermore, due to the high receiver sensitivity offered by the coherent detection technology employed in the test setup of FIG. 26, system 2600 was able to implement a pre-FEC BER threshold of $1\times10^{-3}$, as opposed to the $1\times10^{-2}$ pre-FEC threshold of non-coherent PON systems. That is, lower coding and decoding complexities are expected from such simpler FEC coding schemes. Plot 3100 further shows that, when compared with the ECL-based continuous signals, there is less than a 0.3-dB penalty for the DFB laser-based burst signals after burst-mode coherent detection.

Plot 3100 still further illustrates the results from testing a dynamic range 3108 of the coherent receiver. That is, without having changed the receiver setup in OLT-side 2606 (i.e., the same BM-EDFA 2624 and ICR 2628 were kept), a dynamic range 3108 of approximately 20 dB is exhibited for the received power of the 100G coherent PON upstream burst signals. For system 2600, dynamic range 3108 only depicts the test results using BM-EDFA 2624. Nevertheless, the present inventors contemplate that an effective dynamic range will also be achieved using an SOA instead of an EDFA.

FIG. 32 is a graphical illustration depicting a BER performance plot 3200 as a function of residual CD. More particularly, plot 3200 demonstrates the test results of the overall BER performance under different residual CD values. Plot 3200 thus confirms that there is no overt BER penalty experienced when the residual dispersion is within 87.5 ps/nm (i.e., −43.75 to +43.75 ps/nm, in this test setup), and only is a small BER penalty is experienced for residual dispersion within 437.5 ps/nm (i.e., −218.75 to +218.75 ps/nm, in this test setup). For this test, the received optical power was maintained at −38.5 dBm during the entirety of the test from which the results are illustrated in plot 3200.

FIG. 33 is a graphical illustration depicting a long-term bit-error-ratio performance result plot 3300. For plot 3300, the BER was tested continuously for a duration of approximately 6 hours. Plot 3300 thus effectively demonstrates testing of BER performance of the present systems and methods for long-term operation. For this testing implementation, a margin of 1 dB was reserved, and thus the received optical power was maintained at −38 dBm. As shown in plot 3300, measured BER values 3302, over the 6-hour test duration, all stayed below an FEC threshold value 3304 of BER at $1 \times 10^{-3}$, thereby further confirming the long-term stability of the present preamble architectures and corresponding burst-mode DSP for upstream burst-mode coherent detection. For the testing considerations that produced the results shown in plot 3300, the output power from the ONU was −2 dBm. Therefore, plot 3300 still further demonstrates the achievement of a 36-dB power budget (including a 1-dB margin).

According the embodiments described above, an innovative preamble architectural design is provided, as well as a corresponding burst-mode DSP solution, enabling significantly improved coherent upstream burst-mode detection in a 100G TDM coherent-PON. The above embodiments further demonstrate that these advantageous architectural and DSP function systems and methods are experimentally verified to be both reliable and efficient over a variety of different relevant test scenarios and test conditions.

The unique preamble architectural configuration described herein provides still further advantages over conventional techniques by enabling individual portions of the new preamble structure to be shared by multiple DSP functions, or functional units, thereby greatly reducing the overall preamble length. The experimental results described above further confirmed a robust performance of the present embodiments over a large frequency-offset, residual fiber dispersion, and long running times. As a proof-of-concept, a relevant testing system setup achieved effective coherent upstream burst-mode detection of a 100 Gb/s PDM-QPSK signal, with 36-dB power budget, and after 50-km SMF transmission using the present preamble architectures having a length of 71.68 ns at the transmission-side, with corresponding burst-mode DSP at the receiver-side. The present systems and methods still further demonstrated approximately 20 dB of received power dynamic range for burst signal detection in a 100-Gb/s/TDM coherent-PON.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A data structure apparatus for structuring a burst-mode digital data stream of a polarization multiplexed signal transmitted over a coherent optical network communication system, comprising:
a processor configured to receive the burst-mode digital data stream; and
a memory having computer-executable instructions encoded therein, which, when executed by the processor, cause the processor to structure the received burst-mode digital data stream into:
a first data payload portion including a first payload data sequence corresponding to a first polarization of the polarization multiplexed signal, and a second payload data sequence corresponding to a second polarization of the polarization multiplexed signal, wherein the first polarization is different from second polarization; and
a first preamble portion disposed prior to the first data payload portion in time, the first preamble portion including a first preamble component preceding the first payload data sequence and a second preamble component preceding the second payload data sequence,
wherein the first preamble component aligns with the second preamble component in time, wherein the first preamble component has a data length of N symbols, wherein N is a number greater than zero, wherein each symbol of the N symbols includes two or more digital bits, and wherein the second preamble component comprises entirely null bits within a complete duration of the first preamble component.

2. The data structure apparatus of claim 1, wherein the first payload data sequence comprises X-polarization data, and wherein the second payload data sequence comprises Y-polarization data.

3. The data structure apparatus of claim 1, wherein the first payload data sequence comprises Y-polarization data, and wherein the second payload data sequence comprises X-polarization data.

4. The data structure apparatus of claim 1, further comprising:

a second preamble portion following the first data payload portion in time; and a second data payload portion following the second preamble portion in time, wherein the second data payload portion includes a third payload data sequence corresponding to the first polarization of the first payload data sequence and a fourth payload data sequence corresponding to the second polarization of the second payload data sequence, and wherein the second preamble portion includes (i) a third preamble component disposed between the first payload data sequence and the third payload data sequence in time, and (ii) a fourth preamble component disposed between the second payload data sequence and the fourth payload data sequence in time.

5. The data structure apparatus of claim 4, wherein the third preamble component has a length of N symbols, and wherein the fourth preamble component comprises entirely null bits within a complete duration of the third preamble component.

6. The data structure apparatus of claim 4, wherein the fourth preamble component has a length of N symbols, and wherein the third preamble component comprises entirely null bits within a complete duration of the fourth preamble component.

7. The data structure apparatus of claim 1, wherein the first preamble portion further includes a third preamble component disposed between the first preamble component and the first payload data sequence, and a fourth preamble component disposed between the second preamble component and the second payload data sequence.

8. The data structure apparatus of claim 7, wherein (i) the third preamble component aligns with the fourth preamble component in time, (ii) the fourth preamble component comprises M-symbol length data, M being a number greater than zero, and (iii) the third preamble component comprises entirely null bits within a complete duration of the fourth preamble component.

9. The data structure apparatus of claim 8, wherein M equals N.

10. The data structure apparatus of claim 8, wherein M has a different symbol length than N.

11. A data frame structuring unit for a transmitter in an optical communication system, the data frame structuring unit comprising:

an input portion configured to receive a first optical carrier having a first polarization and a second optical carrier having a second polarization different from the first polarization;

a data unit generator configured to generate a first generated data unit having a data frame structure designed for each of the first and second optical carriers;

a modulator configured to modulate (i) a first component of the generated data unit onto the first optical carrier, and (ii) a second component of the generated data unit onto the second optical carrier during a same first time slot corresponding to the modulated first component; and an output portion configured to output the modulated first and second optical carriers as a dual-polarization multiplexed signal over an optical fiber medium in operable communication with the transmitter, wherein the first component of the first generated data unit comprises has a length of N symbols, wherein N is a number greater than zero, wherein each symbol of the N symbols includes two or more digital bits, and wherein the second component of the first generated data unit comprises entirely null bits within a complete duration of the first component in the same time slot.

12. The data frame structuring unit of claim 11, wherein the modulator is further configured to modulate (i) the first component onto the first optical carrier preceding a first payload portion of the first optical carrier in time, and (ii) the second component onto the second optical carrier preceding a second payload portion of the second optical carrier in time.

13. The data frame structuring unit of claim 12, wherein the data unit generator is further configured to generate a second generated data unit for the first and second optical carriers, wherein the second generated data unit comprises a third component for the first optical carrier, and a fourth component for the second optical carrier.

14. The data frame structuring unit of claim 13, wherein the modulator is further configured to modulate the second generated data unit onto the first and second optical carriers such that (i) the first payload portion of the first optical carrier is disposed between the first and third components in time, and (ii) the second payload portion of the second optical carrier is disposed between the second and fourth components in time.

15. The data frame structuring unit of claim 14, wherein the third component has a length of N symbols, and wherein the fourth component comprises entirely null bits within a complete duration of the third component.

16. The data frame structuring unit of claim 14, wherein the fourth component has a length of N symbols, and wherein the third component comprises entirely null bits within a complete duration of the fourth component.

17. The data frame structuring unit of claim 15, wherein the fourth component comprises N-symbol length data, and wherein the third component comprises null bits within a duration of the fourth component.

18. A data frame structuring unit for a transmitter in an optical communication system, the data frame structuring unit comprising:

an input portion configured to receive a first optical carrier having a first polarization and a second optical carrier having a second polarization different from the first polarization;

a data unit generator configured to generate a first generated data unit having a data frame structure designed for each of the first and second optical carriers;

a modulator configured to modulate (i) a first component of the generated data unit onto the first optical carrier, and (ii) a second component of the generated data unit onto the second optical carrier during a same first time slot corresponding to the modulated first component; and an output portion configured to output the modulated first and second optical carriers as a dual-polarization multiplexed signal over an optical fiber medium in operable communication with the transmitter, wherein the first component of the first generated data unit comprises N-symbol length data, N being a number greater than zero, wherein the second component of the first generated data unit comprises null bits within a duration of the first component in the same time slot, wherein the modulator is further configured to modulate (i) the first component onto the first optical carrier preceding a first payload portion of the first optical carrier in time, and (ii) the second component onto the second optical carrier preceding a second payload portion of the second optical carrier in time, wherein the data unit generator is further configured to generate a second generated data unit for the first and second optical carriers, wherein the second generated data unit comprises a third component for the first optical carrier, and a fourth component for the second optical carrier and wherein the modulator is further configured to modulate the second generated data unit onto the first and second optical carriers such that (i) the third component is disposed between the first component and the first payload portion of the first optical carrier in time, and (ii) fourth component is disposed between the second component and the second payload portion of the second optical carrier in time.

19. A polarization-diversity coherent receiver for a coherent optical communication system, the receiver comprising:

an input portion configured to receive a first polarization of a dual-polarization multiplexed signal and a second polarization the dual-polarization multiplexed signal different from the first polarization;

a state-of-polarization (SoP) estimation unit in communication with the input portion and configured to detect a first designated data unit from the first polarization and a second designated data unit from the second polarization and calculate an inverse matrix based on the detected first and second designated data units;

a first adaptive equalizer configured to receive the first polarization and the calculated inverse matrix, apply a first filter coefficient, and output a first equalized signal for the first polarization;

a second adaptive equalizer configured to receive the second polarization and the calculated inverse matrix, apply a second filter coefficient, and output a second equalized signal for the second polarization; and an error function unit configured to update (i) at least one tap of the first adaptive equalizer based on the output first equalized signal, and (ii) at least one tap of the second adaptive equalizer based on the output second equalized signal.

20. The receiver of claim 19, further comprising a channel response storage unit in communication with the first and second adaptive equalizers, the channel response storage unit configured to (i) store an initial channel response for a transmission channel of the dual-polarization multiplexed signal, and (ii) initialize each of the first and second adaptive equalizers using the stored initial channel response.

* * * * *